US012795253B2

(12) United States Patent
Mizoguchi

(10) Patent No.: US 12,795,253 B2
(45) Date of Patent: Nov. 10, 2026

(54) PHOTODETECTION ELEMENT AND ELECTRONIC APPARATUS

(71) Applicant: Sony Semiconductor Solutions Corporation, Kanagawa (JP)

(72) Inventor: Kyoji Mizoguchi, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 49 days.

(21) Appl. No.: 19/111,615

(22) PCT Filed: Oct. 5, 2023

(86) PCT No.: PCT/JP2023/036443
§ 371 (c)(1),
(2) Date: Mar. 13, 2025

(87) PCT Pub. No.: WO2024/080226
PCT Pub. Date: Apr. 18, 2024

(65) Prior Publication Data

US 2026/0113546 A1 Apr. 23, 2026

(30) Foreign Application Priority Data

Oct. 14, 2022 (JP) ................................ 2022-165542

(51) Int. Cl.
*H04N 25/47* (2023.01)
*H04N 25/767* (2023.01)

(52) U.S. Cl.
CPC ........... *H04N 25/47* (2023.01); *H04N 25/767* (2023.01)

(58) Field of Classification Search
CPC ....... H04N 25/47; H04N 25/767; H04N 25/76
See application file for complete search history.

(56) References Cited

U.S. PATENT DOCUMENTS 10,816,680 B2 * 10/2020 Nishihara ........... G01T 1/20184
2020/0183522 A1 * 6/2020 Chen .................... G06F 3/0416
(Continued)

FOREIGN PATENT DOCUMENTS

JP 2017135436 A 8/2017
JP 2020057990 A 4/2020
(Continued)

OTHER PUBLICATIONS

International Search Report (PCT/ISA/210), International Application No. PCT/JP2023/036443, dated Dec. 19, 2023.

*Primary Examiner* — Padma Haliyur
(74) *Attorney, Agent, or Firm* — Michael Best & Friedrich LLP

(57) ABSTRACT

In one example, a photodetection element has pixels including an event signal generating section that detects a change in luminance of incident light in a same direction as an event and generates an event signal and a grayscale signal generating section that generates a grayscale signal corresponding to the luminance of the incident light. A row control section commonly outputs a control signal to the grayscale signal generating section to generate the grayscale signal and control reading the grayscale signal at shifted timings for each row, and controls outputting a control signal to the event signal generating section to detect the event and control of reading the event signal. The overlapping prediction row detecting section detects an overlapping prediction row that is a row in which overlapping of periods of generation of the grayscale signal and detection of the event is predicted.

11 Claims, 36 Drawing Sheets

(56) References Cited

U.S. PATENT DOCUMENTS

| | | | | |
|---|---|---|---|---|
| 2021/0400222 | A1* | 12/2021 | Mochizuki | H04N 25/46 |
| 2022/0038645 | A1* | 2/2022 | Takahashi | H04N 25/46 |
| 2022/0172488 | A1* | 6/2022 | Hirata | G01W 1/10 |

FOREIGN PATENT DOCUMENTS

| | | | | |
|---|---|---|---|---|
| JP | 2021129265 | A | 9/2021 | |
| WO | WO-2020080383 | A1 * | 4/2020 | H04N 25/766 |
| WO | WO-2020196092 | A1 * | 10/2020 | H04N 25/76 |

* cited by examiner

PHOTODETECTION ELEMENT AND ELECTRONIC APPARATUS

FIELD

The present disclosure relates to a photodetection element and an electronic apparatus.

BACKGROUND

Sensor devices are used that generate grayscale signals according to the luminance of incident light from subjects and detect changes in the luminance of the incident light from the subjects as events to generate event signals. For example, sensor devices including pixel array sections configured by arranging pixels including circuits for generating grayscale signals and circuit for generating event signals in a two-dimensional matrix have been proposed (see, for example, Patent Literature 1).

CITATION LIST

Patent Literature

Patent Literature 1: JP 2021-129265 A

SUMMARY

Technical Problem

However, in the above-described conventional technique, since generation of grayscale signals and processing of detecting events overlap with each other in terms of time, there is a problem that interference due to control signals or the like occurs. Therefore, there is a problem that an error occurs in the grayscale signals and the event signals.

Therefore, the present disclosure proposes a photodetection element that reduces the influence of interference in generating grayscale signals and event signals, and an electronic apparatus using the photodetection element.

Solution to Problem

A photodetection element according to the present disclosure includes a pixel array section, a row control section and an overlapping prediction row detecting section. The pixel array section in which a plurality of pixels is arranged in a two-dimensional matrix, the pixel including an event signal generating section that detects a change in luminance of incident light in a same direction as an event and generates an event signal that is a signal based on the event detected, and a grayscale signal generating section that generates a grayscale signal that is a signal corresponding to the luminance of the incident light. The row control section performs luminance signal generation control of sequentially performing control of commonly outputting a control signal to the grayscale signal generating section of the pixel arranged in a row of the pixel array section to generate the grayscale signal and control of reading the grayscale signal at shifted timings for each row, and control of outputting a control signal to the event signal generating section to detect the event and control of reading the event signal. The overlapping prediction row detecting section detects an overlapping prediction row that is a row in which overlapping of periods of generation of the grayscale signal and detection of the event is predicted.

Furthermore, an electronic apparatus according to the present disclosure comprises a photodetection element including a pixel array section, a row control section and an overlapping prediction row detecting section, and a processing circuit. The pixel array section in which a plurality of pixels is arranged in a two-dimensional matrix, the pixel including an event signal generating section that detects a change in luminance of incident light in a same direction as an event and generates an event signal that is a signal based on the event detected, and a grayscale signal generating section that generates a grayscale signal that is a signal corresponding to the luminance of the incident light. The row control section performs luminance signal generation control of sequentially performing control of commonly outputting a control signal to the grayscale signal generating section of the pixel arranged in a row of the pixel array section to generate the grayscale signal and control of reading the grayscale signal at shifted timings for each row, and control of outputting a control signal to the event signal generating section to detect the event and control of reading the event signal. The overlapping prediction row detecting section detects an overlapping prediction row that is a row in which overlapping of periods of generation of the grayscale signal and detection of the event signal is predicted. The processing circuit processes at least one of the grayscale signal or the event signal.

DESCRIPTION OF EMBODIMENTS

Hereinafter, embodiments of the present disclosure will be described in detail with reference to the drawings. The description will be given in the following order. Note that, in each of the following embodiments, the same portions are denoted by the same reference signs, and redundant description will be omitted.

1. First Embodiment
2. Second Embodiment
3. Third Embodiment
4. Fourth Embodiment.
5. Fifth Embodiment
6. Sixth Embodiment
7. Seventh Embodiment
8. Eighth Embodiment
9. Ninth Embodiment
10. 10th Embodiment
11. Application Example to Mobile Body

1. First Embodiment

[Configuration of Photodetection Device]

Figure 1:
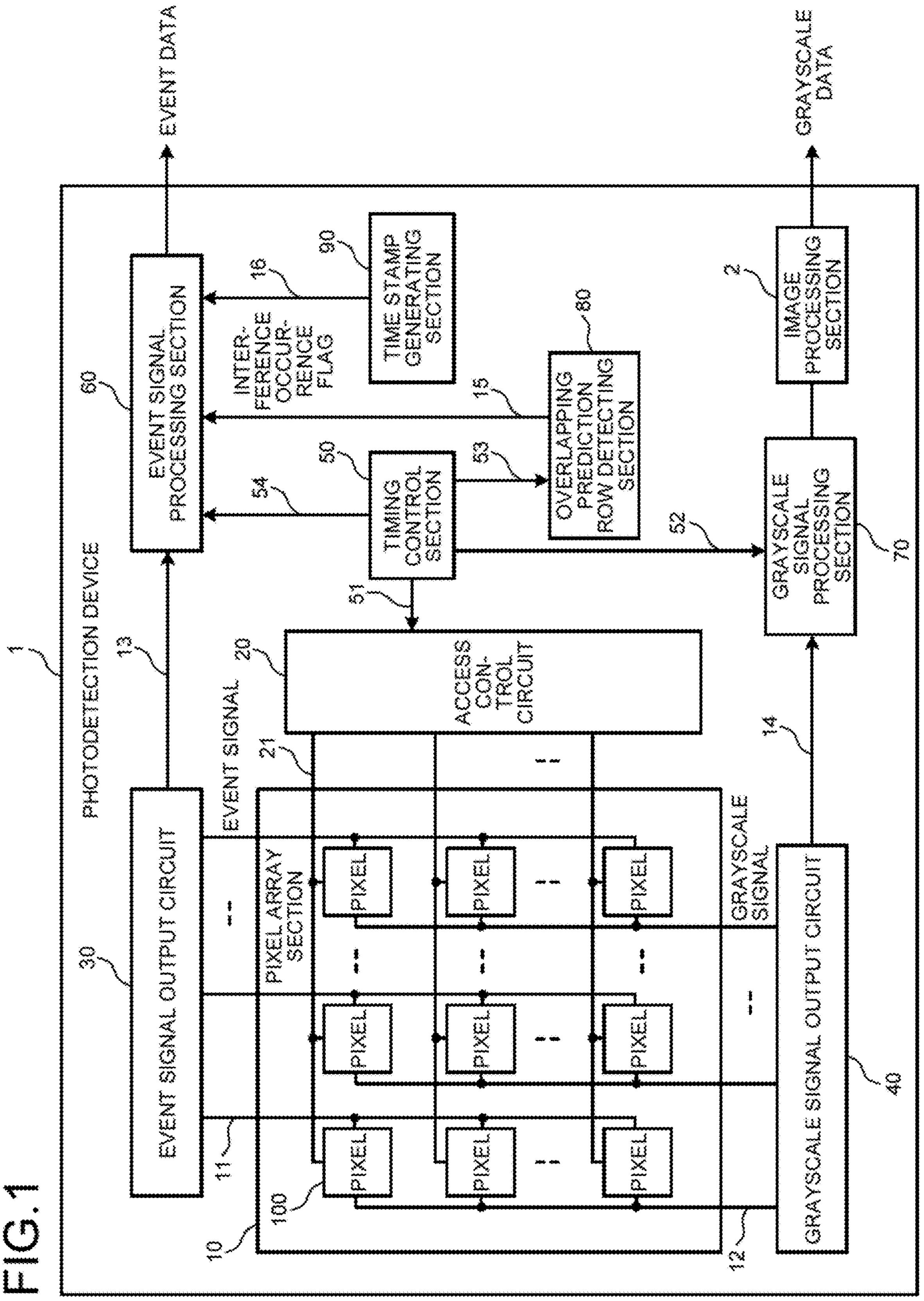
FIG. 1 is a diagram illustrating a configuration example of a photodetection device according to a first embodiment of the present disclosure.

FIG. 1 is a diagram illustrating a configuration example of a photodetection device according to a first embodiment of the present disclosure. The figure is a block diagram illustrating a configuration example of a photodetection device 1. The photodetection device 1 includes a pixel array section 10, an access control circuit 20, an event signal output circuit 30, a grayscale signal output circuit 40, a timing control section 50, an event signal processing section 60, a grayscale signal processing section 70, and an overlapping prediction row detecting section 80. In addition, the photodetection device 1 further includes a time stamp generating section 90 and an image processing section 2. Note that the photodetection device 1 in the figure is an example of an electronic apparatus. In addition, a portion of the photodetection device 1 other than the image processing section 2 constitutes a photodetection element.

The pixel array section 10 is configured by arranging a plurality of pixels 100 in a two-dimensional matrix. Here, the pixel 100 generates a grayscale signal that is a signal corresponding to the luminance of the incident light. Furthermore, the pixel 100 detects a change in the luminance of the incident light described above in the same direction as an event, and further generates an event signal that is a signal based on the detected event. The pixel 100 includes a photoelectric conversion section that performs photoelectric conversion of incident light, and generates the above-described grayscale signal and event signal on the basis of a result of the photoelectric conversion. For example, a photodiode can be used as the photoelectric conversion section. Signal lines 11, 12, and 21 are wired to each pixel 100. The pixel 100 is controlled by a control signal transmitted by the signal line 21 to generate a grayscale signal and an event signal. Furthermore, the pixel 100 outputs the grayscale signal generated via the signal line 12 and outputs the event signal generated via the signal line 11. Note that the signal line 21 is arranged for each row of the shape of the two-dimensional matrix, and is commonly wired to the plurality of pixels 100 arranged in one row. The signal lines 11 and 12 are arranged for each column of the shape of the two-dimensional matrix, and are commonly wired to the plurality of pixels 100 arranged in one column.

Note that, as described later in FIG. 2, the pixel 100 includes a grayscale signal generating section 110 that generates a grayscale signal and an event signal generating section 120 that generates an event signal. Furthermore, in the pixel array section 10, the plurality of pixels 100 arranged in the same row simultaneously generate grayscale signals. The generation of the grayscale signal is sequentially performed for each row while shifting the timing.

The access control circuit 20 outputs a control signal of the pixel 100 described above. The access control circuit 20 in the figure outputs a control signal for each row of the two-dimensional matrix of the pixel array section 10 via the signal line 12.

The event signal output circuit 30 processes the event signal for each pixel 100 output from the pixel array section 10 and outputs the processed event signal. The processing of the event signal output circuit 30 corresponds to, for example, processing of converting an analog event signal output from the pixel 100 into a digital signal.

The grayscale signal output circuit 40 processes the grayscale signal generated by the pixel 100 and outputs the processed grayscale signal. The grayscale signal output circuit 40 in the figure simultaneously processes grayscale signals from the plurality of pixels 100 arranged in one row of the pixel array section 10. The processing of the grayscale signal output circuit 40 corresponds to, for example, processing of converting an analog grayscale signal output from the pixel 100 into a digital signal.

The event signal processing section 60 processes the event signal from the event signal output circuit 30. The event signal output circuit 30 performs, for example, processing of converting an event signal into data of a predetermined format. The event signal output circuit 30 outputs the processed event signal as event data to an external device.

The grayscale signal processing section 70 processes a grayscale signal from the grayscale signal output circuit 40. The grayscale signal processing section 70 performs, for example, processing of converting a grayscale signal into data of a predetermined format. The grayscale signal processing section 70 outputs the processed grayscale signal as grayscale data.

The timing control section 50 controls control of the pixel 100 and the like. The timing control section 50 controls the pixel 100 and the like by generating and outputting a control signal of the pixel 100 and the like. This control corresponds to control for causing the grayscale signal generating section 110 to generate a grayscale signal, control for causing the event signal generating section 120 to detect an event, and control for causing the event signal generating section 120 to generate an event signal based on the detected event. Control signals used for these controls are output to the pixels 100 for each row of the pixel array section 10 via the access control circuit 20. In addition, the timing control section 50 also generates control signals for the event signal processing section 60 and the grayscale signal processing section 70. The generated control signal is output to the access control circuit 20, the event signal processing section 60, the grayscale signal processing section 70, and the overlapping prediction row detecting section 80. Note that the timing control section 50 and the access control circuit 20 are examples of the row control section.

The time stamp generating section 90 generates a time stamp and supplies the time stamp to the event signal processing section 60.

The overlapping prediction row detecting section 80 detects an overlapping prediction row that is a row in which the overlapping of periods of generation of a grayscale signal and detection of an event is predicted. As described above, the pixel 100 includes the grayscale signal generating section 110 and the event signal generating section 120, and can individually generate the grayscale signal and the event signal. Therefore, a generation period of the grayscale signal and a detection period of the event may overlap with each other. At this time, interference occurs in generation of a grayscale signal and detection of an event. Since the grayscale signal generating section 110 and the event signal generating section 120 are combined by a stray capacitance or the like, a change in one control signal of the grayscale signal generating section 110 and the event signal generating section 120 affects the other signal level. When this interference occurs, an error occurs in a grayscale signal or an event signal. Therefore, the above-described overlapping prediction row is detected and used for reducing the influence of interference. In the figure, the overlapping prediction row detecting section 80 generates an interference occurrence flag indicating occurrence of interference on the basis of the detected overlapping prediction row and outputs the interference occurrence flag to the event signal processing section 60.

The image processing section 2 processes grayscale data that is data of a grayscale signal. Note that it is also possible to adopt a configuration including an event data processing section that processes event data that is data of an event signal.

[Configuration of Pixel]

Figure 2:
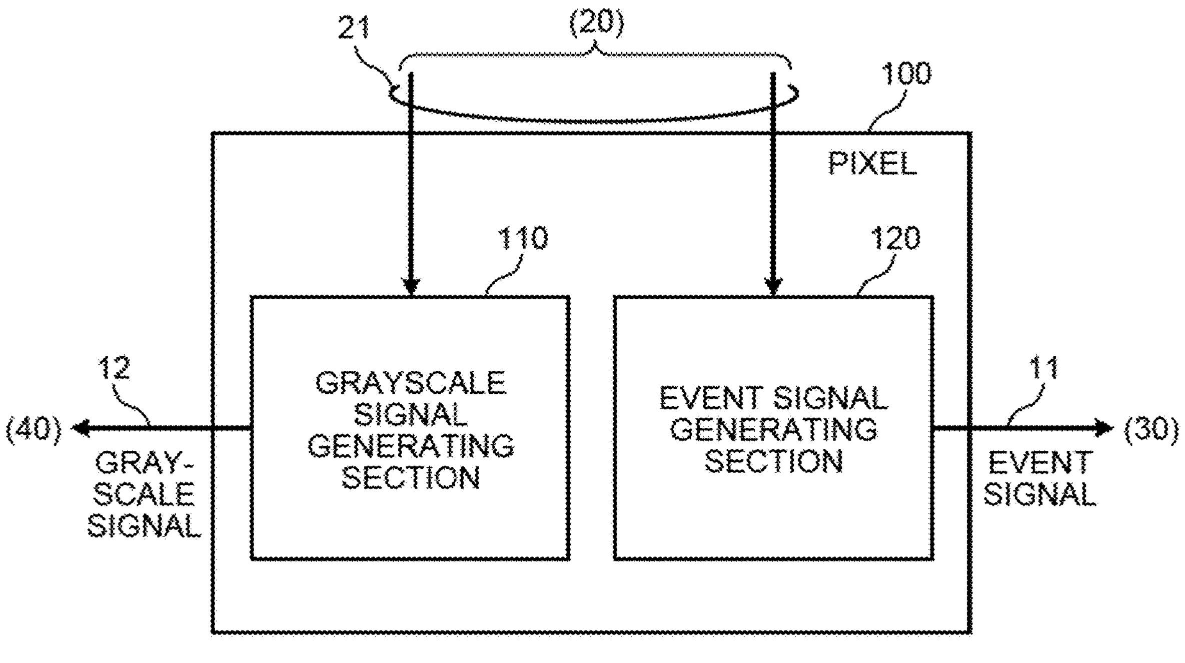
FIG. 2 is a diagram illustrating a configuration example of a pixel according to an embodiment of the present disclosure.

FIG. 2 is a diagram illustrating a configuration example of a pixel according to an embodiment of the present disclosure. The figure is a block diagram illustrating a configuration example of the pixel 100. The pixel 100 includes the grayscale signal generating section 110 and the event signal generating section 120. The grayscale signal generating section 110 generates a grayscale signal on the basis of a control signal supplied from the access control circuit 20 via the signal line 21. The generated grayscale signal is transmitted to the grayscale signal output circuit 40 via the signal line 12. The event signal generating section 120 generates an event signal on the basis of a control signal supplied from the access control circuit 20 via the signal line 21. The generated event signal is transmitted to the event signal output circuit 30 via the signal line 11.

[Configuration of Grayscale Signal Generating Section]

Figure 3:
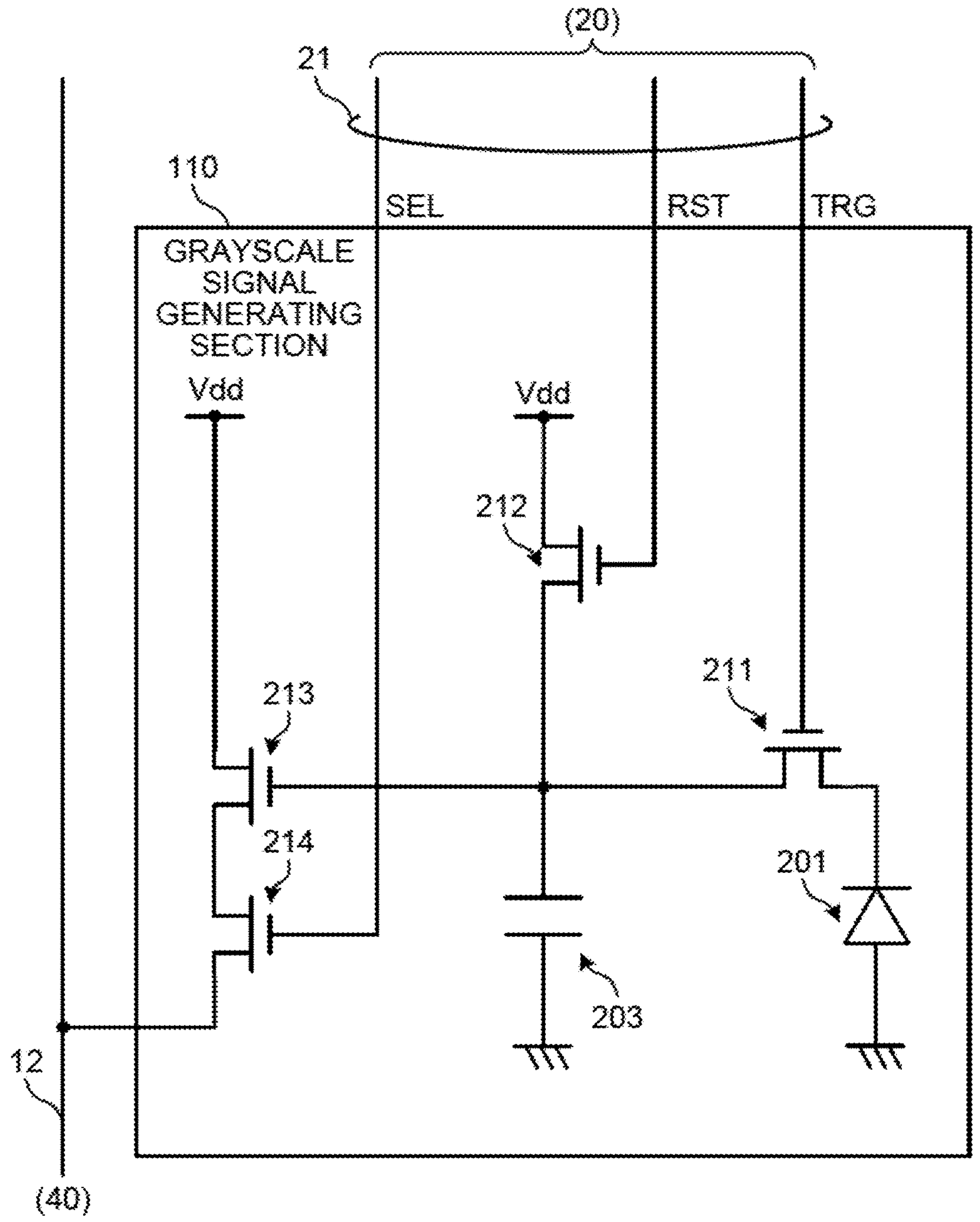
FIG. 3 is a diagram illustrating a configuration example of a grayscale signal generating section according to an embodiment of the present disclosure.

FIG. 3 is a diagram illustrating a configuration example of a grayscale signal generating section according to the embodiment of the present disclosure. The figure is a circuit diagram illustrating a configuration example of the grayscale signal generating section 110. The grayscale signal generating section 110 includes a photoelectric conversion section 201, a charge holding section 203, and MOS transistors 211 to 214. As the MOS transistors 211 to 214, n-channel MOS transistors can be used. Furthermore, the signal line 21 connected to the pixel 100 includes a signal line TRG, a signal line RST, and a signal line SEL. Furthermore, a power supply line Vdd for supplying power is wired to the pixel 100.

The anode of the photoelectric conversion section 201 is grounded, and the cathode is connected to the source of the MOS transistor 211. The drain of the MOS transistor 211 is connected to the source of the MOS transistor 212, the gate of the MOS transistor 213, and one end of the charge holding section 203. The other end of the charge holding section 203 is grounded. The drain of the MOS transistor 213 is connected to the power supply line Vdd, and the source is connected to the drain of the MOS transistor 214. The source of the MOS transistor 214 is connected to the signal line 12. The signal lines TRG, RST, and SEL are connected to the gates of the MOS transistors 211, 212, and 214, respectively.

The photoelectric conversion section 201 is an element that performs photoelectric conversion of incident light. The photoelectric conversion section 201 generates and holds a charge by photoelectric conversion.

The MOS transistor 211 transfers the charge held in the photoelectric conversion section 201 to the charge holding section 203. The MOS transistor 211 is controlled by a control signal transmitted by the signal line TRG.

The charge holding section 203 is an element that holds a charge. The charge holding section 203 can be configured by a semiconductor region formed on a semiconductor substrate.

The MOS transistor 212 resets the charge holding section 203. The MOS transistor 212 is controlled by a control signal transmitted by a signal line RST.

The MOS transistor 213 is an element that generates a grayscale signal according to the charge held in the charge holding section 203. The generated grayscale signal is output to the source terminal.

The MOS transistor 214 is an element that outputs a grayscale signal generated by the MOS transistor 213 to the signal line 12. The MOS transistor 214 is controlled by a control signal transmitted by a signal line SEL.

[Generation of Grayscale Signal]

Figure 4:
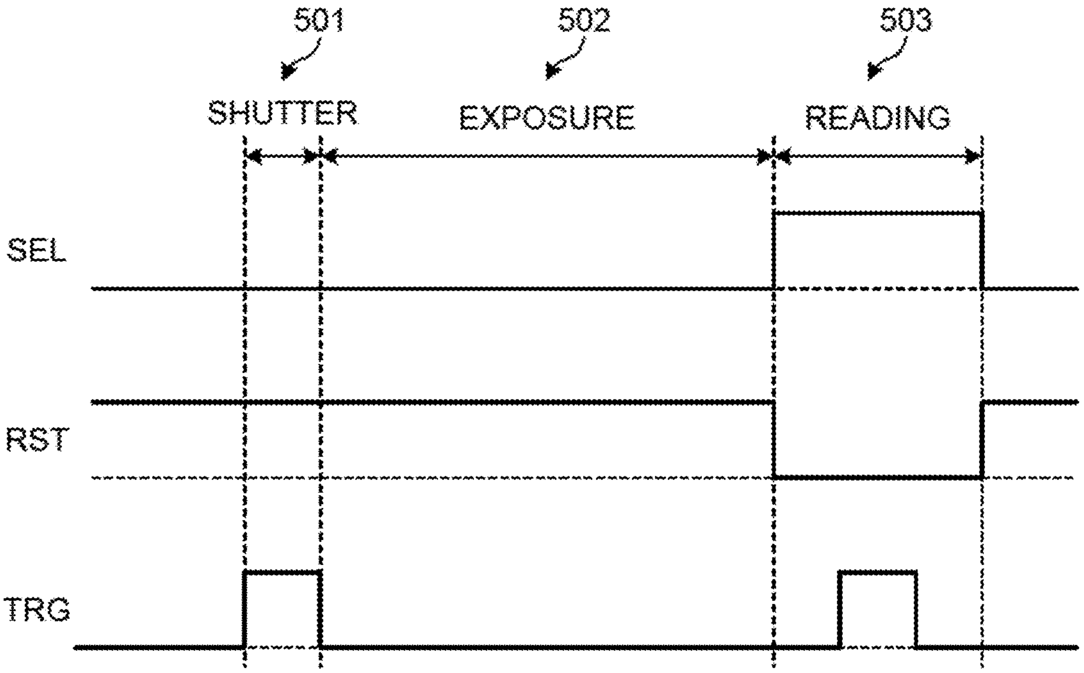
FIG. 4 is a diagram illustrating an example of generation of a grayscale signal according to an embodiment of the present disclosure.

FIG. 4 is a diagram illustrating an example of generation of a grayscale signal according to an embodiment of the present disclosure. The figure is a timing chart illustrating an example of generation of a grayscale signal in the grayscale signal generating section 110. In the figure, "SEL" represents a selection signal transmitted by the signal line SEL. Furthermore, "RST" represents a reset signal transmitted by the signal line RST. Furthermore, "TRG" represents a transfer signal transmitted by the signal line TRG. A portion of the value "1" of the binarized waveform in these control signals represents an ON signal which is a signal for making the MOS transistor conductive. Note that a broken line in the figure represents a level of 0 V. As illustrated in the figure, the grayscale signal is generated by a shutter 501, an exposure 502, and a reading 503. Note that, in the initial state, the selection signal, the reset signal, and the transfer signal have values "0", "1", and "0", respectively.

The shutter 501 is a period corresponding to an electronic shutter, the reset signal and the transfer signal have a value "1", and the MOS transistors 211 and 212 are conducted. As a result, the charges of the photoelectric conversion section 201 and the charge holding section 203 are discharged and reset.

The exposure 502 is a period in which the transfer signal becomes the value "0" and the charge generated by the photoelectric conversion of the photoelectric conversion section 201 is accumulated in the photoelectric conversion section 201.

The reading 503 is a period in which reading is performed in which the selection signal has the value "1", the reset signal has the value "0", and the grayscale signal generated by the MOS transistor 111 is output to the signal line 12. During this period, the transfer signal becomes the value "1", and the charge of the photoelectric conversion section 201 is transferred to the charge holding section 203. The MOS transistor 111 generates a grayscale signal according to the charge of the charge holding section 203 and outputs the grayscale signal to the signal line 12.

As described above, the grayscale signal is generated by the three periods of the shutter 501, the exposure 502, and the reading 503, and is output from the grayscale signal generating section 110. As described above, the generation of the grayscale signal is performed for each row. At this time, the shutter 501, the exposure 502, and the reading 503 are sequentially applied while shifting the timing for each row. This state will be described later with reference to FIG. 9.

[Configuration of Event Signal Generating Section]

Figure 5:
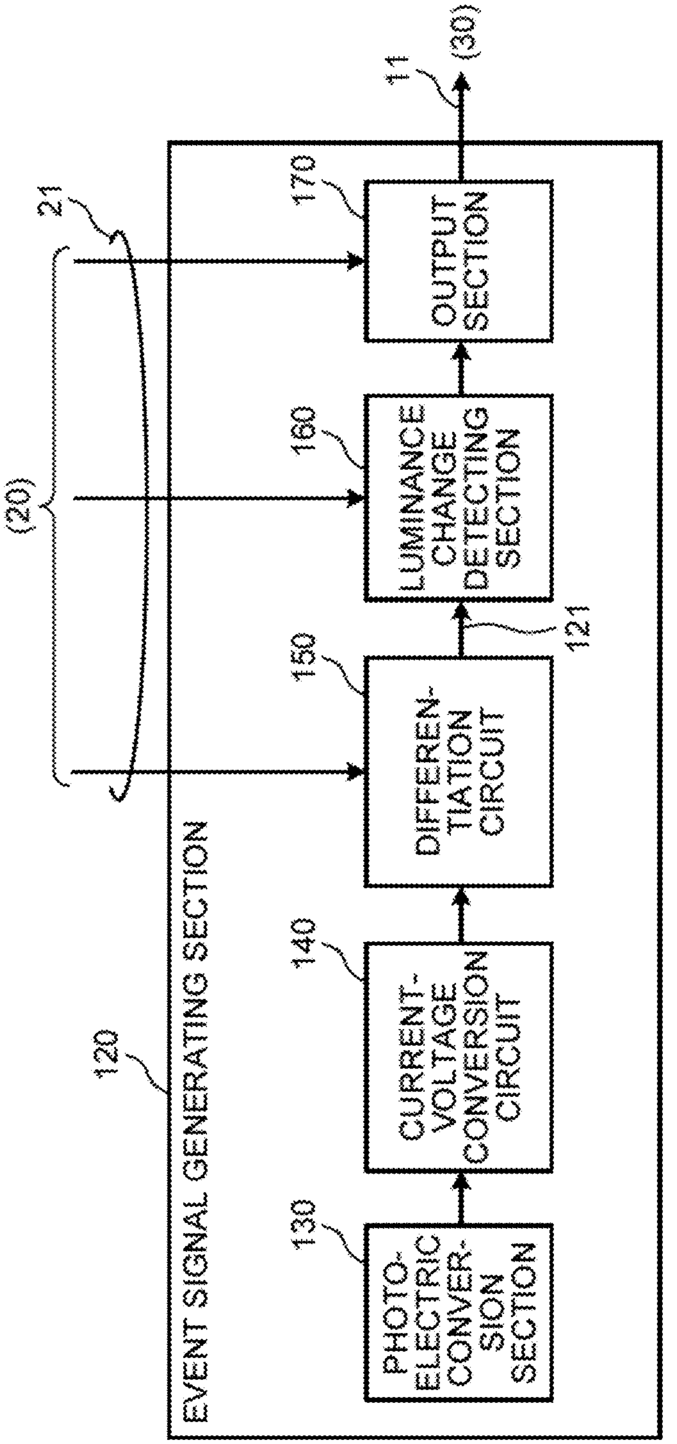
FIG. 5 is a diagram illustrating a configuration example of an event signal generating section according to the first embodiment of the present disclosure.

FIG. 5 is a diagram illustrating a configuration example of an event signal generating section according to the first embodiment of the present disclosure. The figure is a block diagram illustrating a configuration example of the event signal generating section 120. The event signal generating section 120 in the figure includes a photoelectric conversion section 130, a current-voltage conversion circuit 140, a differentiation circuit 150, a luminance change detecting section 160, and an output section 170.

The photoelectric conversion section 130 performs photoelectric conversion of incident light similarly to the photoelectric conversion section 201. The photoelectric conversion section 130 can include a photodiode.

The current-voltage conversion circuit 140 converts the photocurrent from the photoelectric conversion section 130 into a voltage signal. Further, in this conversion, the current-voltage conversion circuit 140 performs logarithmic compression of the voltage signal. The converted voltage signal is output to the differentiation circuit 150. Details of the configuration of the current-voltage conversion circuit 140 will be described later.

The differentiation circuit 150 extracts a change of the voltage signal output from the current-voltage conversion circuit 140 and integrates the extracted change to generate a signal corresponding to the amount of change of the voltage signal. This signal corresponds to a signal corresponding to a change in luminance of the incident light. This signal is referred to as an optical signal. The differentiation circuit 150 outputs the generated optical signal to the luminance change detecting section 160 through the signal line 121. Further, a control signal is input from the access control circuit 20 to the differentiation circuit 150. The control signal is a signal for resetting the circuit that detects the amount of change in the voltage signal described above. Details of the configuration of the differentiation circuit 150 will be described later.

The luminance change detecting section 160 detects a luminance change of the incident light. The luminance change detecting section 160 in the figure detects a change in the optical signal output from the differentiation circuit 150 on the basis of the threshold. That is, in a case where the change in the optical signal exceeds the threshold value, the change in the optical signal is detected as an event. Here, an event in a direction in which the optical signal increases is referred to as an on-event, and an event in a direction in which the optical signal decreases is referred to as an off-event. The luminance change detecting section 160 detects an on-event and an off-event with voltages of the on-event detection signal and the off-event detection signal supplied from the access control circuit 20 as thresholds. This detection result is output to the output section 170. Details of the configuration of the luminance change detecting section 160 will be described later.

The output section 170 outputs an on-event and an off-event detected by the luminance change detecting section 160 as event signals on the basis of a control signal from the access control circuit 20.

[Circuit Configuration of Event Signal Generating Section]

Figure 6:
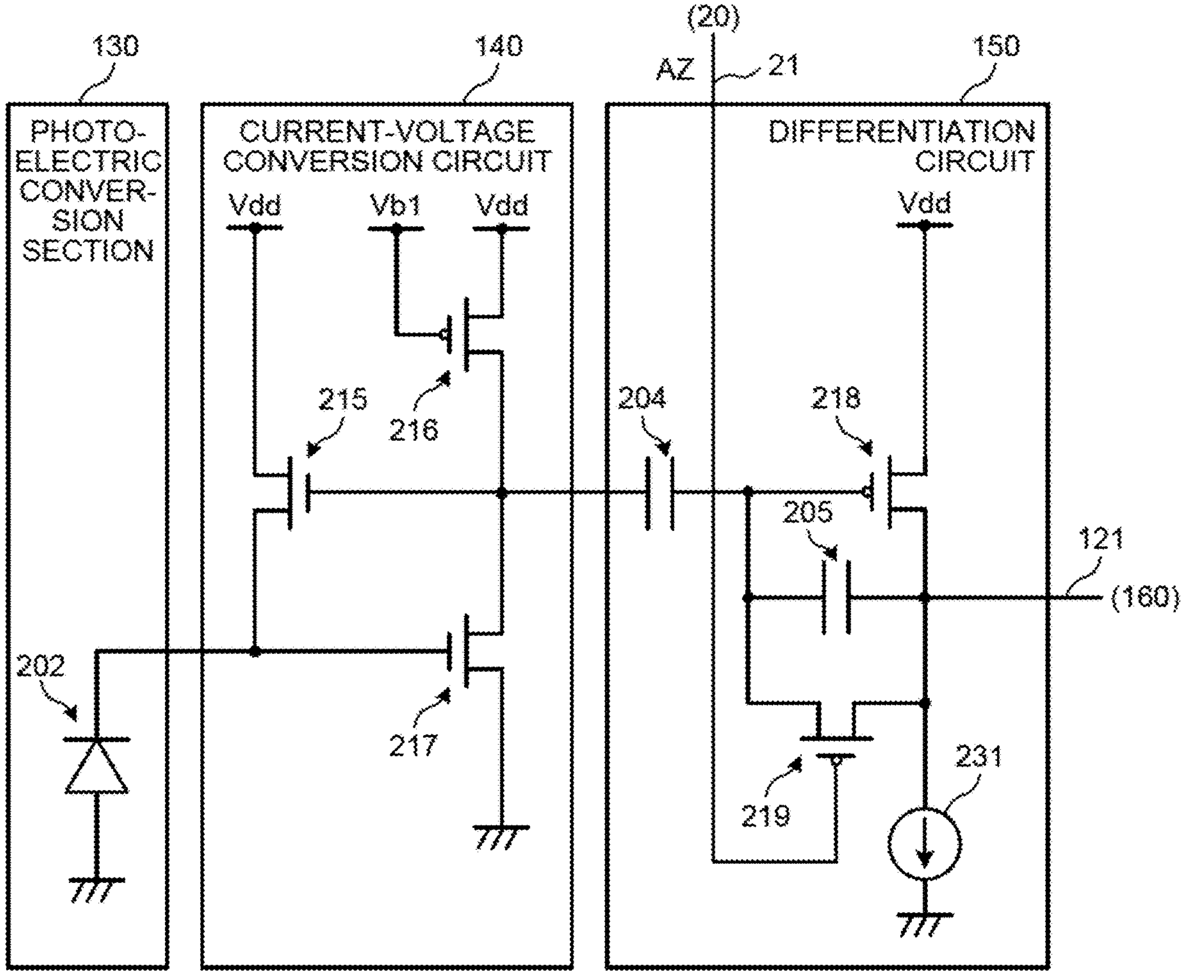
FIG. 6 is a circuit diagram illustrating a configuration example of an event signal generating section according to an embodiment of the present disclosure.
Figure 7:
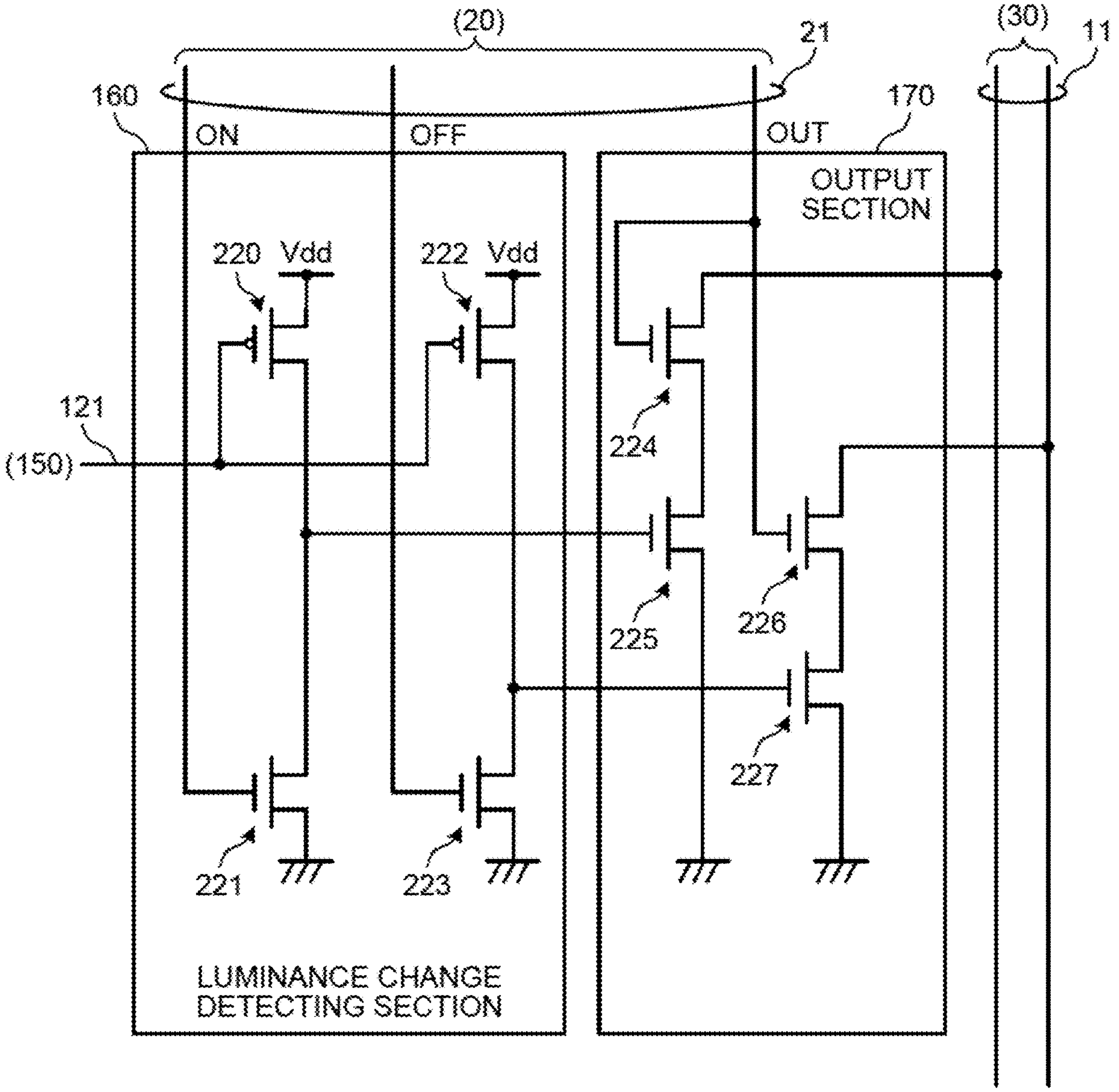
FIG. 7 is a circuit diagram illustrating a configuration example of an event signal generating section according to an embodiment of the present disclosure.

FIGS. 6 and 7 are circuit diagrams illustrating a configuration example of the event signal generating section according to the embodiment of the present disclosure. FIG. 6 is a circuit diagram illustrating a configuration example of the current-voltage conversion circuit 140 and the differentiation circuit 150. Note that a photoelectric conversion section 202 is further illustrated in the figure. In addition, FIG. 7 is a circuit diagram illustrating a configuration example of the luminance change detecting section 160 and the output section 170.

The current-voltage conversion circuit 140 in the figure includes MOS transistors 215 to 217. In the figure, Vdd represents a power supply line Vdd that supplies power. Vb1 represents a signal line Vb1 that supplies a bias voltage. As the MOS transistors 215 and 217, n-channel MOS transistors can be used. As the MOS transistor 216, a p-channel MOS transistor can be used.

The anode of the photoelectric conversion section 202 is grounded, and the cathode is connected to the source of the MOS transistor 215 and the gate of the MOS transistor 217. The sources of the MOS transistor 215 and the MOS transistor 216 are connected to the power supply line Vdd, and the gate of the MOS transistor 216 is connected to the signal line Vb1. The source of the MOS transistor 217 is grounded, and the drain is connected to the gate of the MOS transistor 215, the drain of the MOS transistor 216, and the output signal line of the current-voltage conversion circuit 140. One end of a capacitor of the differentiation circuit 150 is connected to the output signal line.

The MOS transistor 215 is a MOS transistor that supplies a current to the photoelectric conversion section 202. A sink current (photocurrent) according to incident light flows through the photoelectric conversion section 202. The MOS transistor 215 supplies the sink current. At this time, the gate of the MOS transistor 215 is driven by the output voltage of the MOS transistor 217 to be described later, and outputs a source current equal to the sink current of the photoelectric conversion section 202. Since the gate-source voltage Vgs of the MOS transistor is a voltage corresponding to the source current, the source voltage of the MOS transistor 215 is a voltage corresponding to the current of the photoelectric conversion section 202. As a result, the photocurrent of the photoelectric conversion section 202 is converted into a voltage signal.

The MOS transistor 217 is a MOS transistor that amplifies the source voltage of the MOS transistor 215. Furthermore, the MOS transistor 216 constitutes a constant current load of the MOS transistor 217. The amplified voltage signal is output to the drain of the MOS transistor 217. This voltage signal is output to the differentiation circuit 150 and fed back to the gate of the MOS transistor 215. In a case where Vgs of the MOS transistor 215 is equal to or lower than the threshold voltage, the source current changes in an exponential manner with respect to the change in Vgs. Therefore, the output voltage of the MOS transistor 215 fed back to the gate of the MOS transistor 217 is a voltage signal obtained by logarithmically compressing the photocurrent of the photoelectric conversion section 202 equal to the source current of the MOS transistor 215.

[Configuration of Differentiation Circuit]

The differentiation circuit 150 in the figure includes capacitors 204 and 205, MOS transistors 218 and 219, and a constant current circuit 231. p-channel MOS transistors can be used as the MOS transistors 218 and 219.

As described above, the output of the current-voltage conversion circuit 140 is connected to one end of the capacitor 204, and the other end of the capacitor 204 is connected to the gate of the MOS transistor 218, the drain of the MOS transistor 219, and one end of the capacitor 205. The other end of the capacitor 205 is connected to the drain of the MOS transistor 218, the drain of the MOS transistor 219, the sink side terminal of the constant current circuit 231, and the signal line 121. The source of the MOS transistor 218 is connected to the power supply line Vdd, and the gate of the MOS transistor 219 is connected to the signal line AZ. The sink side terminal of the constant current circuit 231 is grounded.

The capacitor 204 corresponds to a coupling capacitor. The capacitor 204 blocks the DC component of the output voltage of the current-voltage conversion circuit 140 and allows only the AC component to pass therethrough. In addition, a current based on a change in the output voltage of the current-voltage conversion circuit 140 is supplied to the gate of the MOS transistor 218 via the capacitor 204. The AC component of the output voltage of the current-voltage conversion circuit 140 corresponds to a change in photocurrent. The MOS transistor 218 and the constant current circuit 231 constitute an inverting amplifier circuit. A change in the output voltage of the current-voltage conversion circuit 140 is input to the gate of the MOS transistor 218 via the capacitor 204, is inverted and amplified by the MOS transistor 218, and is output to the drain. Therefore, a current based on a change in the output voltage of the current-voltage conversion circuit 140 flows through the capacitor 205, and the capacitor 205 is charged and discharged. That is, the change in the output voltage of the current-voltage conversion circuit 140 is integrated. An optical signal that is a signal corresponding to the amount of change in the voltage signal output from the current-voltage conversion circuit 140 is output to the signal line 121.

The MOS transistor 219 resets the differentiation circuit 150. Both ends of the capacitor 205 are short-circuited by conducting the MOS transistor 219. The integrated change in the output voltage of the current-voltage conversion circuit 140 is discharged and reset. By this reset, the output voltage of the differentiation circuit 150 becomes, for example, a voltage at the midpoint between the power supply line Vdd and the ground line. This reset is controlled by an AZ control signal transmitted by the signal line AZ. Hereinafter, the reset of the differentiation circuit 150 is referred to as an AZ operation.

[Configuration of Luminance Change Detecting Section]

In FIG. 7, the luminance change detecting section 160 includes MOS transistors 220 to 223. As the MOS transistors 220 and 222, p-channel MOS transistors can be used. Furthermore, n-channel MOS transistors can be used as the MOS transistors 221 and 223. In addition, a signal line ON and a signal line OFF from the access control circuit 20 are connected to the luminance change detecting section 160. The signal line ON is a signal line that transmits an on-event detection signal. The signal line OFF is a signal line that transmits an off-event detection signal.

The signal line 121 is connected to the gate of the MOS transistor 220 and the gate of the MOS transistor 222. The source of the MOS transistor 220 is connected to the power supply line Vdd, and the drain is connected to the drain of the MOS transistor 221 and the gate of the MOS transistor 225 of the output section 170. The gate of the MOS transistor 221 is connected to the signal line ON, and the source is grounded. The source of the MOS transistor 222 is connected to the power supply line Vdd, and the drain is connected to the drain of the MOS transistor 223 and the gate of the MOS transistor 227 of the output section 170. The gate of the MOS transistor 223 is connected to the signal line OFF, and the source is grounded.

The circuits of the MOS transistors 220 and 221 constitute a comparison circuit. The output of the comparison circuit changes according to the magnitude relationship between the drain current on the sink side of the MOS transistor 221 and the drain current on the source side of the MOS transistor 220. In a case where the output voltage of the differentiation circuit 150 is lower than a threshold based on the voltage of the on-event detection signal, specifically, a voltage obtained by subtracting the threshold voltage from the power supply voltage Vdd, the source current of the MOS transistor 220 is smaller than the sink current of the MOS transistor 221. Therefore, the output voltage is at the L level. On the other hand, when the output voltage of the differentiation circuit 150 becomes higher than the threshold voltage (voltage obtained by subtracting the threshold voltage from the power supply voltage Vdd), the sink current of the MOS transistor 221 becomes smaller than the source current of the MOS transistor 220. Therefore, the output voltage shifts to the H level. As described above, the comparison circuit including the MOS transistors 220 and 221 compares the output voltage of the differentiation circuit 150 with the threshold voltage of the on-event detection signal, and detects an on-event that is a change in the direction in which the luminance of the incident light increases. Note that, when the on-event detection signal is at a voltage higher than the threshold voltage, for example, at the power supply voltage of the power supply line Vdd, the output of the comparator is always at the L level. That is, the on-event can be detected by applying a threshold voltage as the on-event detection signal.

The circuits of the MOS transistors 222 and 223 also constitute a comparison circuit. In a case where the output voltage of the differentiation circuit 150 is lower than a threshold based on the voltage of the off-event detection signal, specifically, a voltage obtained by subtracting the threshold voltage from the power supply voltage Vdd, the output voltage becomes the L level. On the other hand, when the output voltage of the differentiation circuit 150 becomes higher than the threshold voltage (voltage obtained by subtracting the threshold voltage from the power supply voltage Vdd), the output voltage shifts to the H level. By setting the threshold of the off-event detection signal to a voltage lower than the threshold of the on-event detection signal, the comparison circuit of the MOS transistors 222 and 223 detects an off-event that is a change in a direction in which the luminance of the incident light decreases. Note that, when the off-event detection signal is a voltage lower than the threshold voltage, for example, the ground potential, the output of the comparator is always at the H level. That is, the off-event can be detected by applying a threshold voltage as the off-event detection signal.

[Configuration of Output Section]

The output section 170 includes MOS transistors 224 to 227. As the MOS transistors 224 to 227, n-channel MOS transistors can be used. The drain of the MOS transistor 224 is connected to one of the signal lines 11, and the drain of the MOS transistor 226 is connected to the other of the signal lines 11. The gates of the MOS transistors 224 and 226 are commonly connected to the signal line OUT. The source of the MOS transistor 224 is connected to the drain of the MOS transistor 225, and the source of the MOS transistor 225 is grounded. The source of the MOS transistor 226 is connected to the drain of the MOS transistor 227, and the source of the MOS transistor 227 is grounded.

When the event read signal is input to the signal line OUT, the MOS transistors 224 and 226 become conductive. As a result, the drain voltages of the MOS transistors 225 and 227 are output to the signal line 11. Since the on-event detection signal and the off-event detection signal of the luminance change detecting section 160 are applied to the gates of the MOS transistors 225 and 227, an event signal including an on-event signal and an off-event signal is output to the signal line 11.

In this manner, the grayscale signal and the event signal are generated in the grayscale signal generating section 110 and the event signal generating section 120, respectively. When generating the grayscale signal, the timing control section 50 generates a grayscale address signal which is an address signal of a row for generating the grayscale signal, and outputs the grayscale address signal to the access control circuit 20. The access control circuit 20 outputs a selection signal, a reset signal, and a transfer signal to the pixels 100 in the row based on the grayscale address signal. On the other hand, when generating the event signal, the timing control section 50 outputs an event-based vision sensor (EVS) address signal, which is an address signal when reading the on-event detection signal, the off-event detection signal, the AZ control signal, the output signal, and the event signal, to the access control circuit 20. The access control circuit 20 sequentially outputs an on-event detection signal, an off-event detection signal, and an AZ control signal to all the pixels 100 of the pixel array section 10. Thereafter, the output signal is sequentially output for each row of the pixel array section 10, and the event signal is output (read). This state will be described with reference to FIG. 8.

Note that the pixel 100 in FIG. 2 represents an example of a case where each of the grayscale signal generating section 110 and the event signal generating section 120 includes a photoelectric conversion section. On the other hand, the pixel 100 can be configured in a format in which one photoelectric conversion section is shared by the grayscale signal generating section 110 and the event signal generating section 120. Such a pixel 100 in a format in which the photoelectric conversion section is shared by the grayscale signal generating section 110 and the event signal generating section 120 can be applied to, for example, the embodiment illustrated in FIG. 18A described later.

[Generation of Grayscale Signal and Event Signal]

Figure 8:
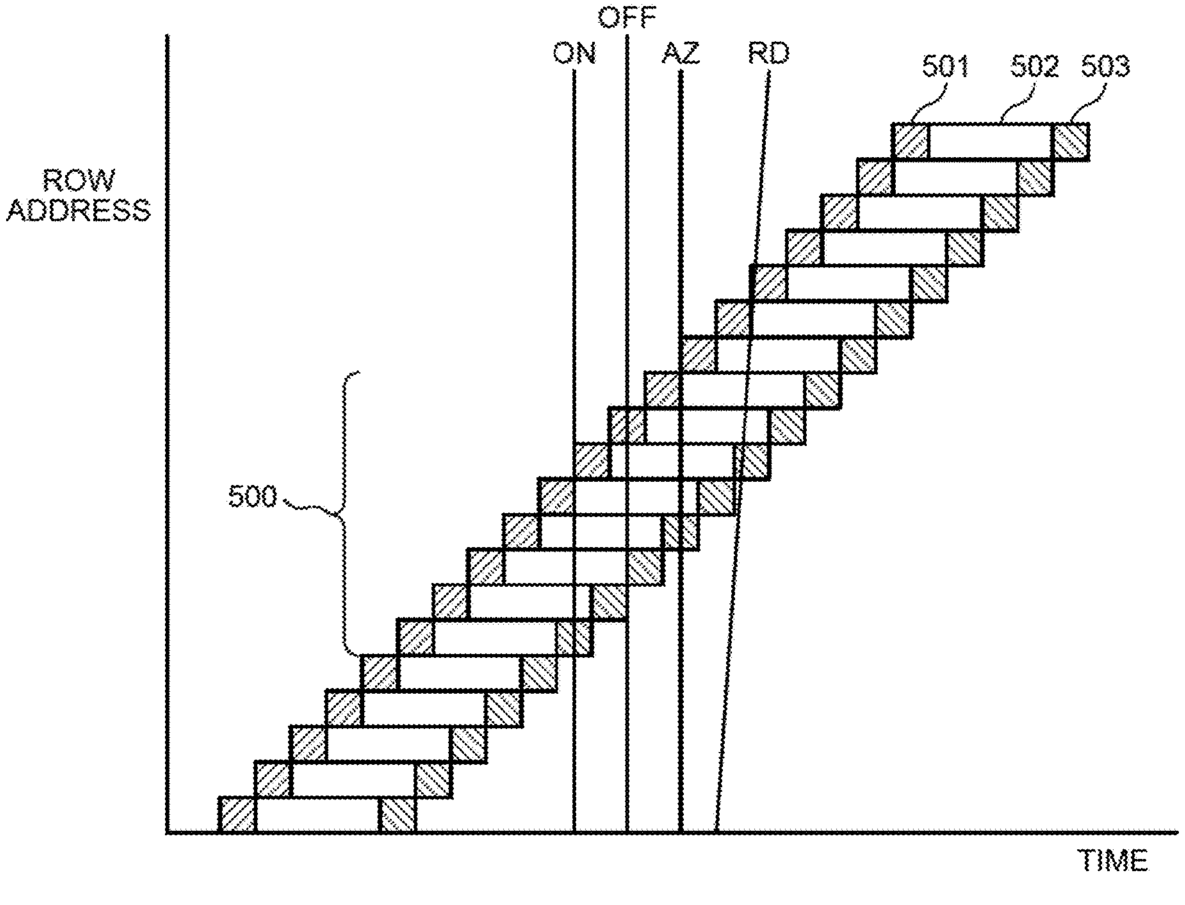
FIG. 8 is a diagram illustrating an example of generation of a grayscale signal and an event signal according to the first embodiment of the present disclosure.

FIG. 8 is a diagram illustrating an example of generation of a grayscale signal and an event signal according to the first embodiment of the present disclosure. The figure is a timing chart illustrating an example of generation of a grayscale signal and an event signal. In the figure, the horizontal axis represents time, and the vertical axis represents a row address. Note that the figure illustrates an example of a case where a grayscale signal of a frame period which is a period in which grayscale signals of all rows of the pixel array section 10 are generated and an event signal is generated in the period.

A rectangle in the figure represents a period of the shutter 501, the exposure 502, and the reading 503 described in FIG.

4. As illustrated in the figure, the shutter 501, the exposure 502, and the reading 503 are sequentially executed while shifting the timing for each row, and a grayscale signal of one frame is generated. A method for generating such a grayscale signal is referred to as a rolling shutter method.

A solid line in the figure indicates timings of on-event detection ("ON" in the figure), off-event detection ("OOF" in the figure), AZ operation ("AZ" in the figure), and event signal output (read, "RD" in the figure). As illustrated in the figure, the on-event detection, the off-event detection, and the AZ operation are simultaneously performed on the pixels 100 in all the rows.

Therefore, a row in which the grayscale signal is generated overlaps with a row in which the on-event detection, the off-event detection, and the AZ operation are performed. In the pixel 100 of such a row, the above-described interference occurs. Therefore, an overlapping prediction row that is a row in which the overlapping of periods of generation of a grayscale signal and detection of an event (for example, a period from on-event detection and off-event detection to AZ operation) is predicted is detected. The figure illustrates the overlapping prediction row 500.

[Configuration of Overlapping Prediction Row Detecting Section]

Figure 9:
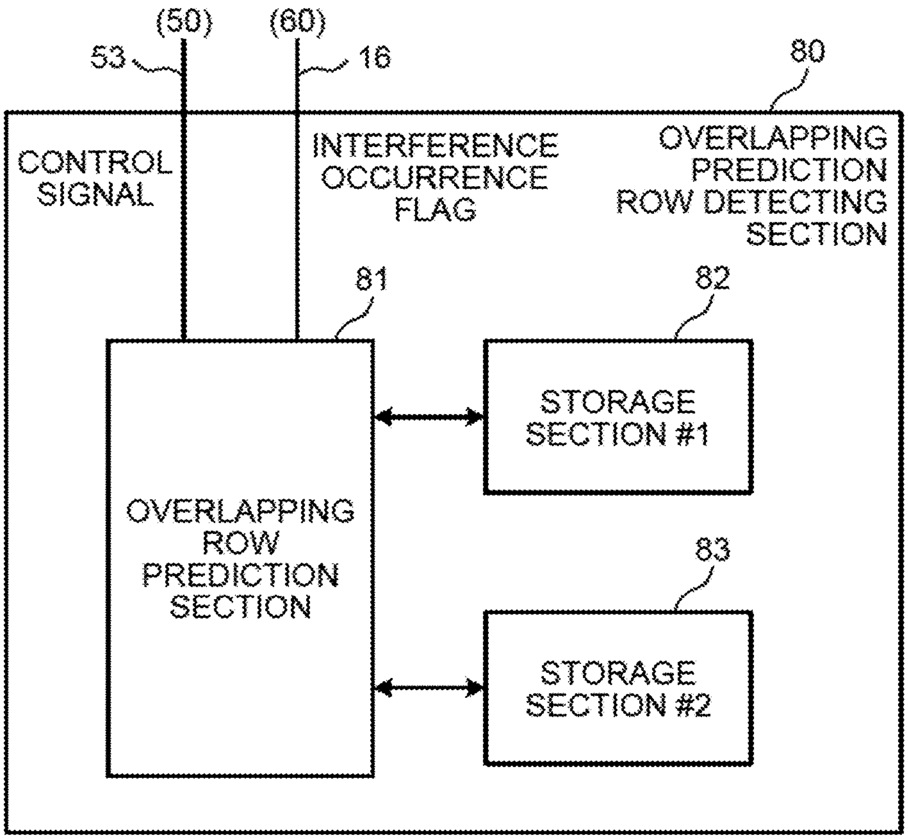
FIG. 9 is a diagram illustrating a configuration example of an overlapping prediction row detecting section according to the first embodiment of the present disclosure.

FIG. 9 is a diagram illustrating a configuration example of the overlapping prediction row detecting section according to the first embodiment of the present disclosure. The figure is a block diagram illustrating a configuration example of the overlapping prediction row detecting section 80. The overlapping prediction row detecting section 80 in the figure includes an overlapping row prediction section 81, a storage section (#1) 82, and a storage section (#2) 83.

The overlapping row prediction section 81 detects the overlapping prediction row on the basis of the control signal from the timing control section 50. The overlapping row prediction section 81 inputs a grayscale address signal, an on-event detection signal, an off-event detection signal, an AZ control signal, an output signal, and an EVS address signal. The overlapping row prediction section 81 detects an overlapping prediction row from these control signals. For example, the overlapping prediction row can be detected from the grayscale address signal when the on-event detection signal, the off-event detection signal, and the AZ control signal are input. In this case, an error due to interference occurs in either the grayscale signal or the event signal. As described later, by not using the event signal of the overlapping prediction row, the influence of the interference can be avoided.

Further, the overlapping row prediction section 81 can detect the overlapping prediction row from the grayscale address signal and the EVS address signal. In this case, since the overlapping prediction row can be detected before the event signal or the like is generated, the influence of the interference can be reduced by avoiding the generation of the grayscale signal and the generation of the event signal of the overlapping prediction row. An example of this case will be described in a third embodiment of the present disclosure.

The overlapping row prediction section 81 stores the information of the overlapping prediction row detected from the on-event detection signal, the off-event detection signal, and the grayscale address signal in the storage section (#1) 82. Further, the overlapping row prediction section 81 generates an interference occurrence flag based on the information of the detected overlapping prediction row and outputs the interference occurrence flag to the event signal processing section 60.

Further, the overlapping row prediction section 81 stores the information of the overlapping prediction row detected from the AZ control signal and the grayscale address signal in the storage section (#2) 83. In a case where the AZ operation is affected by interference, the event signal for the next frame period is affected. Therefore, the information on the overlapping prediction row in this case is held in the storage section (#2) 83 different from the storage section (#1) 82. When shifting to the next frame period, the overlapping row prediction section 81 generates an interference occurrence flag based on the information of the overlapping prediction row stored in the storage section (#2) 83 and outputs the interference occurrence flag to the event signal processing section 60.

[Event Data]

Figure 10:
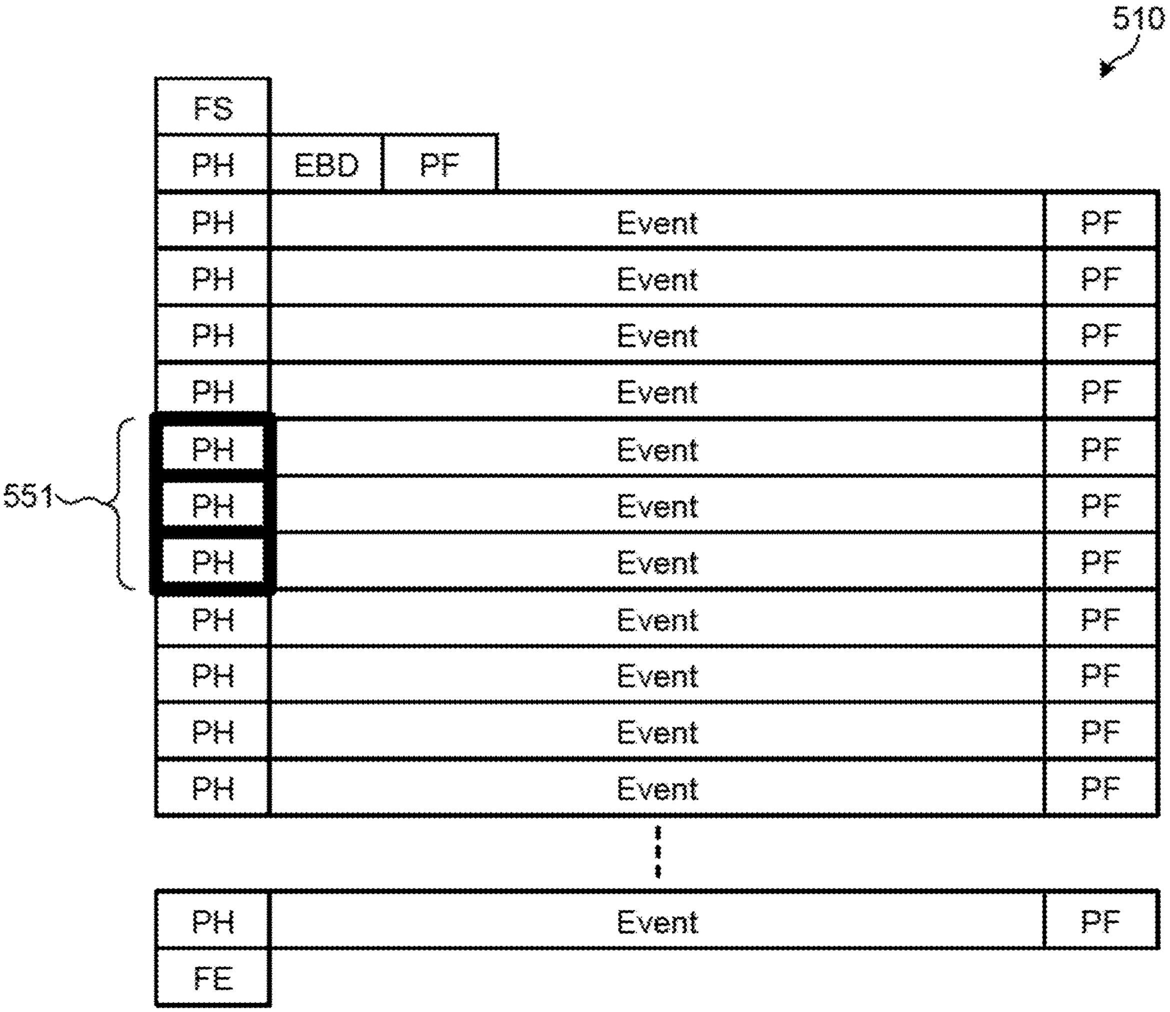
FIG. 10 is a diagram illustrating an example of event data according to the first embodiment of the present disclosure.

FIG. 10 is a diagram illustrating an example of event data according to the first embodiment of the present disclosure. The figure is a diagram illustrating an example of event data generated by the event signal processing section 60. Furthermore, the figure illustrates a frame 510 of event data in one frame period. "FS" in the figure is a block indicating the start of a frame. "FE" is a block indicating the end of the frame. "PH" is a block indicating a header of a packet. "PF" is a block indicating a footer of the packet. "EBD" is a block indicating embedded data. "Event" is a block in which an event signal for each row is held. "Event" is arranged between "PH" and "PF". Note that a region 551 in the figure represents a region of data of a row corresponding to the overlapping prediction row 500.

In "Event" corresponding to the region 551 in the figure, an event signal affected by interference is stored. Therefore, an interference occurrence flag is added to "PH" of "Event". A bold rectangle in the figure represents "PH" to which an interference occurrence flag is added. As a result, data affected by interference can be identified. Data identified at the device using the event data can be removed. For example, the event signal processing section 60 adds mask information to "PH" of a row based on the interference occurrence flag output from the overlapping prediction row detecting section 80. Note that the interference occurrence flag can also be arranged on "PF" side. Note that the interference occurrence flag is an example of information indicating the overlapping prediction row.

[Overlapping Row Detection Processing]

Figure 11:
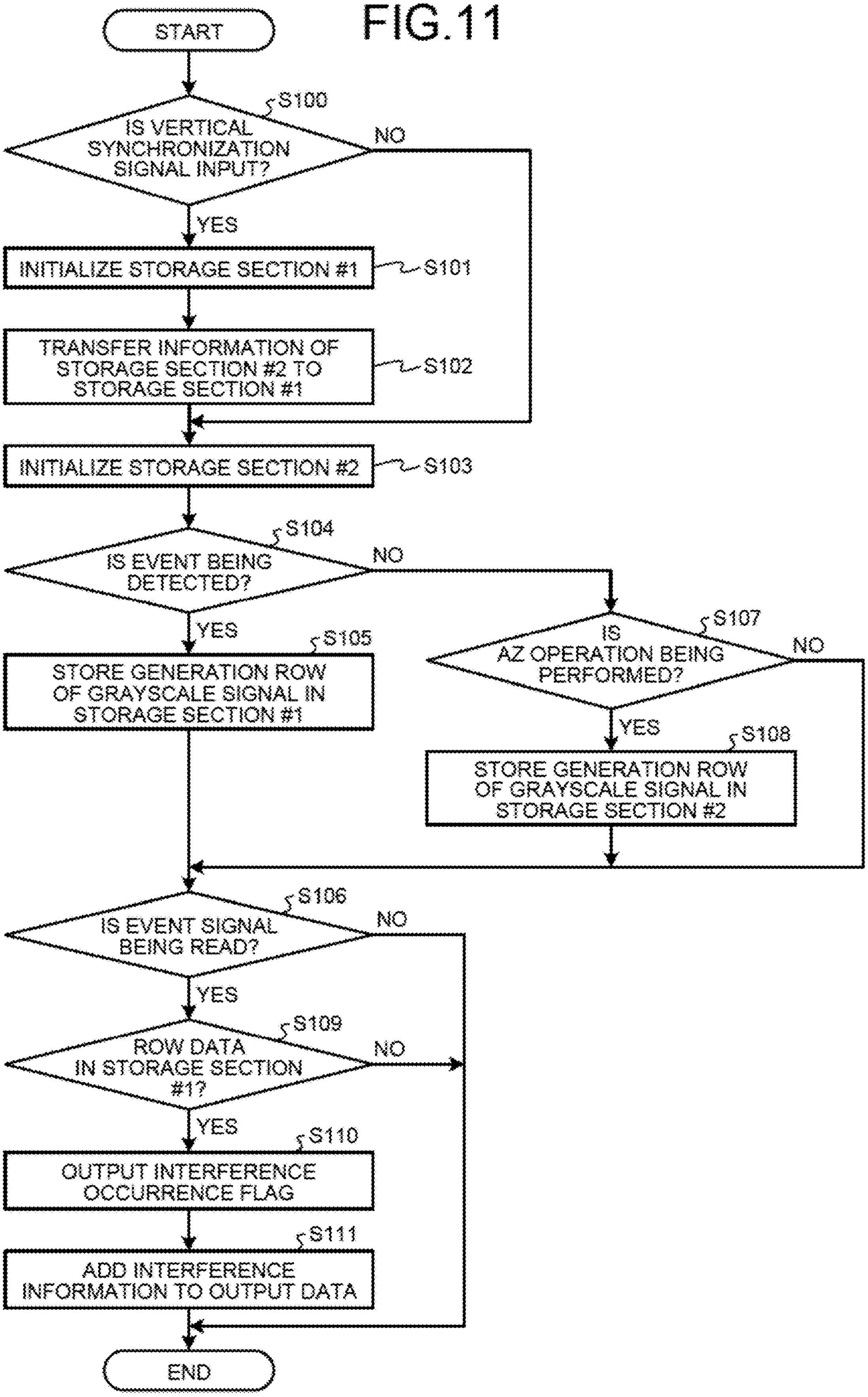
FIG. 11 is a diagram illustrating an example of a processing procedure of overlapping row detection processing according to the first embodiment of the present disclosure.

FIG. 11 is a diagram illustrating an example of a processing procedure of overlapping row detection processing according to the first embodiment of the present disclosure. First, the overlapping row prediction section 81 determines whether a vertical synchronization signal indicating the start of a frame period has been input (step S100). In a case where the vertical synchronization signal is not input (step S110, No), the overlapping row prediction section 81 proceeds to the processing of step S103. On the other hand, in a case where the vertical synchronization signal has been input (step S100, Yes), the overlapping row prediction section 81 initializes the storage section (#1) 82 (step S101). Next, the overlapping row prediction section 81 transfers the information in the storage section (#2) to the storage section (#1) (step S102), and proceeds to the processing of step S103. In step S103, the overlapping row prediction section 81 initializes the storage section (#2) 83 (step S103).

Next, the overlapping row prediction section 81 determines whether an event is being detected (step S104). In a case where an event is being detected (step S104, Yes), the overlapping row prediction section 81 stores the row for which the grayscale signal is generated in the storage section (#1) 82 (step S105), and proceeds to the processing of step S106. On the other hand, in a case where an event is not being detected (step S104, No), the overlapping row prediction section 81 determines whether the AZ operation is being performed (step S107). In a case where the AZ operation is not being performed (step S107, No), the overlapping row prediction section 81 proceeds to the processing of step S106. On the other hand, during the AZ operation (step S107, Yes), the overlapping row prediction section 81 stores the row for generating the grayscale signal in the storage section (#2) 82 (step S108), and proceeds to the processing of step S106.

In step S106, the overlapping row prediction section 81 determines whether an event signal is being read (step S106). In a case where the event signal is not being read (step S106, No), the overlapping row prediction section 81 ends the processing. On the other hand, in a case where an event signal is being read (step S106, Yes), the overlapping row prediction section 81 determines whether row data is stored in the storage section (#1) 82 (step S109). In a case where the row data is not stored in the storage section (#1) 82 (step S109, No), the Overlapping row prediction section 81 ends the processing.

On the other hand, in a case where row data is stored in the storage section (#1) 82 (step S109, Yes), the overlapping row prediction section 81 outputs an interference occurrence flag to the event signal processing section 60 (step S110). Next, the event signal processing section 60 adds the interference information to the output data (step S111).

As described above, the photodetection device 1 according to the first embodiment of the present disclosure detects the overlapping prediction row, which is a row in which the overlapping in the periods of generation of the grayscale signal and detection of the event is predicted, and adds the information indicating the occurrence of the interference to the event data including the event signal of the row. This can avoid use of an event signal affected by interference, and can reduce interference effects.

[Modifications]

In the above embodiment, the information indicating the occurrence of the interference is added to the event data including the event signal of the overlapping prediction row. However, the information indicating the occurrence of the interference may be added to the grayscale data including the grayscale signal of the overlapping prediction row. Specifically, the overlapping prediction row detecting section 80 in FIG. 1 outputs the interference occurrence flag to the grayscale signal processing section 70. The grayscale signal processing section 70 that has received the interference occurrence flag performs control to add information indicating occurrence of interference to grayscale data including the grayscale signal of the overlapping prediction row. For example, the grayscale signal processing section 70 can add the interference occurrence flag to "PH" of the data region of the row corresponding to the overlapping prediction row 500 in a frame 520 of the grayscale data illustrated in FIG. 19 to be described later. This makes it possible to avoid the use of a grayscale signal affected by interference. Note that information indicating the occurrence of interference can be added to both the event data and the grayscale signal of the overlapping prediction TOW.

2. Second Embodiment

The photodetection device 1 of the first embodiment described above adds the interference occurrence flag to the event data based on the event signal of the overlapping prediction row and outputs the event data. On the other hand, a photodetection device 1 according to a second embodiment of the present disclosure is different from that of the first embodiment described above in that generation of an event signal of an overlapping prediction row is stopped.

In the photodetection device 1 according to the second embodiment of the present disclosure, the overlapping prediction row detecting section 80 outputs information of the overlapping prediction row to the timing control section 50. The timing control section 50 stops the control of reading the event signals in the pixels 100 of the overlapping prediction row on the basis of the information of the overlapping prediction row from the overlapping prediction row detecting section 80.

[Generation of Grayscale Signal and Event Signal]

Figure 12:
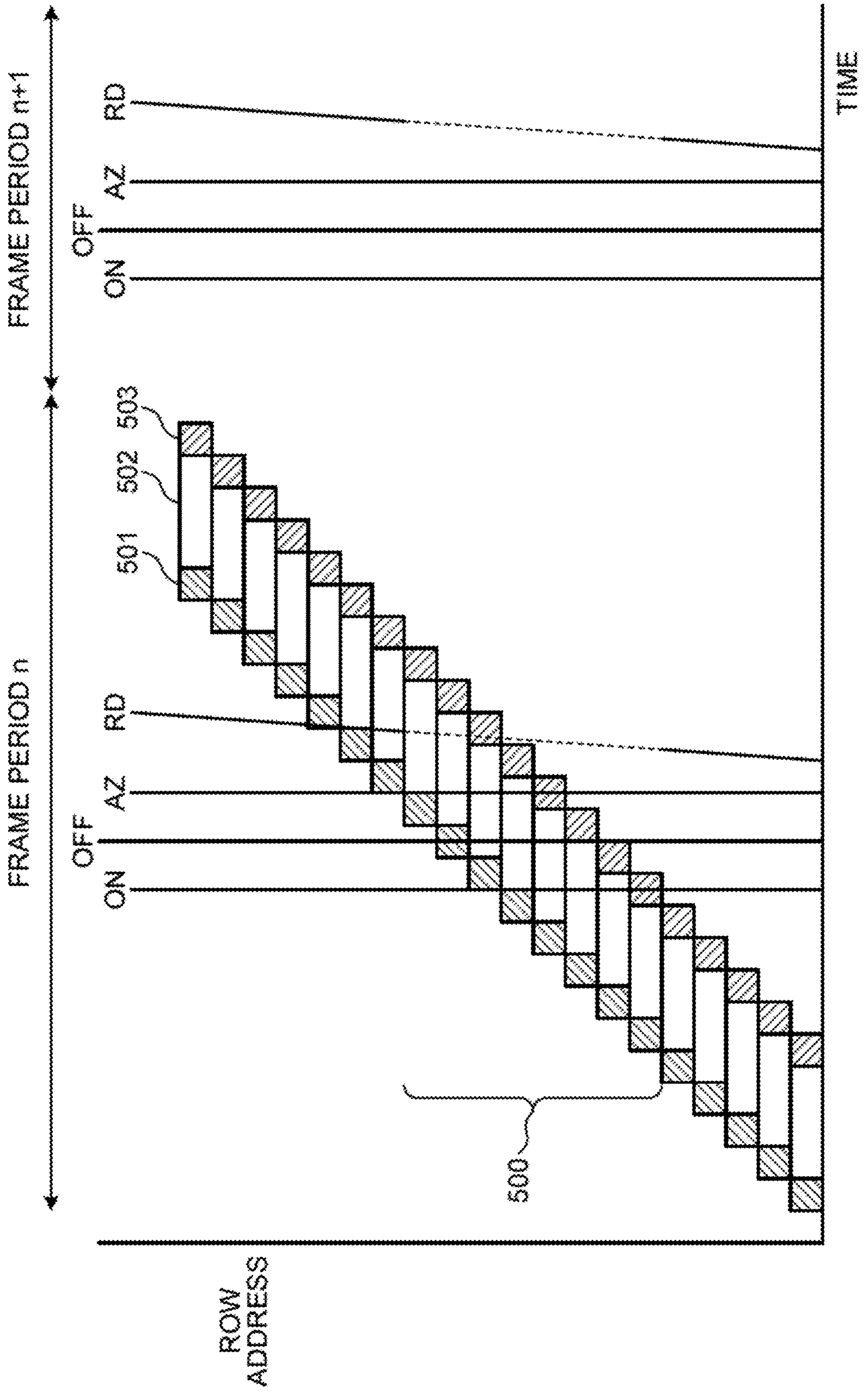
FIG. 12 is a diagram illustrating an example of generation of a grayscale signal and an event signal according to a second embodiment of the present disclosure.

FIG. 12 is a diagram illustrating an example of generation of a grayscale signal and an event signal according to the second embodiment of the present disclosure. Similarly to FIG. 8, the figure is a timing chart illustrating an example of generation of a grayscale signal and an event signal. Note that, in the figure, the frame period n and the frame period n+1 adjacent to each other are illustrated. The procedure of the event signal generation in the figure is different from the procedure of the event signal generation in FIG. 8 in that the reading of the event signal of the pixel 100 of the overlapping prediction row 500 is stopped. A dotted line portion of a line representing the timing of the event signal output (RD) in the figure represents a portion where the event signal is not read.

In the frame period n in the figure, a period for generating a grayscale signal and an event detection period (on-event detection, off-event detection, and AZ operation) overlap. Then, the overlapping prediction row detecting section 80 detects the overlapping prediction row 500, generates information of the overlapping prediction row, and outputs the information to the timing control section 50. The timing control section 50 stops outputting the event read signal of the row on the basis of the information of the overlapping prediction row. As a result, reading of the event signal in the pixel 100 included in the overlapping prediction row 500 is stopped. Furthermore, only the event signals are read out from the pixels 100 other than the overlapping prediction row 500.

That is, the event signal of the pixel 100 in the overlapping prediction row 500 is skipped.

Note that, when the processing shifts to the frame period n+1, the overlapping prediction row detecting section 80 generates information of the overlapping prediction row on the basis of the overlapping prediction row (overlapping prediction row 500) detected in the frame period n, and outputs the information to the timing control section 50. This is because no interference occurs in the frame period n+1, but the event signal is affected by the interference because the grayscale signal is generated during the AZ operation in the frame period n. Therefore, even in the frame period n+1, the output of the event read signal of the row included in the overlapping prediction row 500 is stopped.

[Event Data]

Figure 13A:
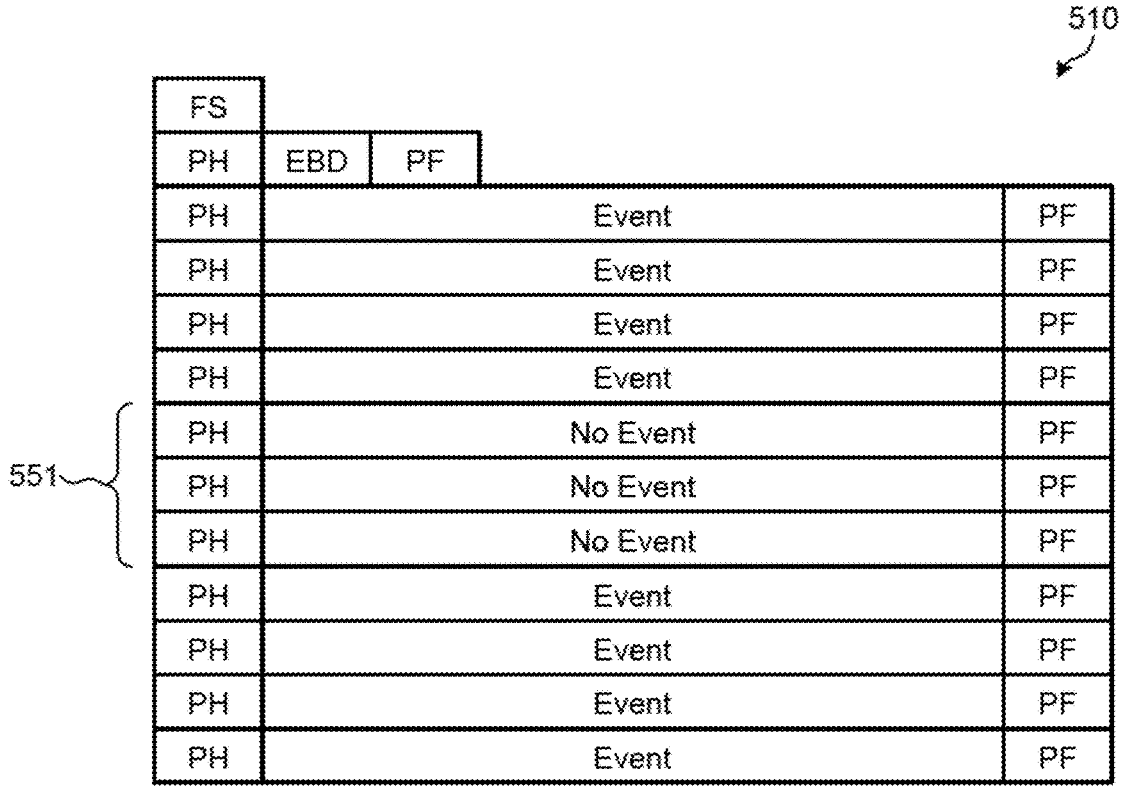
FIG. 13A is a diagram illustrating an example of event data according to the second embodiment of the present disclosure.
Figure 13B:
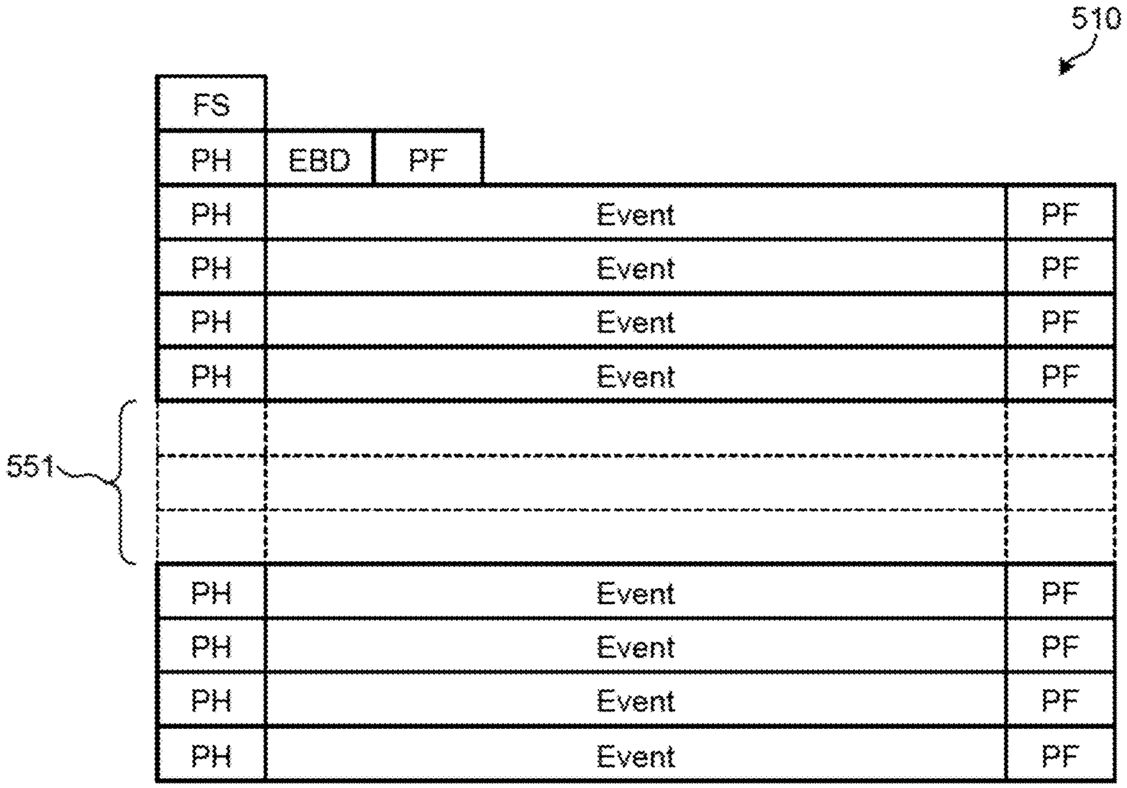
FIG. 13B is a diagram illustrating an example of event data according to the second embodiment of the present disclosure.

FIGS. 13A and 13B are diagrams illustrating an example of event data according to the second embodiment of the present disclosure. Similarly to FIG. 10, the figure is a diagram illustrating an example of event data generated by the event signal processing section 60. As described above, in the second embodiment of the present disclosure, reading of the event signal of the overlapping prediction row is stopped, and a loss occurs in the event data of the row.

FIG. 13A illustrates an example in which "No Event" which is data indicating that no event has occurred is arranged in the data region 551 of the row corresponding to the overlapping prediction row 500 of the frame 510. Note that, in the frame 510 in the figure, it is not necessary to add an interference occurrence flag to "PH" or "PE".

FIG. 13B illustrates an example in a case where the event data in the region 551 is deleted. In addition, "PH" and "PF" of the region are also deleted. By adopting this configuration, the frame 510 can be reduced.

[Modifications]

In the second embodiment described above, reading of the event signal of the overlapping prediction row is stopped. On the other hand, it is also possible to adopt a method of reading the event signal of the pixel 100 of the overlapping prediction row and stopping the output of the read event signal as the event data.

Figure 14:
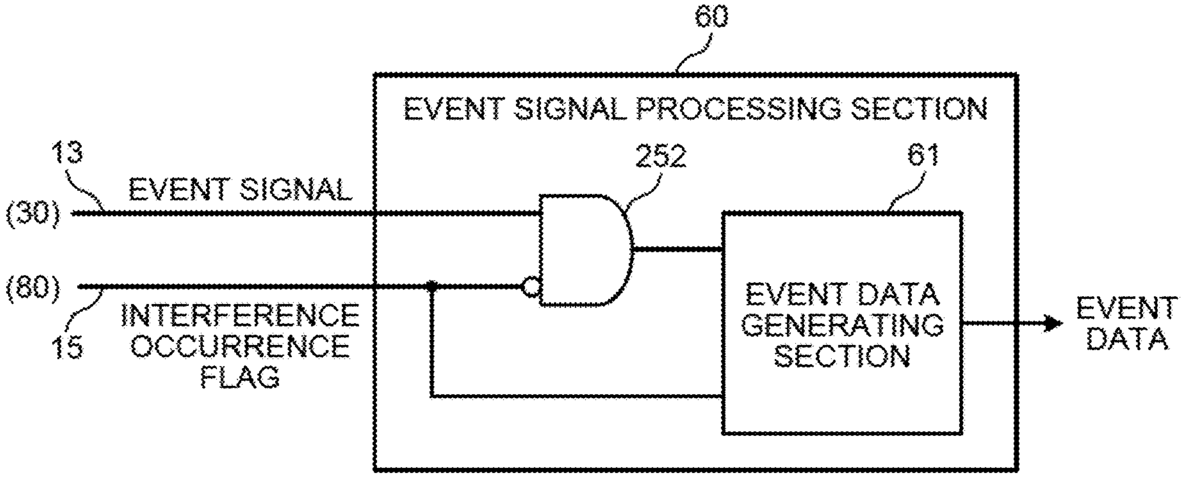
FIG. 14 is a diagram illustrating a configuration example of an event signal processing section according to a modification of the second embodiment of the present disclosure.

FIG. 14 is a diagram illustrating a configuration example of an event signal processing section according to a modification of the second embodiment of the present disclosure. The figure is a block diagram illustrating a configuration example of the event signal processing section 60. The event signal processing section 60 in the figure includes an AND gate 252 and an event data generating section 61. The AND gate 252 is a gate that masks the event signal on the basis of the interference occurrence flag from the overlapping prediction row detecting section 80. Note that, of the input terminals of the AND gate 252, the input terminal to which the interference occurrence flag is input is configured as negative logic. Therefore, during the period in which the interference occurrence flag is the value "1", the output of the AND gate 252 is fixed to the value "0", and the event signal is masked. The output of the AND gate 252 is input to the event data generating section 61.

The event data generating section 61 generates event data from the event signal. The event signal and the interference occurrence flag which are not masked by the interference occurrence flag are input to the event data generating section 61. Furthermore, the event data generating section 61 can generate event data in the format of a frame 510 in FIG. 13A.

Since the configuration of the photodetection device 1 other than this is similar to the configuration of the photodetection device 1 in the first embodiment of the present disclosure, the description thereof will be omitted.

As described above, the photodetection device 1 according to the second embodiment of the present disclosure stops reading the event signal of the overlapping prediction row. As a result, the output of the event signal affected by the interference can be stopped.

3. Third Embodiment

The photodetection device 1 of the second embodiment described above stops reading the event signal of the overlapping prediction row. On the other hand, a photodetection device 1 according to a third embodiment of the present disclosure is different from the photodetection device 1 according to the second embodiment described above in that detection of an event in an overlapping prediction row is stopped.

Also in the photodetection device 1 according to the third embodiment of the present disclosure, similarly to the second embodiment described above, a configuration is adopted in which the overlapping prediction row detecting section 80 outputs the information of the overlapping prediction row to the timing control section 50. However, the timing control section 50 of the third embodiment of the present disclosure stops the control to detect the event in the pixel 100 of the overlapping prediction row on the basis of the information of the overlapping prediction row from the overlapping prediction row detecting section 80.

[Generation of Grayscale Signal and Event Signal]

Figure 15A:
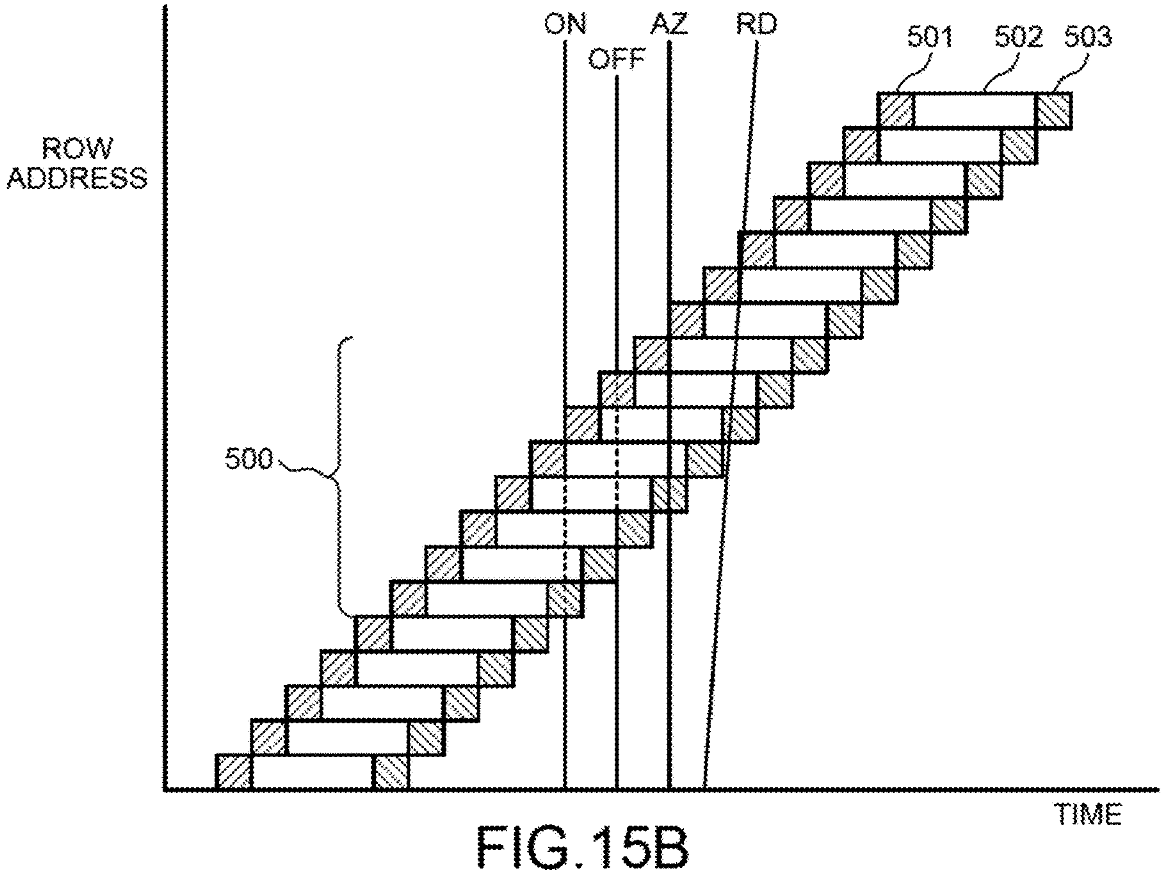
FIG. 15A is a diagram illustrating an example of generation of a grayscale signal and an event signal according to a third embodiment of the present disclosure.
Figure 15B:
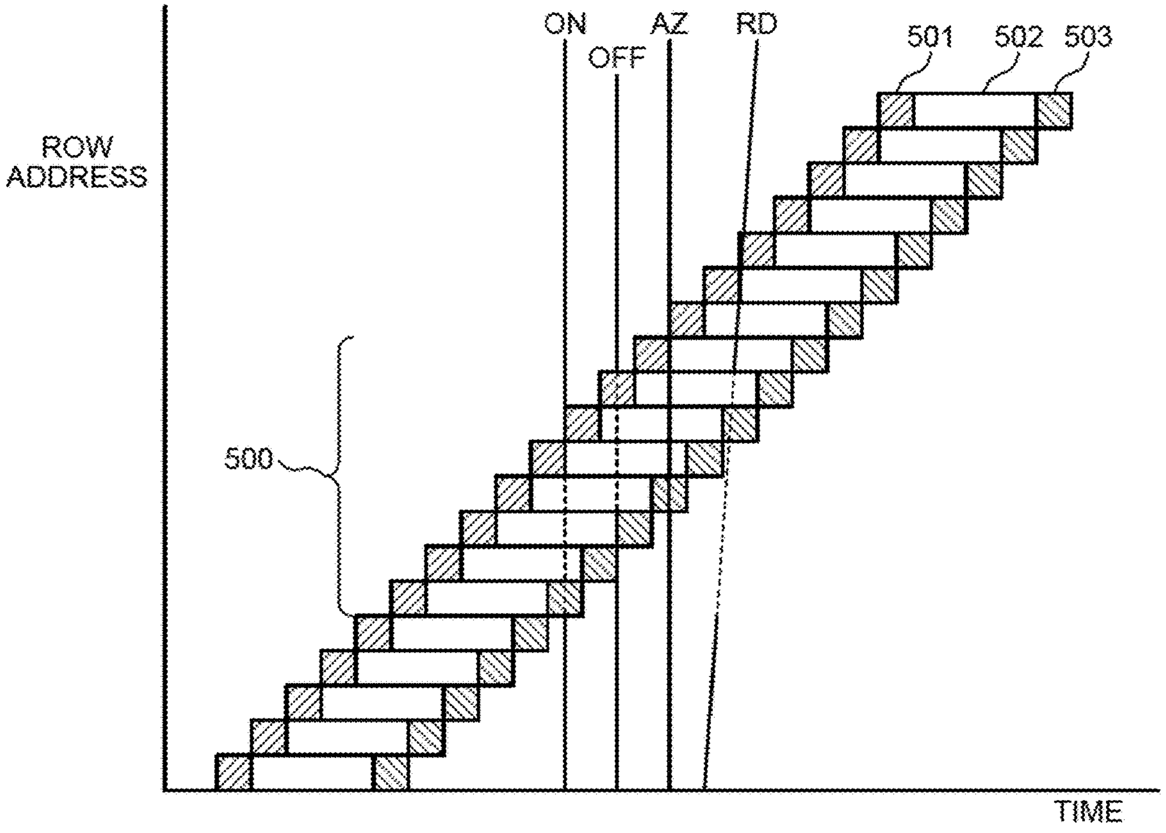
FIG. 15B is a diagram illustrating an example of generation of a grayscale signal and an event signal according to the third embodiment of the present disclosure.

FIGS. 15A and 15B are diagrams illustrating an example of generation of a grayscale signal and an event signal according to the third embodiment of the present disclosure. The figure is a timing chart illustrating an example of generation of a grayscale signal and an event signal similarly to FIG. 12. The procedure of the event signal generation in the figure is different from the procedure of the event signal generation in FIG. 12 in that the detection of the event of the pixel 100 of the overlapping prediction row 500 is stopped.

In FIG. 15A, dotted line portions of lines representing the timings of the on-event detection (ON) and the off-event detection (OFF) represent portions where the on-event detection and the off-event detection are not performed, respectively. As illustrated in the figure, the detection of the on-event and the detection of the off-event in the pixel 100 of the overlapping prediction row 500 are stopped. The timing control section 50 of the third embodiment of the present disclosure stops the output of the on-event detection signal and the off-event detection signal of the row on the basis of the information of the overlapping prediction row. As a result, the detection of the event in the pixel 100 included in the overlapping prediction row 500 is stopped.

FIG. 15B illustrates an example of a case where the reading of the event signal is stopped in addition to the detection of the event of the pixel 100 in the overlapping prediction row 500. As a result, interference with the grayscale signal can be further reduced.

The configuration of the photodetection device 1 other than this is similar to the configuration of the photodetection device 1 in the second embodiment of the present disclosure, and thus the description thereof will be omitted.

As described above, the photodetection device 1 according to the third embodiment of the present disclosure stops the detection of the event of the overlapping prediction row. As a result, the output of the event signal affected by the interference can be stopped, and the occurrence of interference with the grayscale signal can be reduced.

4. Fourth Embodiment

The photodetection device 1 of the second embodiment described above stops reading the event signal of the overlapping prediction row. On the other hand, a photodetection device 1 according to a fourth embodiment of the present disclosure is different from that of the above-described second embodiment in that generation of a grayscale signal of an overlapping prediction row is stopped.

[Configuration of Photodetection Device]

Figure 16:
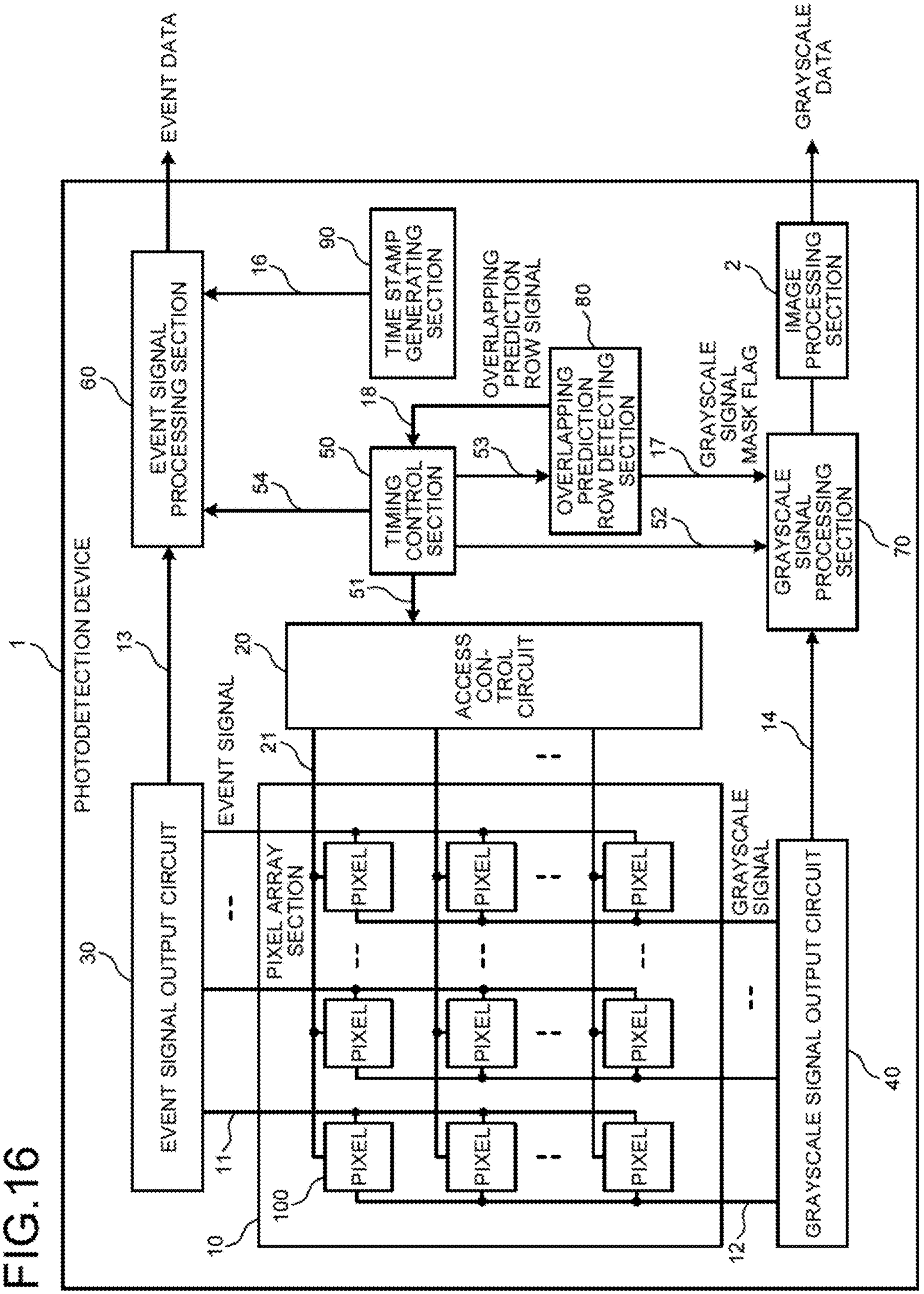
FIG. 16 is a diagram illustrating a configuration example of a photodetection device according to a fourth embodiment of the present disclosure.

FIG. 16 is a diagram illustrating a configuration example of a photodetection device according to the fourth embodiment of the present disclosure. The figure is a block diagram illustrating a configuration example of the photodetection device 1 similarly to FIG. 1. The overlapping prediction row detecting section 80 of the photodetection device 1 of the figure is different from the photodetection device 1 of FIG. 1 in that information (overlapping prediction row signal) of the overlapping prediction row is output to the timing control section 50, and a grayscale signal mask flag based on the information of the overlapping prediction row is output to the grayscale signal processing section 70.

The overlapping prediction row detecting section 80 in the figure outputs an overlapping prediction row signal based on the detected overlapping prediction row to the timing control section 50. In addition, the overlapping prediction row detecting section 80 in the figure generates a grayscale signal mask flag on the basis of the information of the overlapping prediction row and outputs the grayscale signal mask flag to the grayscale signal processing section 70.

The timing control section 50 in the figure stops generation of the control signal for generating the grayscale signal of the pixel 100 of the overlapping prediction row on the basis of the overlapping prediction row signal corresponding to the information of the Overlapping prediction row.

The grayscale signal processing section 70 in the figure generates grayscale data on the basis of the grayscale signal mask flag.

[Configuration of Timing Control Section]

Figure 17:
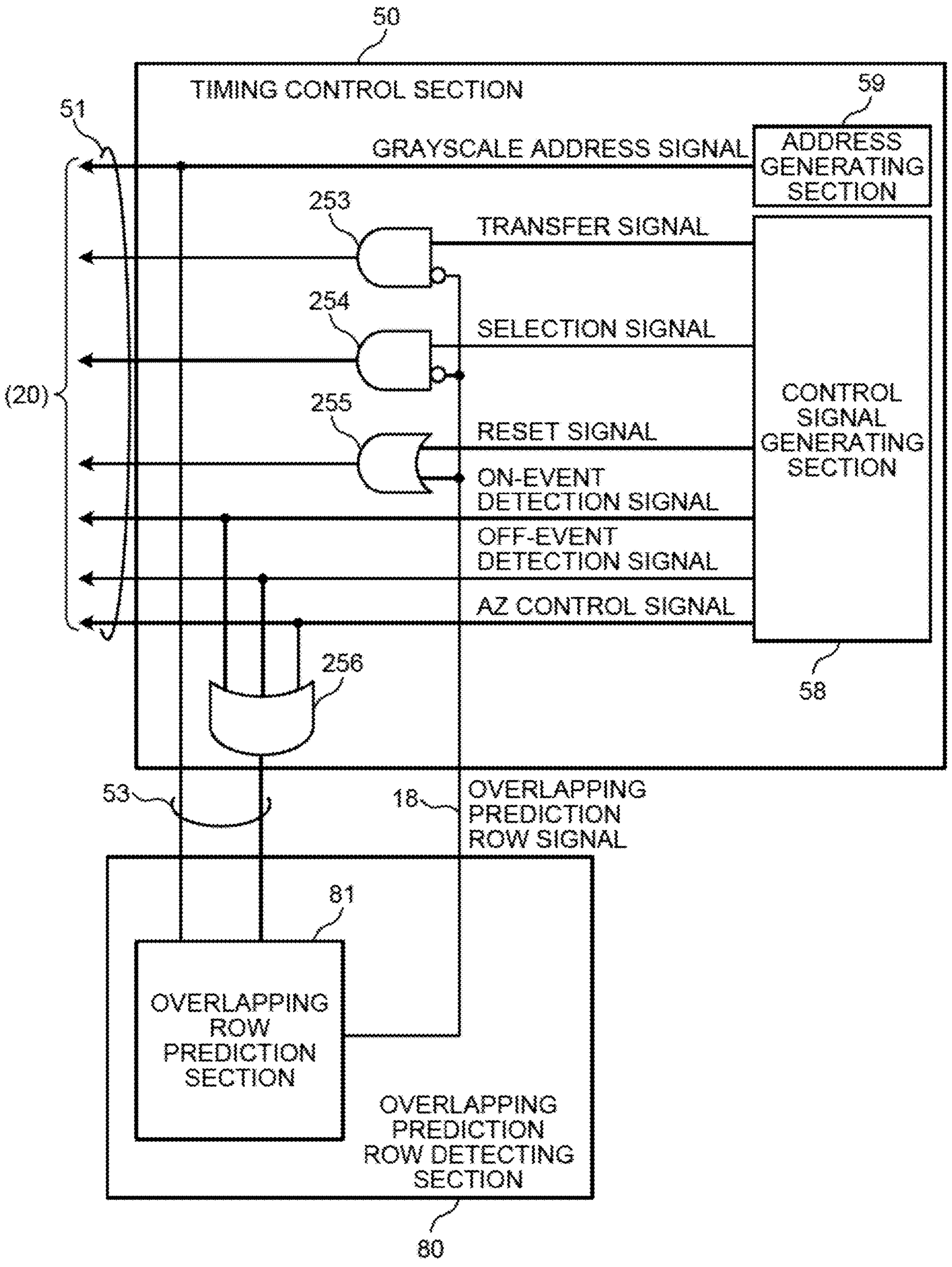
FIG. 17 is a diagram illustrating a configuration example of a timing control section according to the fourth embodiment of the present disclosure.

FIG. 17 is a diagram illustrating a configuration example of the timing control section according to the fourth embodiment of the present disclosure. The figure is a block diagram illustrating a configuration example of the timing control section 50 in the fourth embodiment of the present disclosure. Note that the figure further illustrates the overlapping prediction row detecting section 80 of the fourth embodiment of the present disclosure.

The timing control section 50 in the figure includes an address generating section 59, a control signal generating section 58, AND gates 253 and 254, and OR gates 255 and 256. In addition, the timing control section 50 inputs the overlapping prediction row signal from the overlapping prediction row detecting section 80. The address generating section 59 generates a grayscale address signal. The grayscale address signal is a signal representing a row for generating a grayscale signal. The control signal generating section 58 generates a transfer signal, a selection signal, and a reset signal. In addition, the control signal generating section 58 further generates an on-event detection signal, an off-event detection signal, and an AZ control signal.

The AND gate 253 is a gate for masking the transfer signal with the overlapping prediction row signal. The AND gate 254 is a gate for masking the selection signal with the overlapping prediction row signal. The OR gate 255 is a gate for masking the reset signal with the overlapping prediction row signal. A transfer signal, a selection signal, and a reset signal, which are masked by the grayscale address signal and the overlapping prediction row signal, respectively, are output to the access control circuit 20 via a signal line 51.

The OR gate 256 is a gate that performs a logical sum operation of the on-event detection signal, the off-event detection signal, and the AZ control signal. The output signal of the OR gate 256 is output to the overlapping row prediction section 81 of the overlapping prediction row detecting section 80. Further, a grayscale address signal is further output to the overlapping row prediction section 81. The overlapping row prediction section 81 in the figure detects the overlapping prediction row from the grayscale address signal in the period in which the signal of the result of the logical sum operation of the on-event detection signal, the off-event detection signal, and the AZ control signal has the value “1”. Then, the overlapping row prediction section 81 generates an overlapping prediction row signal which is a signal corresponding to the detection of the overlapping prediction row, and outputs the overlapping prediction row signal to the timing control section 50 via a signal line 18. The overlapping row prediction signal in the figure is assumed to be a positive logic signal. Note that the overlapping prediction row signal is an example of information of the overlapping prediction row.

[Generation of Grayscale Signal and Event Signal]

Figure 18A:
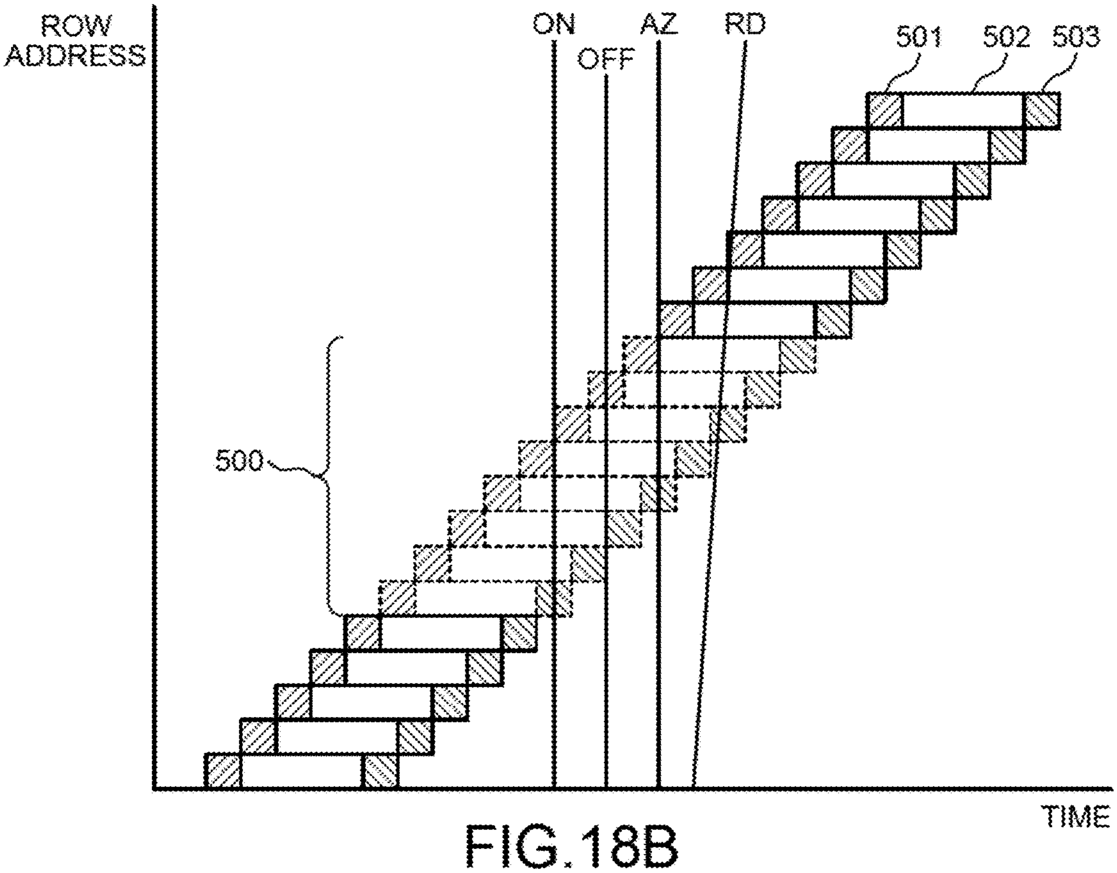
FIG. 18A is a diagram illustrating an example of generation of a grayscale signal and an event signal according to the fourth embodiment of the present disclosure.
Figure 18B:
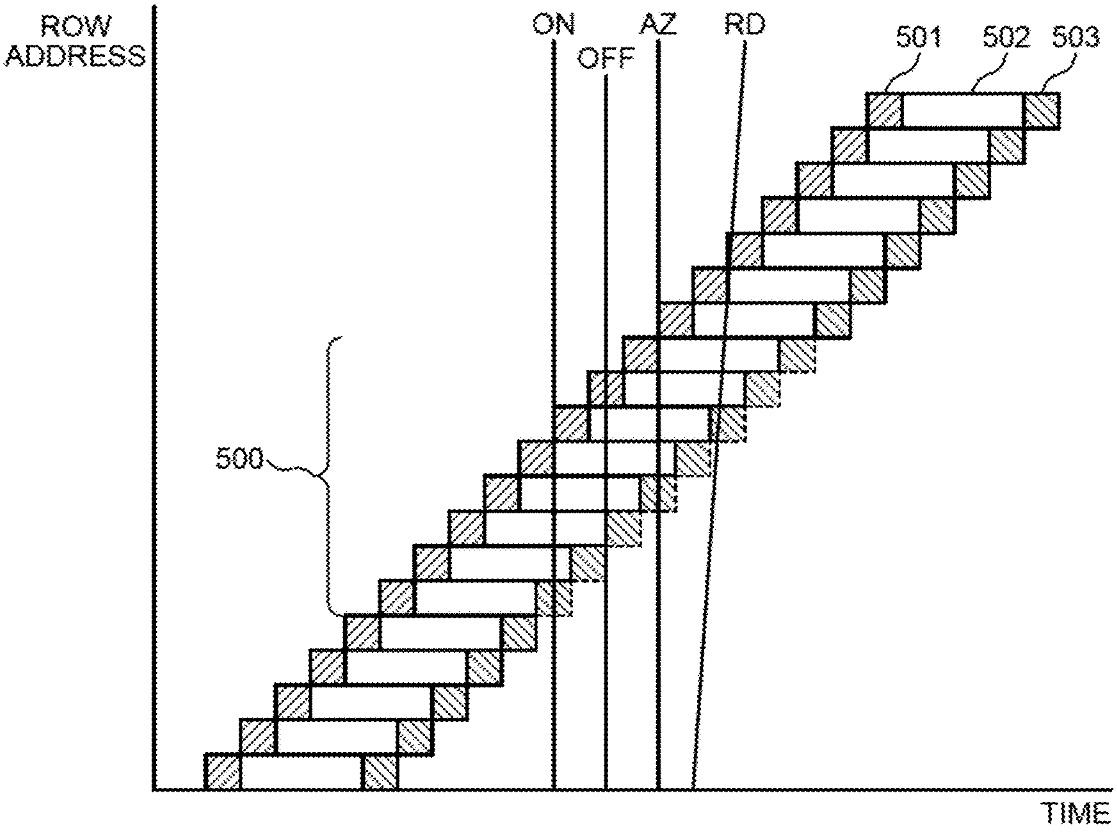
FIG. 18B is a diagram illustrating an example of generation of a grayscale signal and an event signal according to the fourth embodiment of the present disclosure.

FIGS. 18A and 18B are diagrams illustrating an example of generation of a grayscale signal and an event signal according to the fourth embodiment of the present disclosure. The figure is a timing chart illustrating an example of generation of a grayscale signal and an event signal similarly to FIG. 12. The procedure of the event signal generation in the figure is different from the procedure of the event signal generation in FIG. 12 in that the generation of the grayscale signal of the pixel 100 of the overlapping prediction row 500 is stopped. Among the rectangles representing the shutter 501, the exposure 502, and the reading 503 in the figure, a dotted rectangle portion represents a portion where the processing procedure is not performed.

FIG. 18A illustrates an example of a case where the shutter 501 and the reading 503 of the overlapping prediction row 500 are stopped. The timing control section 50 stops outputting the reset signal, the transfer signal, and the selection signal in the pixel 100 included in the overlapping prediction row 500. As a result, generation and reading of the grayscale signal in the pixel 100 included in the overlapping prediction row 500 are stopped.

FIG. 18B illustrates an example of a case where the reading 503 of the overlapping prediction row 500 is stopped. In this case, the timing control section 50 stops outputting the transfer signal and the selection signal in the pixel 100 included in the overlapping prediction row 500. As a result, similarly to the case of FIG. 18A, generation and reading of the grayscale signal in the pixel 100 included in the overlapping prediction row 500 are stopped.

[grayscale Data]

Figure 19:
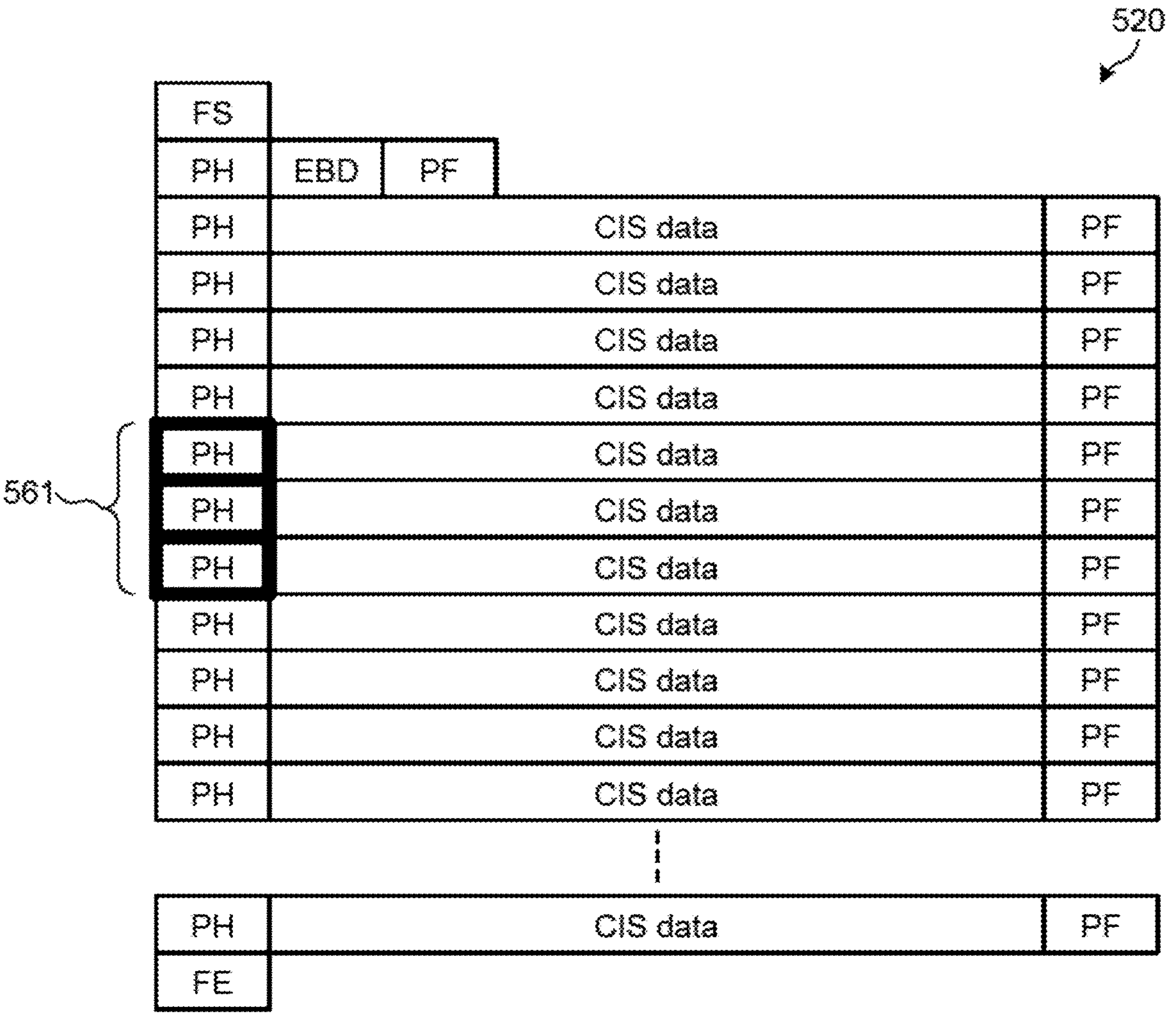
FIG. 19 is a diagram illustrating an example of grayscale data according to the fourth embodiment of the present disclosure.

FIG. 19 is a diagram illustrating an example of grayscale data according to the fourth embodiment of the present disclosure. The figure is a diagram illustrating an example of grayscale data generated by the grayscale signal processing section 70. The figure illustrates a frame 520 of grayscale data of one frame period. “CIS data” in the figure is a block that holds a grayscale signal for each row. Note that a region 561 in the figure represents a region of data of a row corresponding to the overlapping prediction row 500. Otherwise, the same notation as that of the frame 510 of the event data in FIG. 10 is used.

In the figure, invalid data is stored in “CIS data” corresponding to the region 561. Therefore, mask information is added to “PH” of “CIS data”. A bold rectangle in the figure represents “PH” to which the mask information is added. As a result, invalid data can be identified, and data identified in a device using the grayscale data can be removed. The grayscale signal processing section 70 adds mask information to “PH” of a row based on the grayscale signal mask flag output from the overlapping prediction row detecting section 80. Note that the mask information can also be arranged on “PF” side.

Further, the grayscale signal processing section 70 can further add mask information to data of peripheral rows of the overlapping prediction row. Note that the mask information is an example of information of the overlapping prediction row.

The configuration of the photodetection device 1 other than this is similar to the configuration of the photodetection device 1 in the second embodiment of the present disclosure, and thus the description thereof will be omitted.

As described above, the photodetection device 1 according to the fourth embodiment of the present disclosure stops generation of the grayscale signal of the overlapping prediction row. As a result, the output of the grayscale signal affected by the interference can be stopped, and the occurrence of the interference with the event signal can be reduced.

5. Fifth Embodiment

The photodetection device 1 of the fourth embodiment described above has stopped generating the grayscale signal of the overlapping prediction row. On the other hand, a photodetection device 1 according to a fifth embodiment of the present disclosure is different from that of the above-described fourth embodiment in that generation of grayscale signals is continued in pixels in a row different from an overlapping prediction row.

[Configuration of Pixel Array Section]

Figure 20:
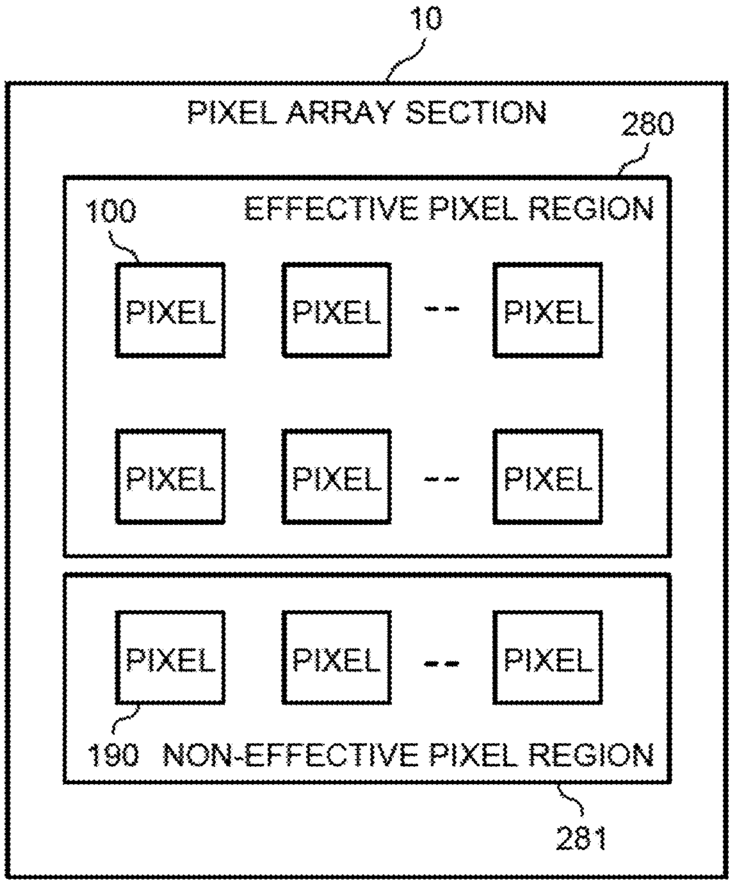
FIG. 20 is a diagram illustrating a configuration example of a pixel array section according to a fifth embodiment of the present disclosure.

FIG. 20 is a diagram illustrating a configuration example of a pixel array section according to the fifth embodiment of the present disclosure. The figure is a block diagram illustrating a configuration example of the pixel array section 10. The pixel array section 10 in the figure includes an effective pixel region 280 and a non-effective pixel region 281. The effective pixel region 280 is a region in which pixels 100 that generate grayscale signals and event signals related to grayscale data and event data that are output data of the photodetection device 1 are arranged. The effective pixel region 280 corresponds to a region in which the pixels 100 of the pixel array section 10 illustrated in FIG. 1 are arranged.

On the other hand, the non-effective pixel region 281 is a region that is so-called a dummy region and in which pixels that do not contribute to generation of output data of the photodetection device 1 are arranged. The non-effective pixel region 281 corresponds to, for example, a region of pixels arranged around the effective pixel region 280. In the non-effective pixel region 281, a second pixel 190 is arranged. The second pixel 190 is a pixel in which the grayscale signal generating section 110 is arranged but the event signal generating section 120 is not arranged. For example, a light-shielded pixel can be applied to the second pixel 190. As illustrated in the figure, in the non-effective pixel region 281, the plurality of second pixels 190 having the same number of columns as the effective pixel region 280 is arranged. Furthermore, the plurality of second pixels 190 can be arranged in one or more rows. In the fifth embodiment of the present disclosure, the grayscale signal is generated in the second pixel 190 of the non-effective pixel region 281 instead of the pixel 100 of the overlapping prediction row.

[Generation of Grayscale Signal and Event Signal]

Figure 21:
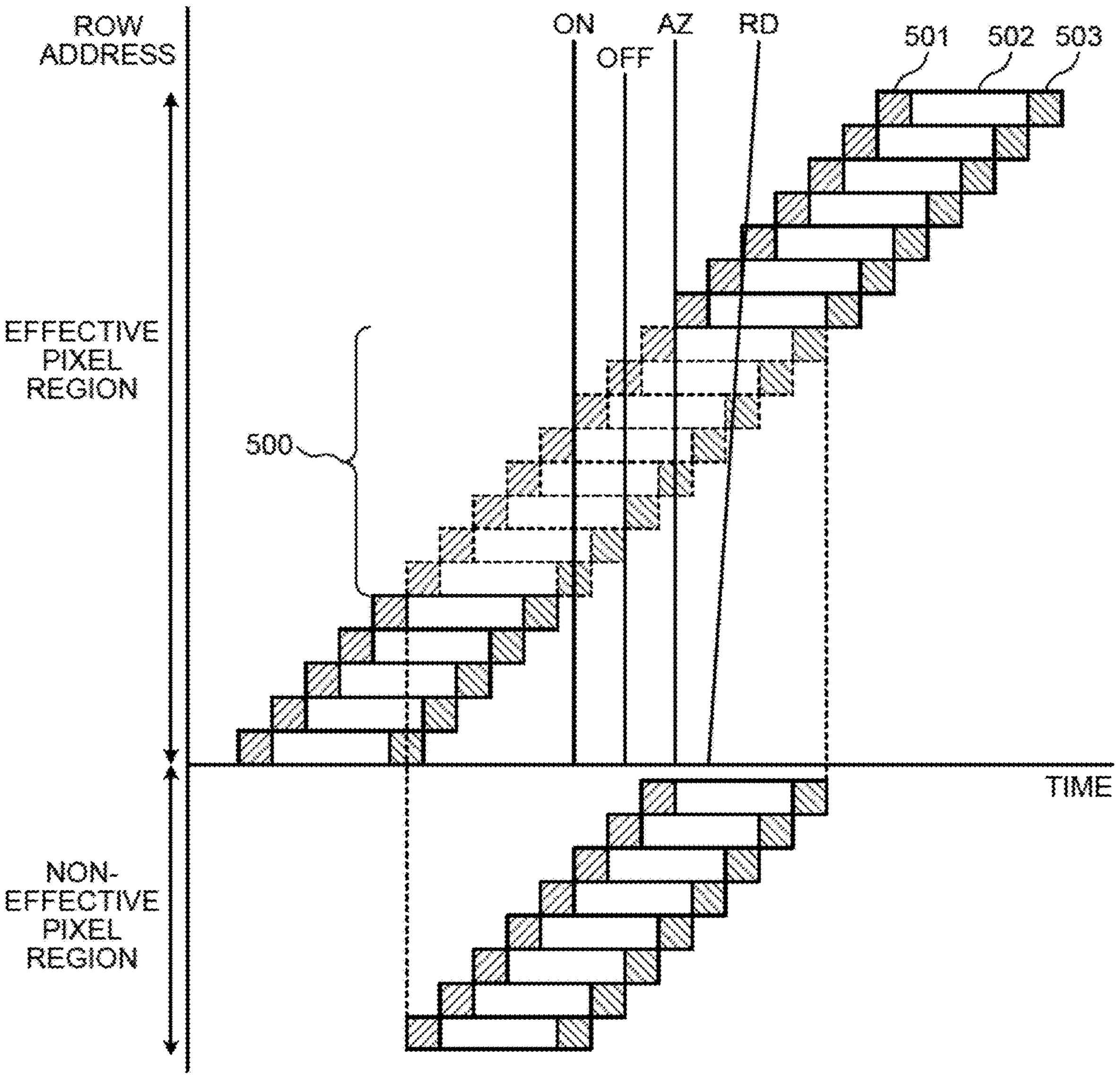
FIG. 21 is a diagram illustrating an example of generation of a grayscale signal and an event signal according to the fifth embodiment of the present disclosure.

FIG. 21 is a diagram illustrating an example of generation of a grayscale signal and an event signal according to the fifth embodiment of the present disclosure. The figure is a timing chart illustrating an example of generation of a grayscale signal and an event signal similarly to FIG. 18A. "Effective pixel region" and "non-effective pixel region" in the figure respectively represent the row addresses of the effective pixel region 280 and the non-effective pixel region 281 in FIG. 20. The procedure of generating the grayscale signal in the figure is different from the procedure of generating the grayscale signal in FIG. 18A in that the grayscale signal is generated in the second pixel 190 in the row of the non-effective pixel region 281 instead of the pixel 100 in the overlapping prediction row 500 in the effective pixel region 280.

As illustrated in the figure, by generating the grayscale signal by the second pixel 190 instead of the pixel 100 of the overlapping prediction row 500, the generation of the grayscale signal can be continued in the period related to the overlapping prediction row 400, and the interruption of the subsequent processing such as the generation processing of the grayscale data can be prevented. The generation of the grayscale signal in the row of the non-effective pixel region 281 can be performed, for example, by the timing control section 50 changing the grayscale address signal to the address signal of the row of the non-effective pixel region 281 on the basis of the information of the overlapping prediction row. Further, the overlapping prediction row detecting section 80 according to the fifth embodiment of the present disclosure can output the information of the overlapping prediction row to the grayscale signal processing section 70. In this case, the grayscale signal processing section 70 can add a flag to the target grayscale data on the basis of the information of the overlapping prediction row.

Figure 22:
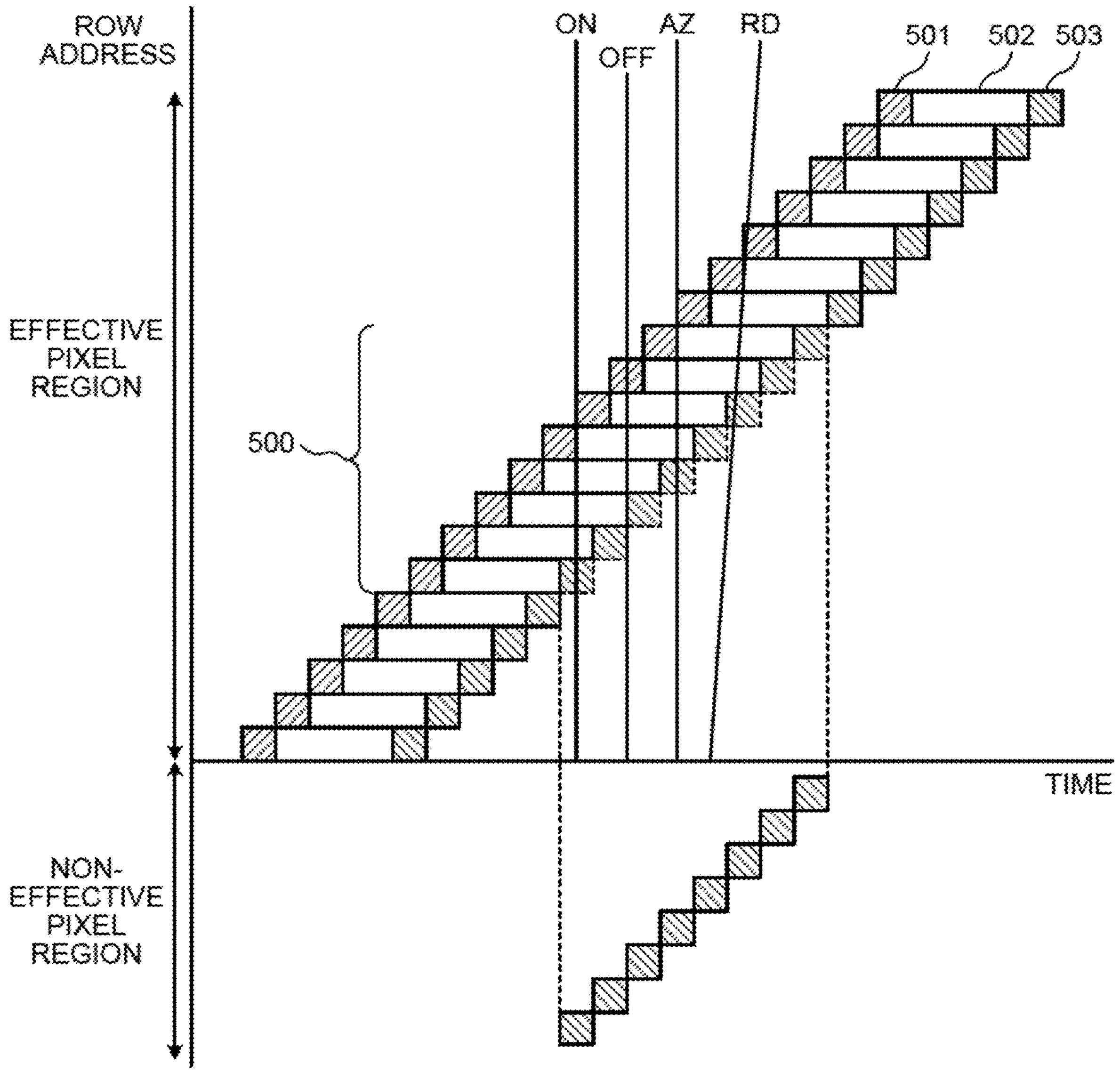
FIG. 22 is a diagram illustrating another example of generation of a grayscale signal and an event signal according to the fifth embodiment of the present disclosure.

FIG. 22 is a diagram illustrating another example of generation of the grayscale signal and the event signal according to the fifth embodiment of the present disclosure. In the procedure of generating the grayscale signal in the figure, the shutter 401 is performed in the pixel 100 of the overlapping prediction row 400. This illustrates an example of a case where the readout 403 is performed in the second pixel 190 in the row of the non-effective pixel region 281.

Since the configuration of the photodetection device 1 other than this is similar to the configuration of the photodetection device 1 in the fourth embodiment of the present disclosure, the description thereof will be omitted.

As described above, the photodetection device 1 according to the fifth embodiment of the present disclosure reads the grayscale signal of the second pixel 190 arranged in the non-effective pixel region 281 instead of the pixel 100 of the overlapping prediction row. As a result, it is possible to reduce the occurrence of interference with the event signal.

6. Sixth Embodiment

The photodetection device 1 of the above-described fifth embodiment generates the grayscale signal from the second pixel 190 of the non-effective pixel region 281 instead of the pixel 100 of the overlapping prediction row. On the other hand, a photodetection device 1 according to a sixth embodiment of the present disclosure is different from the photodetection device 1 according to the above-described fifth embodiment in that the photodetection device 1 returns to the overlapping prediction row after reading the grayscale signal from the second pixel 190 in the non-effective pixel region 281 and generates the grayscale signal of the pixel 100.

[Generation of Grayscale Signal and Event Signal]

Figure 23:
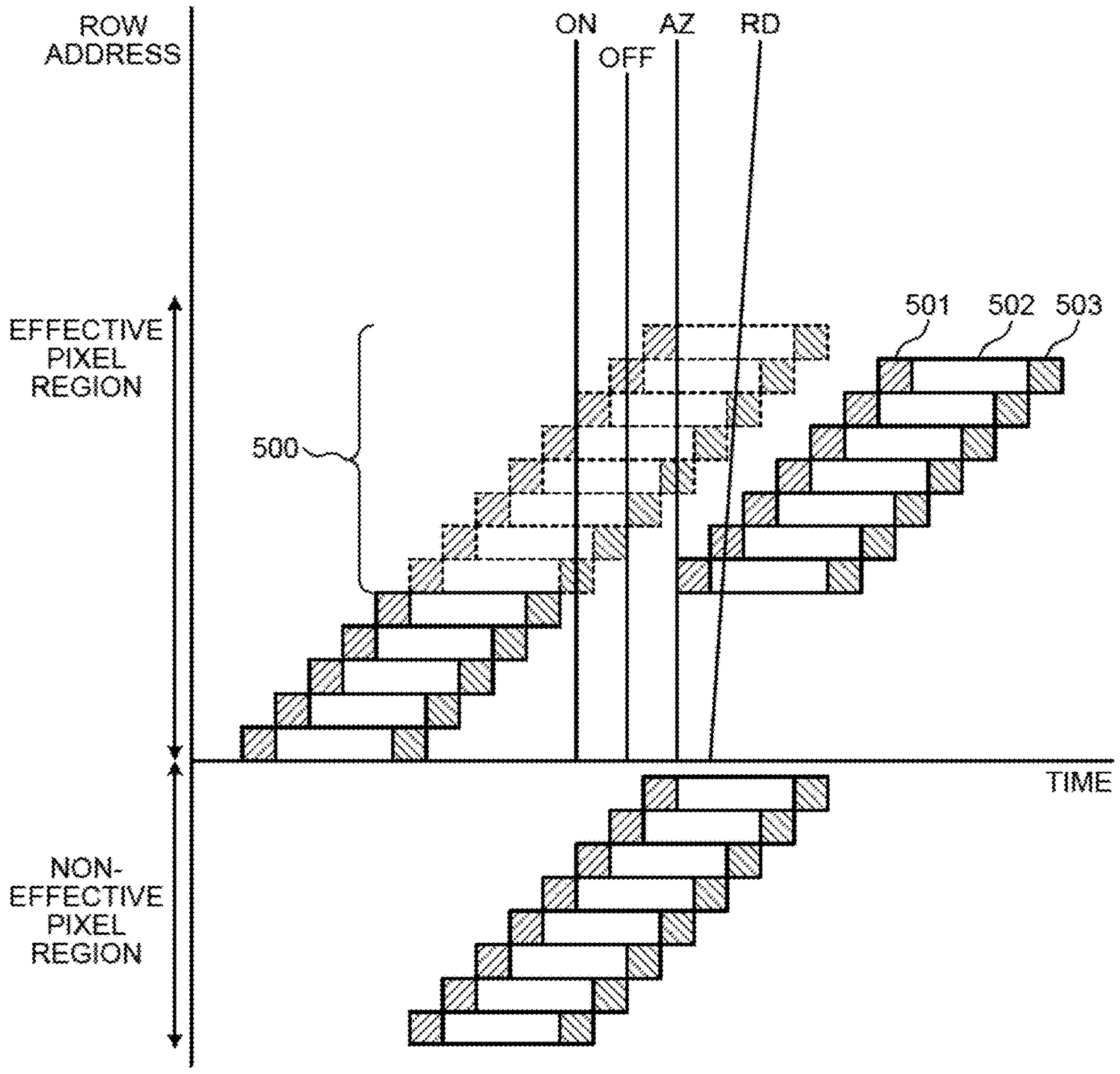
FIG. 23 is a diagram illustrating an example of generation of a grayscale signal and an event signal according to a sixth embodiment of the present disclosure.

FIG. 23 is a diagram illustrating an example of generation of a grayscale signal and an event signal according to the sixth embodiment of the present disclosure. The figure is a timing chart illustrating an example of generation of a grayscale signal and an event signal similarly to FIG. 21. The procedure of generating the grayscale signal in the figure is different from the procedure of generating the grayscale signal in FIG. 21 in that the generation of the grayscale signal of the pixel 100 in the overlapping prediction row 500 is continued after the generation of the grayscale signal in the second pixel 190 in the row of the non-effective pixel region 281.

As illustrated in the figure, the non-effective pixel region 281 second pixel 190 is accessed instead of the pixel 100 of the overlapping prediction row 500, and photodetection device 1 returns to the overlapping prediction row 500 at the timing when the detection of the event in the pixel 100 of the overlapping prediction row 500 ends, and continues the generation of the grayscale signal. As a result, missing of the grayscale signal of the pixel 100 of the overlapping prediction row 500 can be prevented.

[Configuration of Timing Control Section]

Figure 24:
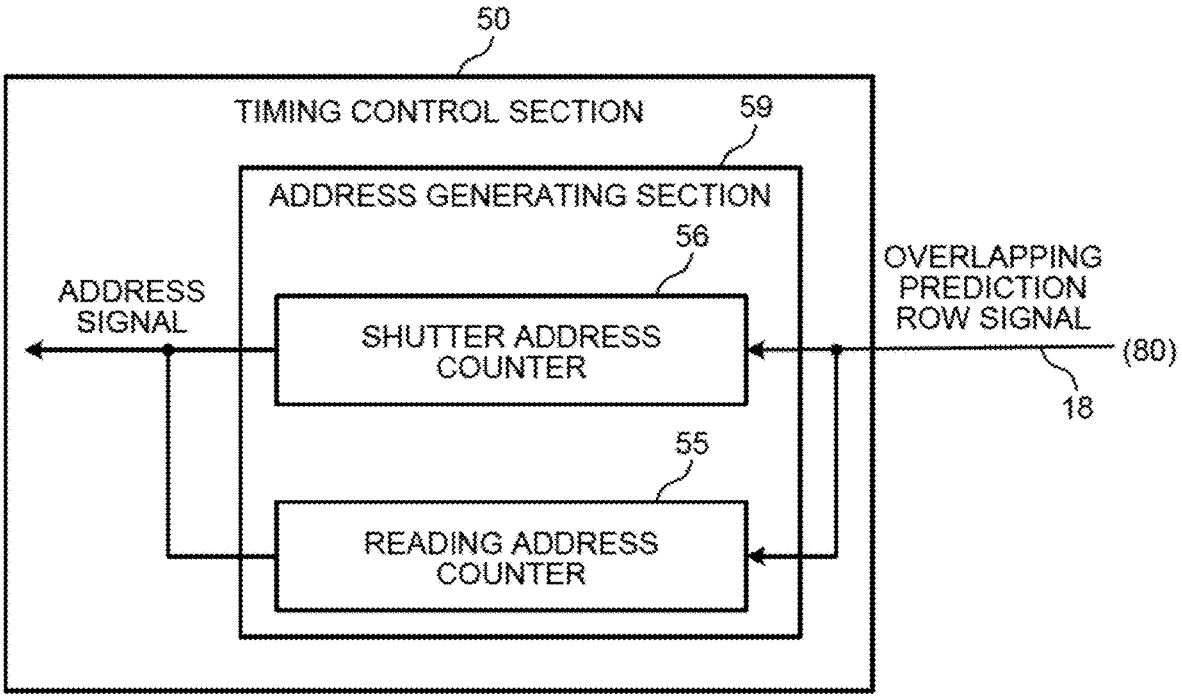
FIG. 24 is a diagram illustrating a configuration example of a timing control section according to the sixth embodiment of the present disclosure.

FIG. 24 is a diagram illustrating a configuration example of a timing control section according to the sixth embodiment of the present disclosure. The figure is a block diagram illustrating a configuration example of the timing control section 50 according to the sixth embodiment of the present disclosure. The portion of the address generating section 59 is described in the timing control section 50 in the figure. The address generating section 59 in the figure includes a shutter address counter 56 and a reading address counter 55.

The shutter address counter 56 is a counter that counts rows for which a shutter operation is performed. In addition, the reading address counter 55 is a counter that counts a row for which a read operation is performed. The overlapping prediction row signal is input to the shutter address counter 56 and the reading address counter 55. When the overlapping prediction row signal is input, the shutter address counter 56 and the reading address counter 55 store the count values so far in an internal memory and output the row of the non-effective pixel region 281. Thereafter, when the input of the overlapping prediction row signal is stopped, the shutter address counter 56 and the reading address counter 55 read the count value stored in the internal memory and perform counting. As a result, the shutter address counter 56 and the reading address counter 55 can return to the original count value of the effective pixel region 280 after outputting the address signal of the row of the non-effective pixel region 281. Thereafter, the shutter address counter 56 and the reading address counter 55 continuously output the address signal of the effective pixel region 280.

Since the configuration of the photodetection device 1 other than this is similar to the configuration of the photodetection device 1 in the fifth embodiment of the present disclosure, the description thereof will be omitted.

As described above, the photodetection device 1 according to the sixth embodiment of the present disclosure reads the grayscale signal of the second pixel 190 arranged in the non-effective pixel region 281 instead of the pixel 100 of the overlapping prediction row, and then returns to generation of the grayscale signal of the pixel 100 of the overlapping prediction row 500. As a result, missing of the grayscale signal of the pixel 100 of the overlapping prediction row 500 can be prevented.

7. Seventh Embodiment

The photodetection device 1 of the third embodiment described above stops detecting the event of the pixel 100 in the overlapping prediction row. On the other hand, a photodetection device 1 according to a seventh embodiment of the present disclosure is different from the photodetection device 1 according to the third embodiment described above in that detection timings of events of pixels 100 in overlapping prediction rows are shifted from each other.

[Generation of Grayscale Signal and Event Signal]

Figure 25:
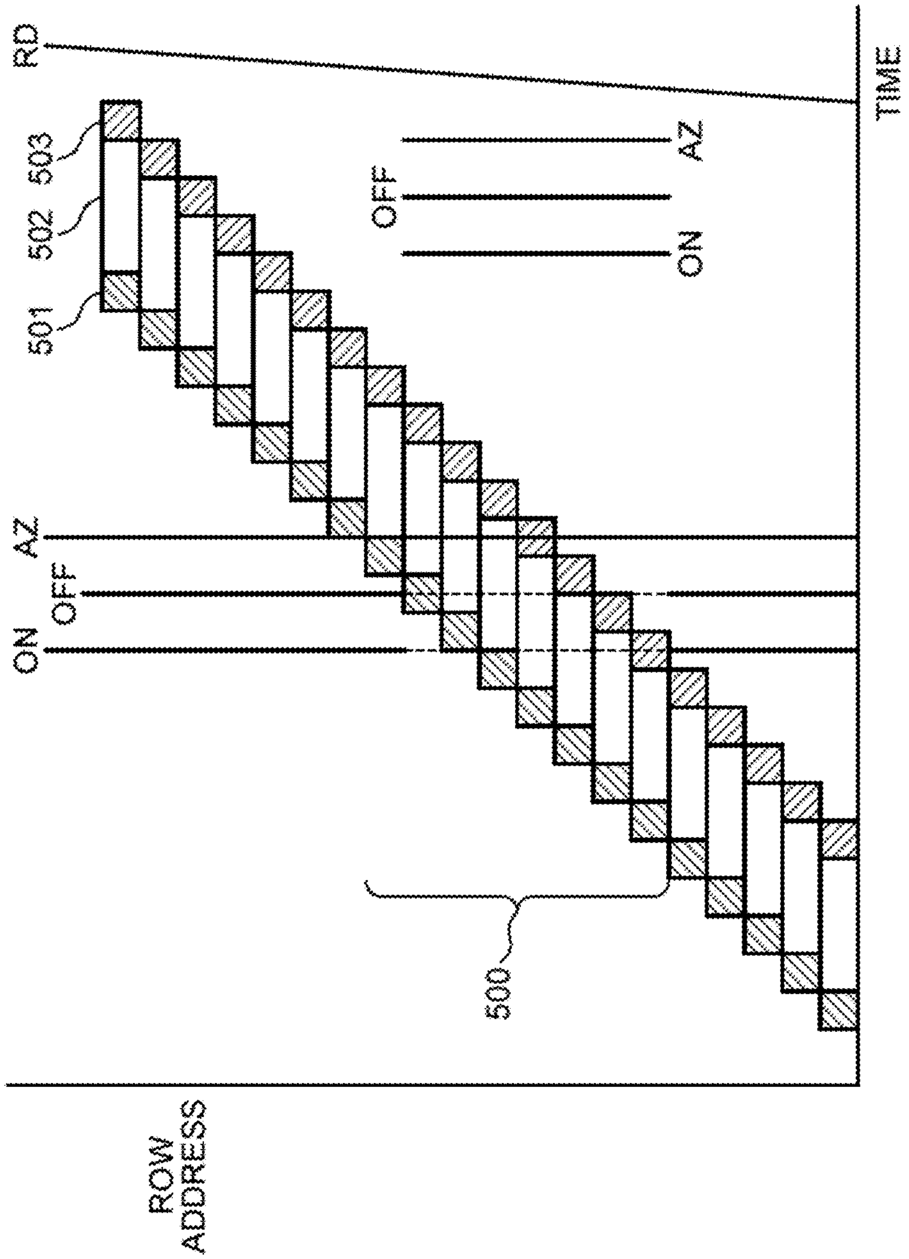
FIG. 25 is a diagram illustrating an example of generation of a grayscale signal and an event signal according to a seventh embodiment of the present disclosure.

FIG. 25 is a diagram illustrating an example of generation of a grayscale signal and an event signal according to the seventh embodiment of the present disclosure. The figure is a timing chart illustrating an example of generation of a grayscale signal and an event signal similarly to FIG. 15A. The procedure of the event signal generation in the figure is different from the procedure of the event signal generation in FIG. 15A in that the detection of the event of the pixel 100 of the overlapping prediction row 500 is performed while being shifted after the generation of the grayscale signal. Note that the generation (reading) of the event signal is performed after the detection of the events of the pixels 100 in all the rows.

As described above, in the seventh embodiment of the present disclosure, the missing of the event signal in the overlapping prediction row can be prevented. However, the timings of event detection are different between the overlapping prediction row and the other rows. Therefore, it is necessary to embed information indicating the interference avoidance row. This can be performed, for example, by adding a flag to "PH" or the like of the data region of the overlapping prediction row as in the frame 510 of the event data in FIG. 10.

Since the configuration of the photodetection device 1 other than this is similar to the configuration of the photodetection device 1 in the third embodiment of the present disclosure, the description thereof will be omitted.

As described above, the photodetection device 1 according to the seventh embodiment of the present disclosure performs the detection of the event in the pixel 100 of the overlapping prediction row by shifting the detection of the event in the pixel to the period after the generation of the grayscale signal in the row. Consequently, it is possible to generate the grayscale signal and the event signal in which the influence of the interference is reduced.

8. Eighth Embodiment

The photodetection device 1 of the first embodiment described above adds the interference occurrence flag to the event data based on the event signal of the overlapping prediction row and outputs the event data. On the other hand, a photodetection device 1 according to an eighth embodiment of the present disclosure is different from the photodetection device 1 according to the second embodiment described above in that grayscale signals and event signals of overlapping prediction rows are corrected.

[Configuration of Photodetection Device]

Figure 26:
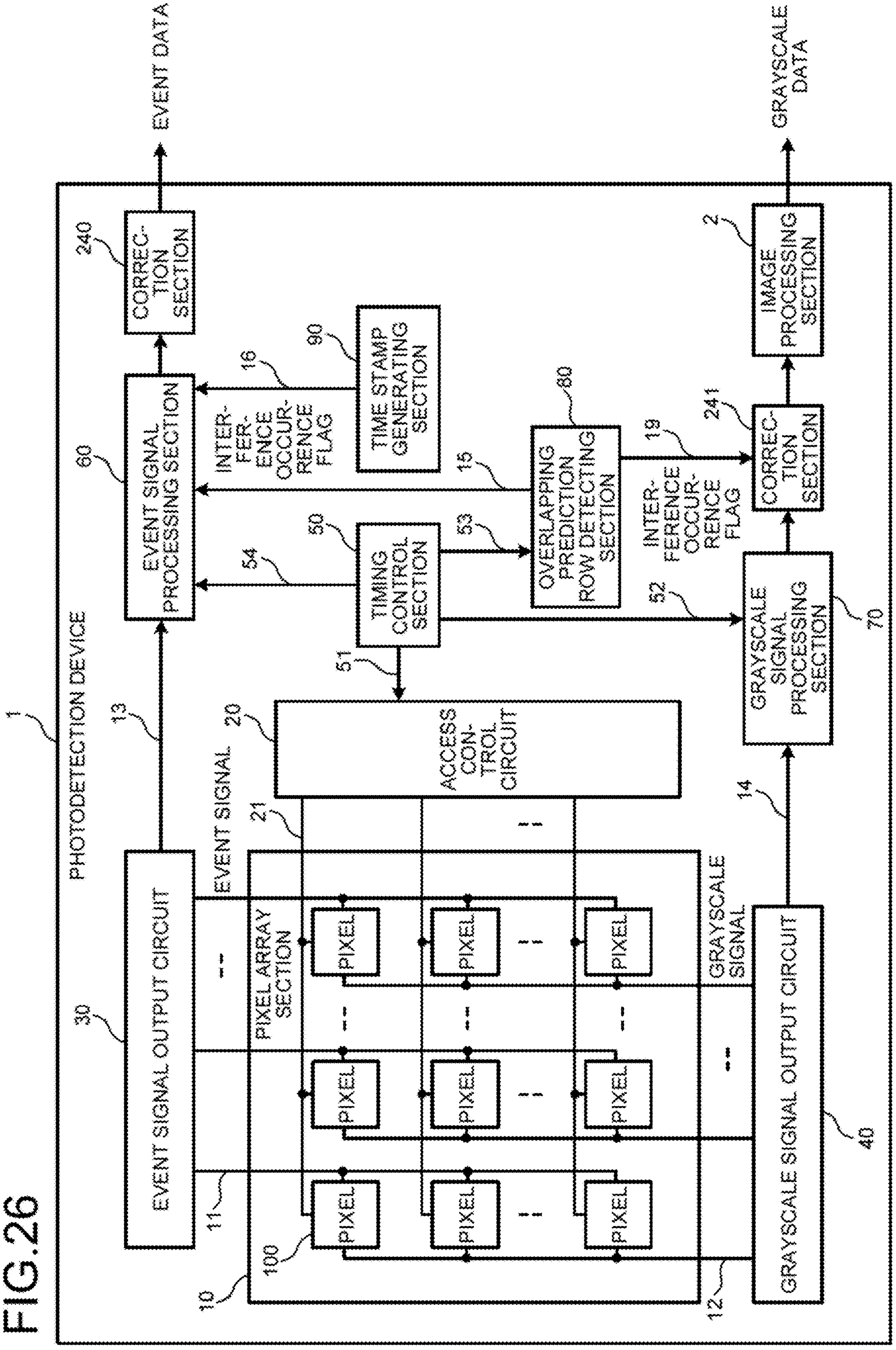
FIG. 26 is a diagram illustrating a configuration example of a photodetection device according to an eighth embodiment of the present disclosure.

FIG. 26 is a diagram illustrating a configuration example of the photodetection device according to the eighth embodiment of the present disclosure. The figure is a block diagram illustrating a configuration example of the photodetection device 1 similarly to FIG. 1. The photodetection device 1 in the figure is different from the photodetection device 1 in FIG. 1 in further including correction sections 240 and 241.

The correction section 240 corrects the event signal generated by the event signal generating section 120 of the pixel 100 included in the overlapping prediction row. The correction section 240 corrects the event signal affected by the interference on the basis of the interference occurrence flag from the overlapping prediction row detecting section 80. The correction section 240 outputs the event data including the corrected event signal to the outside.

The correction section 241 corrects the grayscale signal generated by the grayscale signal generating section 110 of the pixel 100 included in the overlapping prediction row. The correction section 241 corrects the grayscale signal affected by the interference on the basis of the interference occurrence flag from the overlapping prediction row detecting section 80. The correction section 241 outputs grayscale data including the corrected grayscale signal to the image processing section 2.

[Correction of Event Signal]

Figure 27:
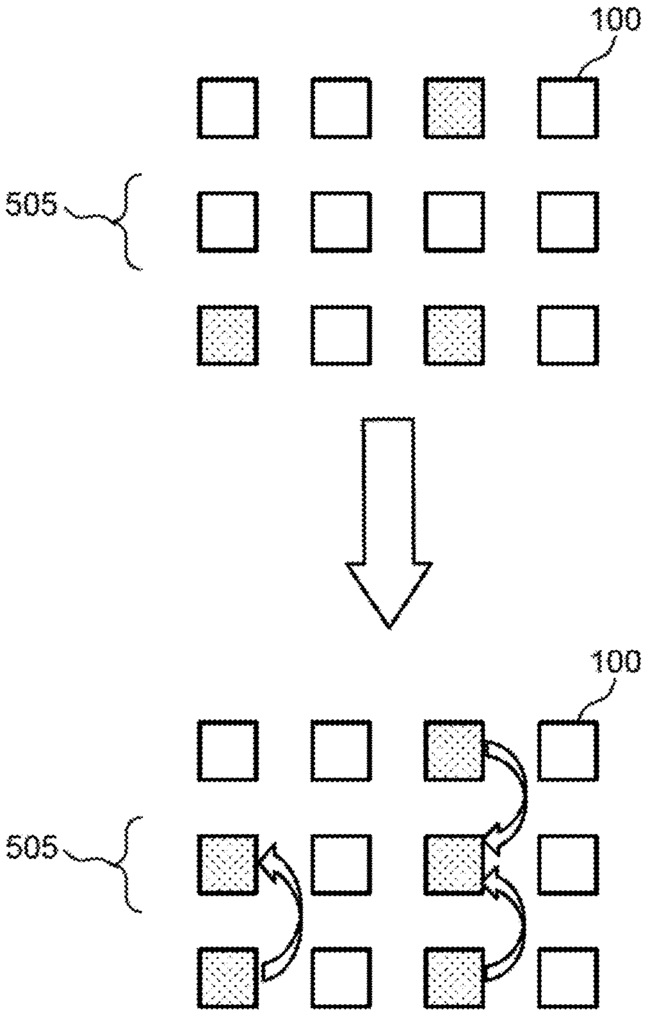
FIG. 27 is a diagram illustrating an example of correction of an event signal according to the eighth embodiment of the present disclosure.

FIG. 27 is a diagram illustrating an example of correction of an event signal according to the eighth embodiment of the present disclosure. The figure illustrates the pixels 100 arranged in a two-dimensional matrix. Furthermore, a hatched pixel 100 represents the pixel 100 that has generated the event signal. In addition, the overlapping prediction row 505 is described in the figure. The event detected by the event signal generating section 120 of the pixel 100 of the overlapping prediction row 505 includes an error due to interference. Therefore, the correction is performed by the correction section 240. The upper side of the figure represents a state before correction. In addition, the lower side of the figure represents a state of correction. The correction section 240 corrects the event signals in the overlapping prediction row 505 on the basis of the event signals generated by the pixels 100 in the upper and lower rows of the overlapping prediction row 505. For example, the correction section 240 can perform correction by complementing the event signal of the overlapping prediction row 505 on the basis of the event signal generated by the upper or lower pixel 100.

[Correction of Grayscale Signal]

Figure 28:
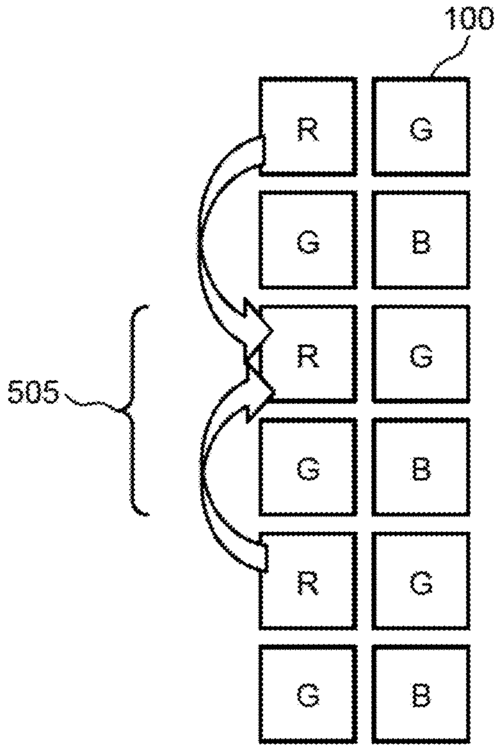
FIG. 28 is a diagram illustrating an example of correction of a grayscale signal according to the eighth embodiment of the present disclosure.

FIG. 28 is a diagram illustrating an example of correction of a grayscale signal according to the eighth embodiment of the present disclosure. The figure illustrates the pixels 100 arranged in a two-dimensional matrix, similarly to FIG. 27. Note that the character attached to the pixel 100 in the figure represents the wavelength of the incident light corresponding to the grayscale signal generated by the pixel 100. "R", "G" and "B" represent red light, green light and blue light, respectively. The grayscale signal generated by the grayscale signal generating section 110 of the pixel 100 of the overlapping prediction row 505 includes an error due to interference. Therefore, the correction is performed by the correction section 241. The correction section 241 corrects the grayscale signal signal of the overlapping prediction row 505 on the basis of the grayscale signal generated by the pixel 100 corresponding to the same wavelength above and below the overlapping prediction row 505. For example, the correction section 241 can perform correction by using the average of the grayscale signal of the pixel 100 of the overlapping prediction row 500 and the grayscale signals generated by the upper and lower pixels 100 as the grayscale signal of the overlapping prediction TOW 505.

Note that either one of the correction sections 240 and 241 may be disposed in the photodetection device 1. Note that the correction section 240 is an example of an event signal correction section. Furthermore, the correction section 241 is an example of a grayscale signal correction section.

Since the configuration of the photodetection device 1 other than this is similar to the configuration of the photodetection device 1 in the first embodiment of the present disclosure, the description thereof will be omitted.

As described above, the photodetection device 1 according to the eighth embodiment of the present disclosure corrects the grayscale signal and the event signal. As a result, the influence of interference can be further reduced.

9. Ninth Embodiment

In the photodetection device 1 of the first embodiment described above, the access control circuit 20 sequentially scans the rows of the pixel array section 10 and causes the event signal generating section 120 to output the event signal. On the other hand, a photodetection device 1 according to a ninth embodiment of the present disclosure is different from that of the above-described first embodiment in that the photodetection device 1 includes an arbiter that arbitrates a request to be output from the event signal generating section 120 that has detected an event.

[configuration of Photodetection Device]

Figure 29:
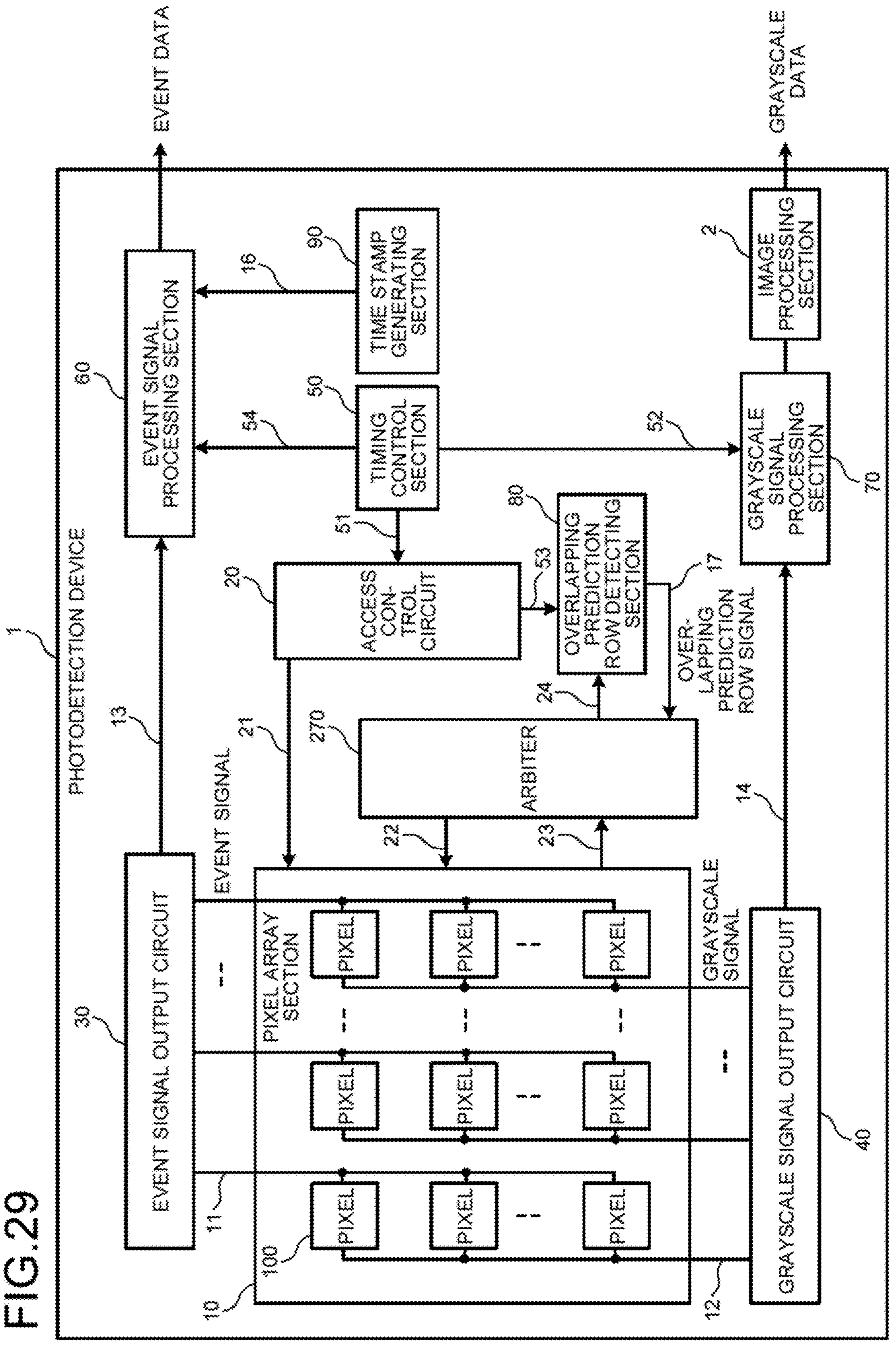
FIG. 29 is a diagram illustrating a configuration example of a photodetection device according to a ninth embodiment of the present disclosure.

FIG. 29 is a diagram illustrating a configuration example of the photodetection device according to the ninth embodiment of the present disclosure. The figure is a block diagram illustrating a configuration example of the photodetection device 1 similarly to FIG. 1. The photodetection device 1 in the figure is different from the photodetection device 1 in FIG. 1 in further including an arbiter 270.

When detecting an event, the event signal generating section 120 of the pixel 100 in the figure transmits a request for requesting output of an event signal to the arbiter 270 described later. The arbiter 270 selects the pixel 100 that has transmitted the request and outputs a response to the request. This response permits the output of the detection signal. The event signal generating section 120 of the pixel 100 that has received the response outputs the event signal to the event signal output circuit 30.

The arbiter 270 selects the pixel 100 that has transmitted the request. As described above, the pixel 100 that has detected the address event outputs an event signal to the event signal output circuit 30. The event signal needs to be exclusively output by one pixel 100 among the plurality of pixels 100 arranged in the column. This is to prevent collision of the outputs of the event signals. Therefore, the arbiter 270 arbitrates the plurality of pixels 100 where the event has been detected. Specifically, the arbiter 270 selects one of the pixels 100 that have transmitted the request. When requests are transmitted from the plurality of pixels 100, the arbiter 270 can select the pixels 100 in the order in which the requests are transmitted, for example. The arbiter 270 returns a response to the selected pixel 100. This response represents the result of the selection.

In addition, the arbiter 270 outputs an AZ control signal to the pixel 100 that has transmitted the request. The pixel 100 and the arbiter 270 are connected by signal lines 22 and 23. The signal line 23 is a signal line that transmits a request from the pixel 100. In addition, the signal line 22 transmits the response from the arbiter 270 and the AZ control signal.

In addition, the arbiter 270 outputs information of a row including the pixel 100 that has transmitted the request to the overlapping prediction row detecting section 80.

The access control circuit 20 in the figure outputs information of a row including the pixel 100 that generates the grayscale signal to the overlapping prediction row detecting section 80.

The overlapping prediction row detecting section 80 in the figure detects the overlapping prediction row on the basis of information on a row including the pixel 100 that has transmitted the request from the access control circuit 20 and information on a row including the pixel 100 that generates the grayscale signal from the access control circuit 20. The overlapping prediction row detecting section 80 generates an overlapping prediction row signal based on the detected overlapping prediction row and outputs the overlapping prediction row signal to the arbiter 270.

[Configuration of Event Signal Generating Section]

Figure 30:
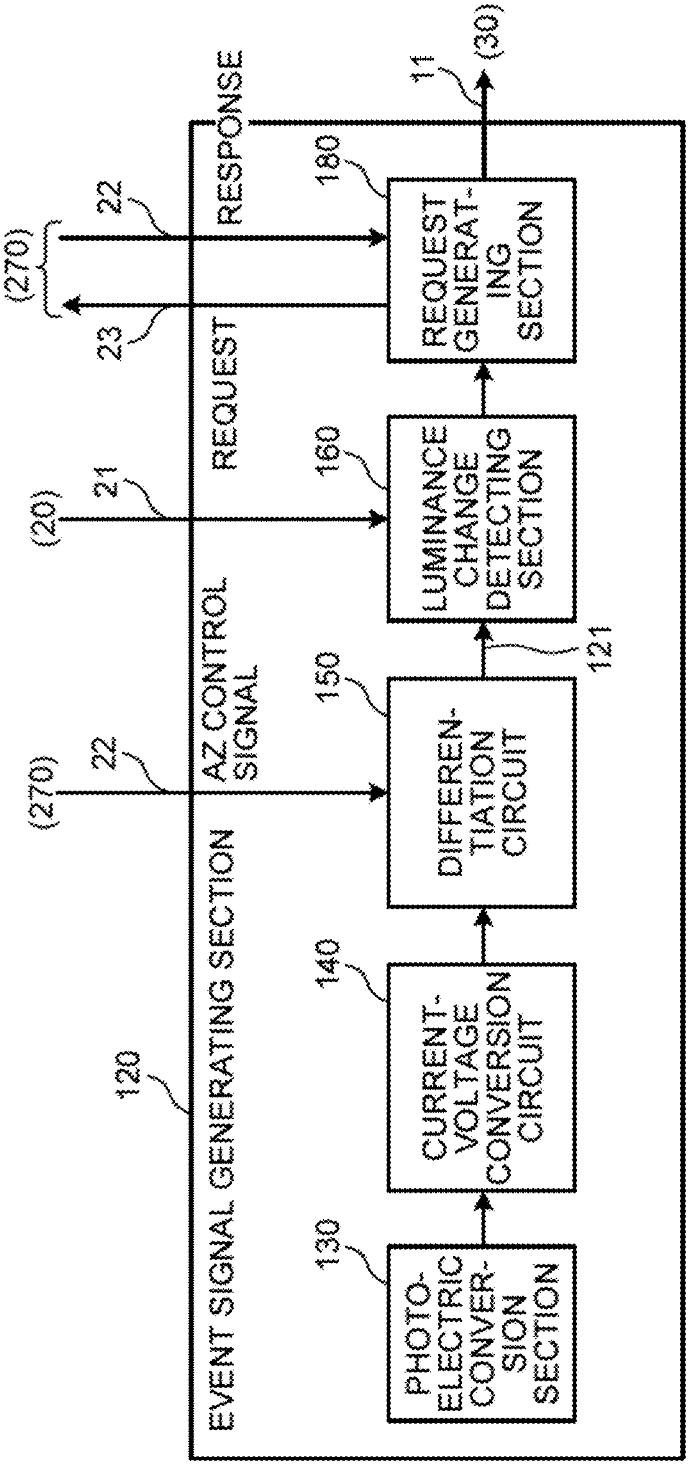
FIG. 30 is a diagram illustrating a configuration example of an event signal generating section according to the ninth embodiment of the present disclosure.

FIG. 30 is a diagram illustrating a configuration example of an event signal generating section according to the ninth embodiment of the present disclosure. The figure is a block diagram illustrating a configuration example of the event signal generating section 120 similarly to FIG. 5. The event signal generating section 120 in the figure is different from the event signal generating section 120 in FIG. 5 in including a request generating section 180 instead of the output section 170. Note that a predetermined threshold voltage is supplied to the luminance change detecting section 160 in the figure instead of the on-event detection signal and the off-event detection signal.

The request generating section 180 generates a request for requesting transfer of an event detection result in the luminance change detecting section 160, and outputs the request to the arbiter 270. Furthermore, when a response to the request is output from the arbiter 270, the request generating section 180 generates an event £ signal and outputs the event signal to the event signal output circuit 30.

[Interference Avoidance Method]

Figure 31A:
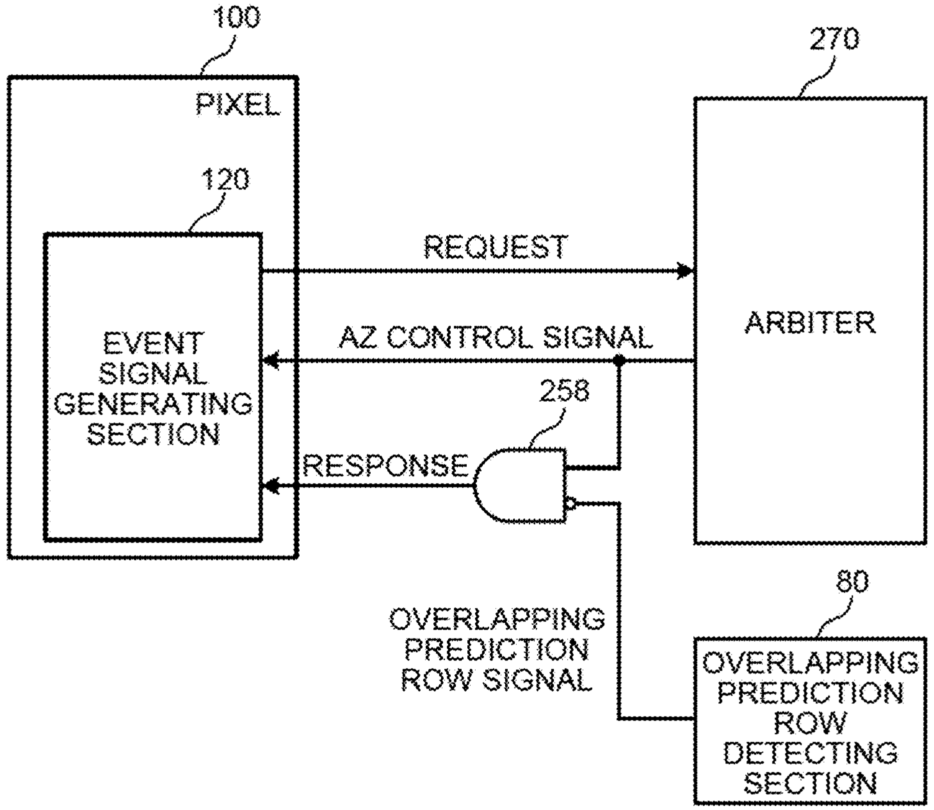
FIG. 31A is a diagram illustrating an example of an interference avoidance method according to the ninth embodiment of the present disclosure.
Figure 31B:
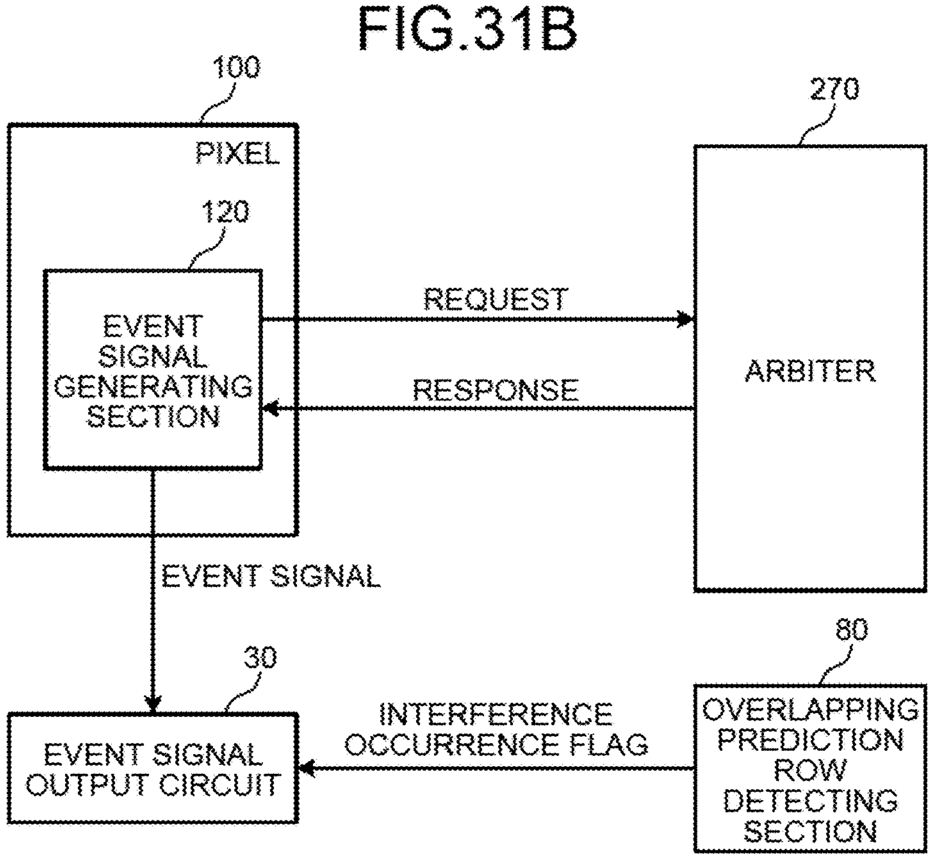
FIG. 31B is a diagram illustrating an example of an interference avoidance method according to the ninth embodiment of the present disclosure.

FIGS. 31A and 31B are diagrams illustrating an example of an interference avoidance method according to the ninth embodiment of the present disclosure. FIG. 31A illustrates an example of a case where the generation of the event signal in the pixel 100 of the overlapping prediction row is prevented by stopping transmitting the response to the event signal generating section 120 of the pixel 100 of the overlapping prediction row. An AND gate 258 in the figure masks the response signal with the overlapping prediction row signal. Although the AND gate 258 is described outside the arbiter 270 for convenience, the AND gate 258 may be incorporated in the arbiter 270.

FIG. 31B illustrates an example in a case where the overlapping prediction row detecting section 80 generates the interference occurrence flag and outputs the interference occurrence flag to the event signal output circuit 30. The event signal output circuit 30 in the figure stops reading the event signal on the basis of the interference occurrence flag. Note that the overlapping prediction row detecting section 80 can also output the interference occurrence flag to the event signal processing section 60. In this case, the event signal processing section 60 stops the output of the event signal as the event data on the basis of the interference occurrence flag as described with reference to FIG. 14.

Since the configuration of the photodetection device 1 other than this is similar to the configuration of the photodetection device 1 in the first embodiment of the present disclosure, the description thereof will be omitted.

As described above, the photodetection device 1 according to the ninth embodiment of the present disclosure stops reading the event signal of the overlapping prediction row in the photodetection device 1 of a format in which the pixel 100 that has transmitted the request is selected and the event signal is output. As a result, the output of the event signal affected by the interference can be stopped.

10. 10th Embodiment

A configuration of a semiconductor chip on which the photodetection device 1 is formed will be described. Note that, in a 10th embodiment of the present disclosure, the solid-state imaging device is applied to the photodetection device, the event data is replaced with the event signal, and the pixel signal is replaced with the grayscale signal.

Figure 32:
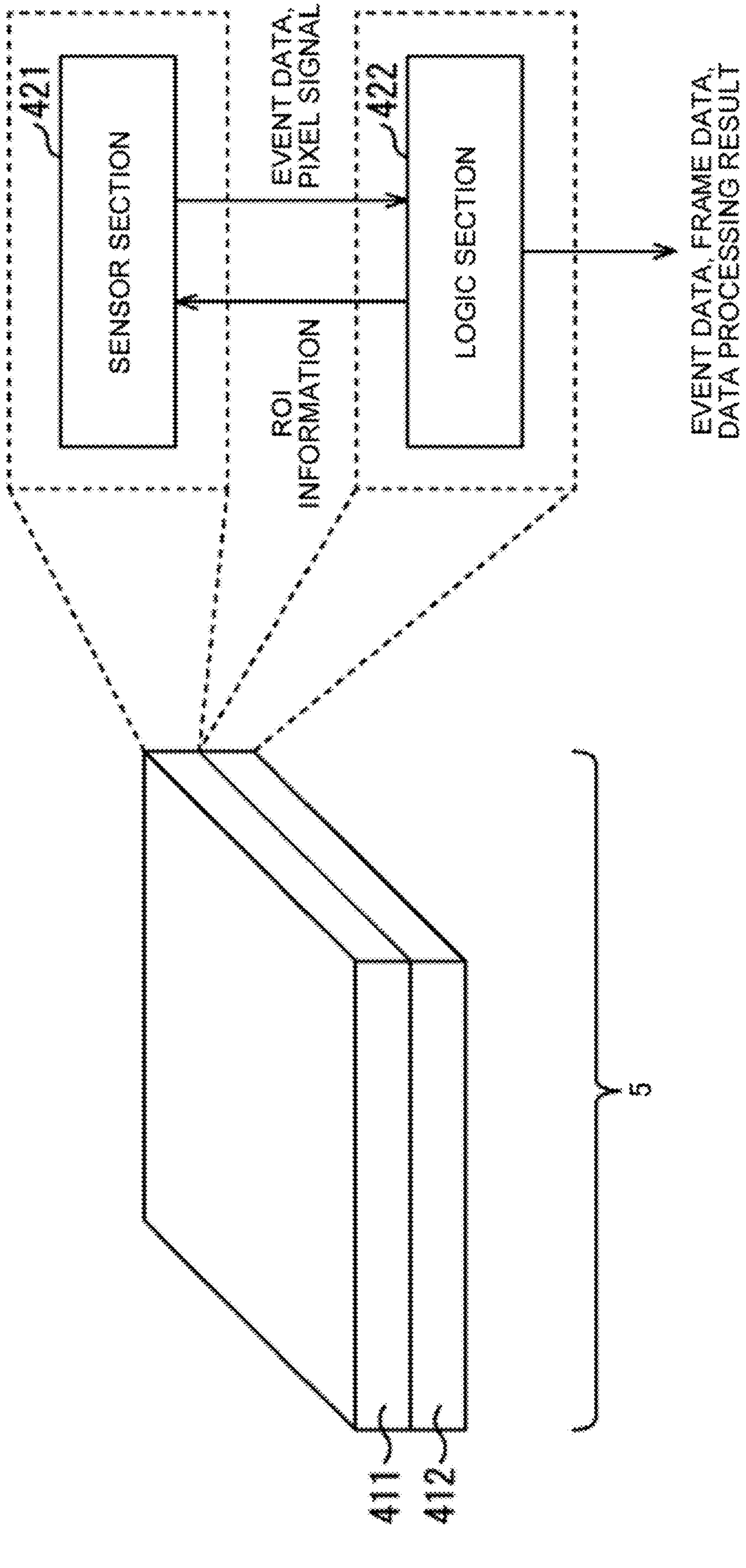
FIG. 32 is a diagram illustrating a configuration example of a solid-state imaging device applicable to the present technology.

FIG. 32 is a diagram illustrating a configuration example of a solid-state imaging device applicable to the present technology. In the solid-state imaging device 5 in the figure, a pixel that receives light for event detection and a pixel that receives light for generating an image of a region of interest are formed on the same chip.

The solid-state imaging device 5 in the figure includes one chip in which a sensor die (substrate) 411 as a plurality of dies (substrates) and a logic die 412 are laminated.

The sensor die 411 includes a sensor section 421 (as a circuit), and the logic die 412 includes a logic section 422.

The sensor section 421 generates event data. That is, the sensor section 421 includes a pixel that performs photoelectric conversion of incident light and generates an electric signal, and generates event data indicating occurrence of an event that is a change in the electric signal of the pixel.

Furthermore, the sensor section 421 generates a pixel signal. That is, the sensor section 421 includes a pixel that performs photoelectric conversion of incident light and generates an electric signal, performs imaging in synchronization with a vertical synchronization signal, and outputs frame data that is image data in a frame format.

The sensor section 421 can output the event data or the pixel signal independently, and can also output the pixel signal of the region of interest on the basis of region of interest (ROI) information input from the logic section 422 on the basis of the generated event data.

The logic section 422 controls the sensor section 421 as necessary. Furthermore, the logic section 422 performs various types of data processing such as data processing of generating frame data according to the event data from the sensor section 421 and image processing for frame data from the sensor section 421 or frame data generated according to the event data from the sensor section 421, and outputs the event data, the frame data, and a data processing result obtained by performing various types of data processing.

The logic section 422 includes, for example, a memory that is formed in a DSP chip and accumulates event data in a predetermined frame unit, an image processing section that performs image processing on the event data accumulated in the memory, a clock signal generating section that generates a clock signal serving as a master clock, an imaging synchronization signal generating section, and the like. Note that the image processing section can perform processing of generating ROI information.

Note that a part of the sensor section 421 can be configured in the logic die 412. Furthermore, a part of the logic section 422 can be configured in the sensor die 411.

Figure 33:
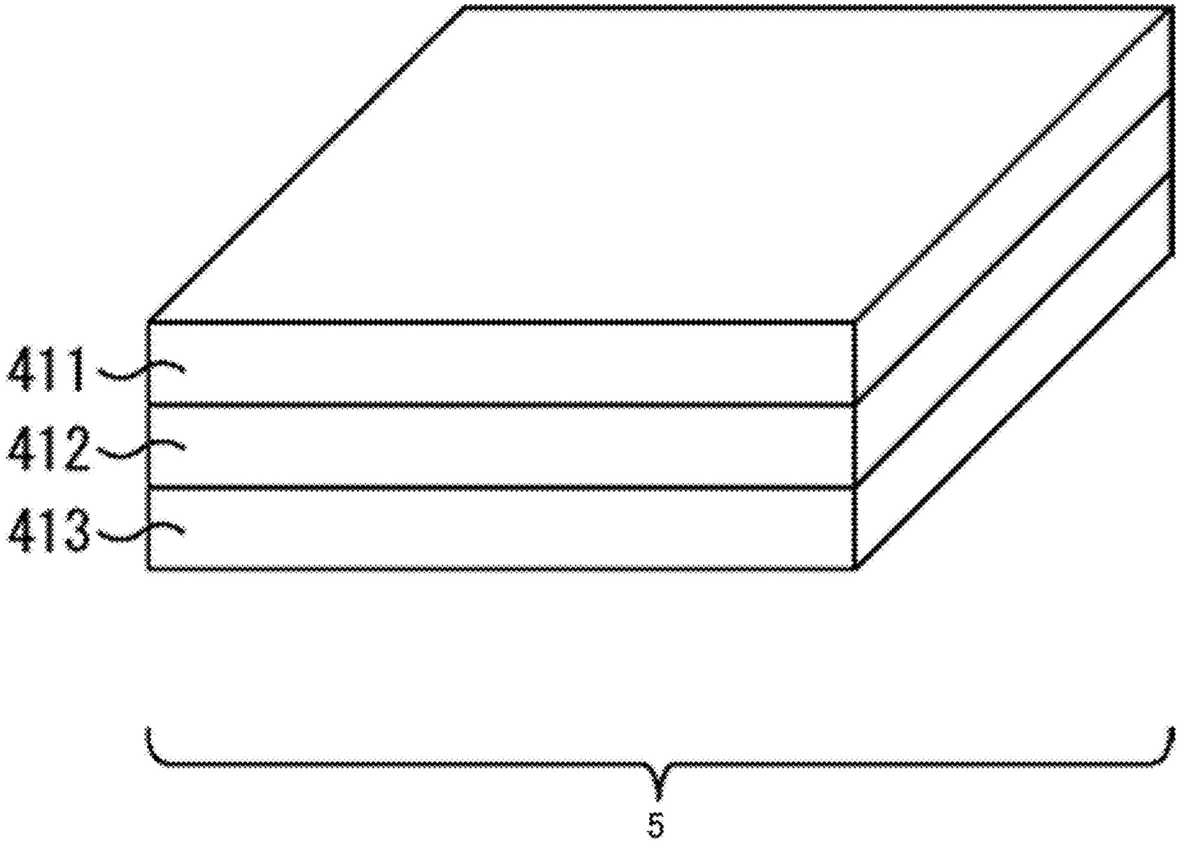
FIG. 33 is a diagram illustrating another configuration example of the solid-state imaging device applicable to the present technology.

FIG. 33 is a diagram illustrating another configuration example of the solid-state imaging device applicable to the present technology. In the above-described solid-state imaging device 5, for example, in a case where a large-capacity memory is provided as a memory or a memory included in an image processing section, as illustrated in FIG. 33, the solid-state imaging device 5 can include three layers in which another logic die 413 is laminated in addition to the sensor die 411 and the logic die 412. Of course, it may be configured by laminating four or more layers of dies (substrates).

Configuration Example of Sensor Section

Figure 34:
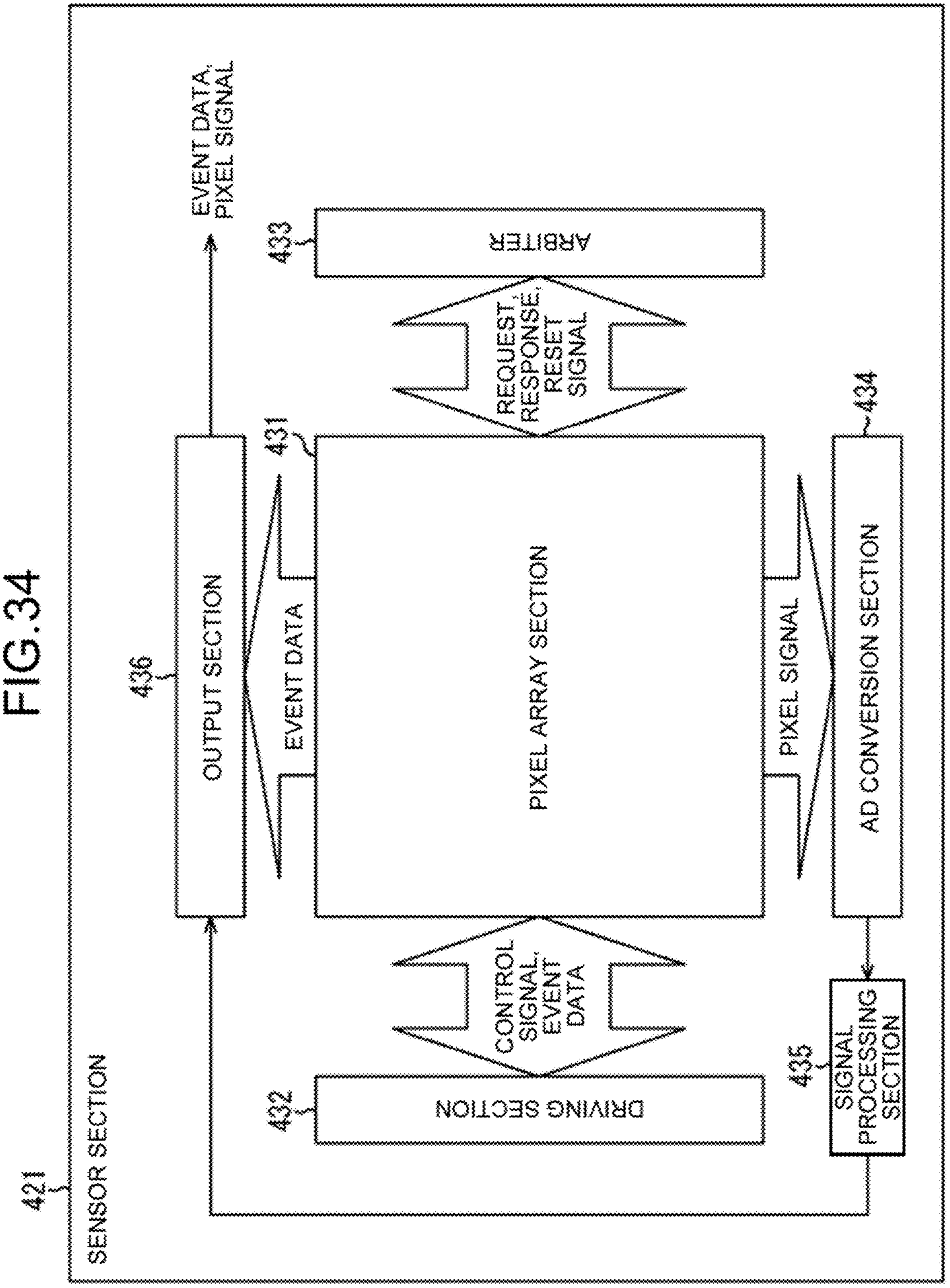
FIG. 34 is a block diagram illustrating a configuration example of a sensor section in FIG. 32.

FIG. 34 is a block diagram illustrating a configuration example of the sensor section in FIG. 32. The sensor section 421 includes a pixel array section 431, a driving section 432, an arbiter 433, an AD conversion section 434, a signal processing section 435, and an output section 436.

The pixel array section 431 is configured by arranging a plurality of pixels in a two-dimensional lattice pattern. In a case where a change exceeding a predetermined threshold (including a change equal to or greater than the threshold as necessary) occurs in (a voltage corresponding to) a photocurrent as an electric signal generated by photoelectric conversion of the pixel, the pixel array section 431 detects the change in the photocurrent as an event. In a case where an event is detected, the pixel array section 431 outputs a request for requesting the output of event data indicating the occurrence of the event to the arbiter 433. Then, in a case where the pixel array section 431 receives a response indicating permission for the output of the event data from the arbiter 433, the pixel array section 431 outputs the event data to the driving section 432 and the output section 436. Furthermore, the pixel array section 431 outputs the electric signal of the pixel 451 in which the event is detected to the AD conversion section 434 as a pixel signal.

The driving section 432 drives the pixel array section 431 by supplying a control signal to the pixel array section 431. For example, the driving section 432 drives the pixel to which the event data is output from the pixel array section 431, and supplies (outputs) the pixel signal of the pixel to the AD conversion section 434.

The arbiter 433 arbitrates a request for requesting the output of the event data from the pixel array section 431, and returns a response indicating permission or non-permission of the output of the event data to the pixel array section 431. Furthermore, after outputting a response indicating permission for event data output, the arbiter 433 outputs a reset signal (AZ control signal in FIG. 30) for resetting event detection to the pixel array section 431.

In an analog digital converter (ADC) of each column, the AD conversion section 434 performs AD conversion on a pixel signal of a pixel of the column, and supplies the pixel signal to the signal processing section 435. Note that the AD conversion section 434 can also perform correlated double sampling (CDS) together with AD conversion of the pixel signal.

The signal processing section 435 performs predetermined signal processing such as black level adjustment processing and gain adjustment processing, for example, on the pixel signals sequentially supplied from the AD conversion section 434, and supplies the pixel signals to the output section 436.

The output section 436 performs necessary processing on the pixel signal and the event data, and supplies the processing to the logic section 422 (FIG. 32).

11. Applied Example to Mobile Body

The technology according to the present disclosure (present technology) can be applied to various products. For example, the technology according to the present disclosure may be realized as an apparatus mounted on any type of mobile body such as an automobile, an electric vehicle, a hybrid electric vehicle, a motorcycle, a bicycle, a personal mobility, an airplane, a drone, a ship, and a robot.

Figure 35:
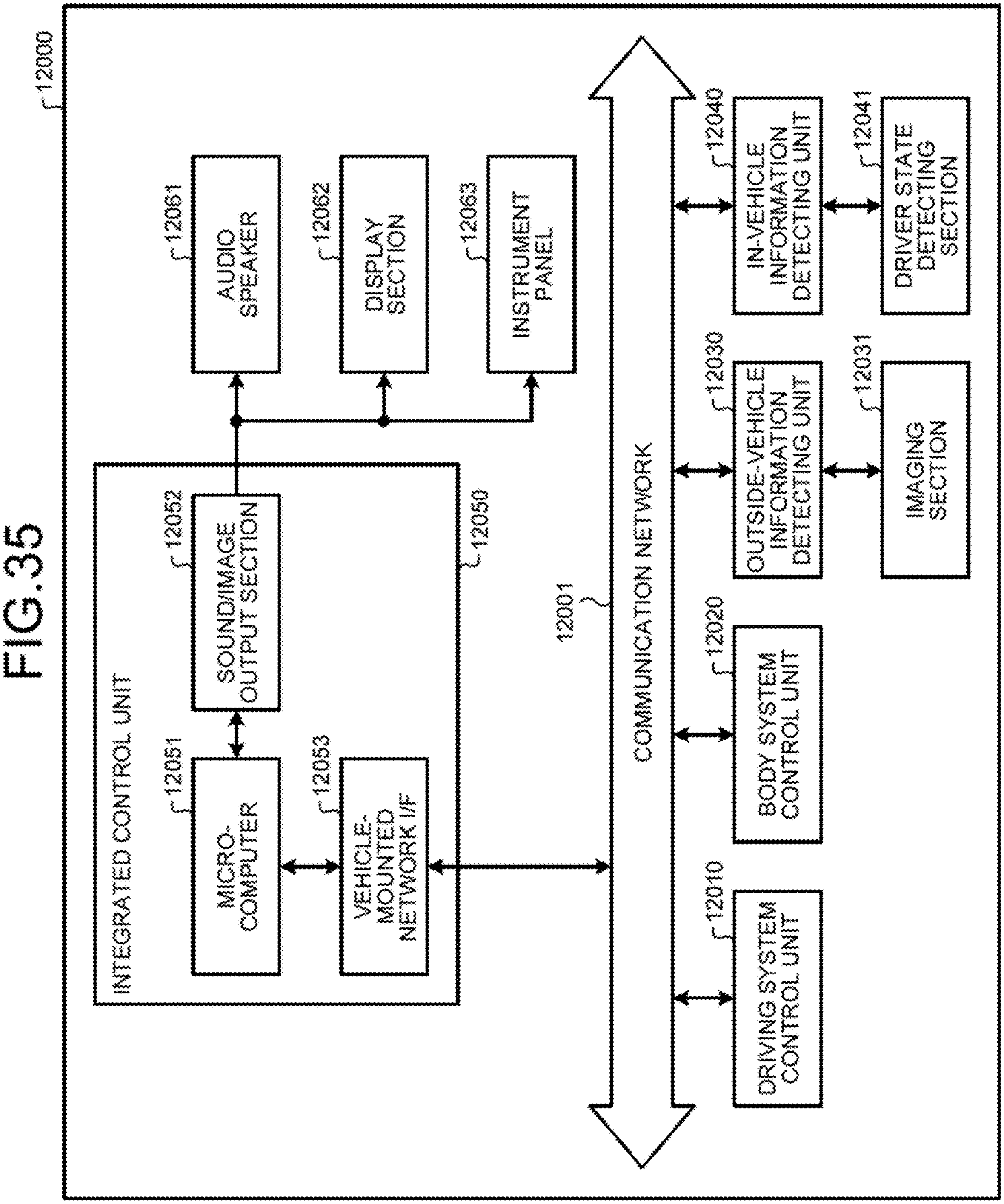
FIG. 35 is a block diagram depicting an example of schematic configuration of a vehicle control system.

FIG. 35 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 35, the vehicle control system 12000 includes a driving system control unit. 12010, a body system control unit 12020, an outside-vehicle information detecting unit. 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 35, an audio speaker 12061, a display section 12062, and an instrument panel 12063 are illustrated as the output device. The display section 12062 may, for example, include at least one of an on-board display and a head-up display.

Figure 36:
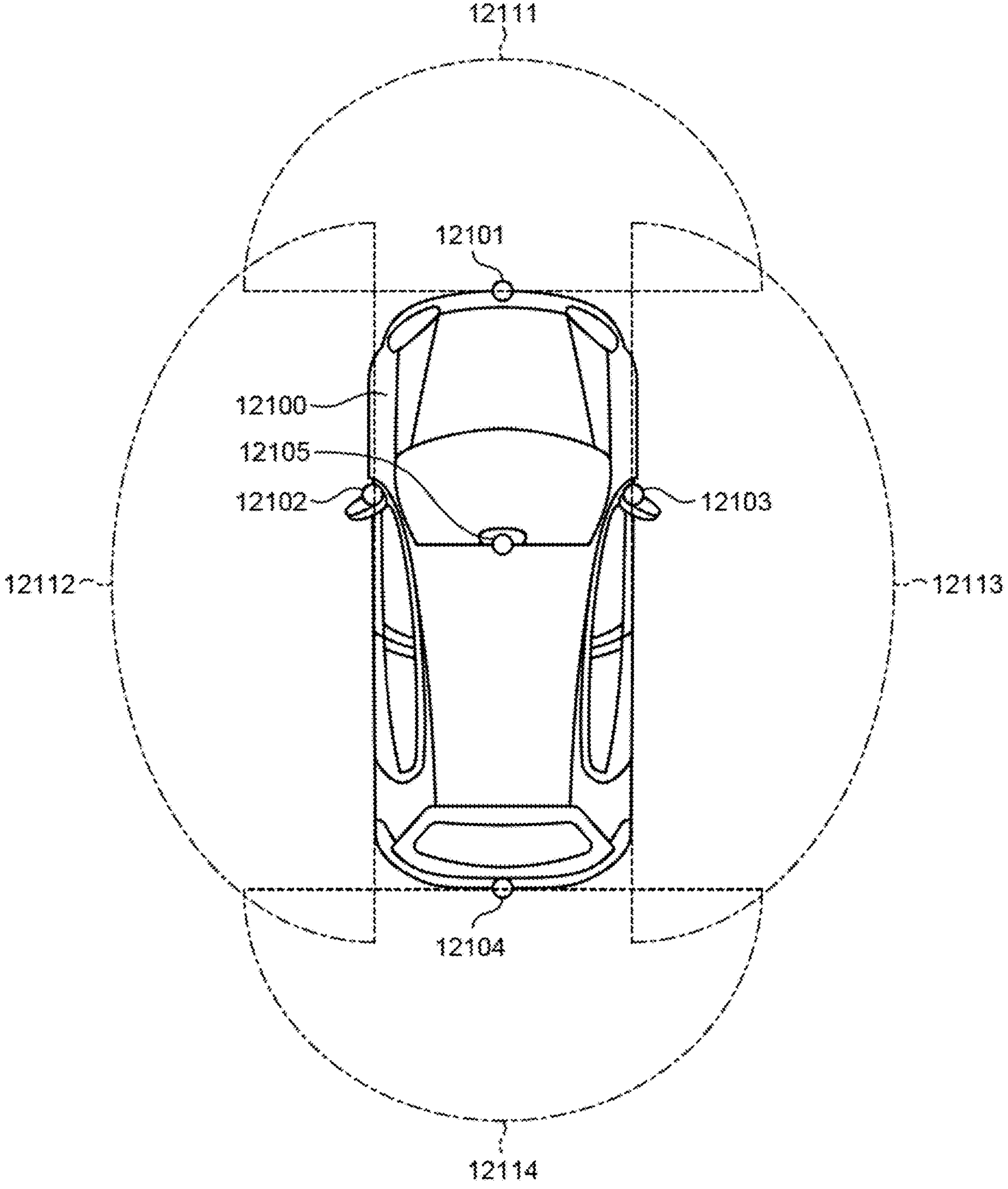
FIG. 36 is a diagram of assistance in explaining an example of installation positions of an outside-vehicle information detecting section and an imaging section.

FIG. 36 is a diagram depicting an example of the installation position of the imaging section 12031.

In FIG. 36, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of a vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 36 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure can be applied to the imaging section 12031 among the configurations described above. Specifically, the photodetection device 1 of FIG. 1 can be applied to the imaging section 12031. By applying the technology according to the present disclosure to the imaging section 12031, it is possible to prevent deterioration in image quality of the imaging section 12031.

Note that the effects described in the present specification are merely examples and are not limited, and other effects may be provided.

Note that the present technology can also have the following configurations.

(1) A photodetection element comprising:

a pixel array section in which a plurality of pixels is arranged in a two-dimensional matrix, the pixel including an event signal generating section that detects a change in luminance of incident light in a same direction as an event and generates an event signal that is a signal based on the event detected, and a grayscale signal generating section that generates a grayscale signal that is a signal corresponding to the luminance of the incident light;

a row control section that performs luminance signal generation control of sequentially performing control of commonly outputting a control signal to the grayscale signal generating section of the pixel arranged in a row of the pixel array section to generate the grayscale signal and control of reading the grayscale signal at shifted timings for each row, and control of outputting a control signal to the event signal generating section to detect the event and control of reading the event signal; and an overlapping prediction row detecting section that detects an overlapping prediction row that is a row in which overlapping of periods of generation of the grayscale signal and detection of the event is predicted.

(2) The photodetection element according to the above (1), further comprising a grayscale signal processing section that adds information indicating the overlapping prediction row to data of the grayscale signal generated by the grayscale signal generating section of the pixel included in the overlapping prediction row.

(3) The photodetection element according to the above (1), further comprising an event signal processing section that adds information indicating the overlapping prediction row to data of the event signal generated by the event signal generating section of the pixel included in the overlapping prediction row.

(4) The photodetection element according to the above (1), wherein the row control section stops control of reading the event signal in the pixel included in the overlapping prediction row.

(5) The photodetection element according to the above (1), wherein the row control section stops control of detecting the event in the pixel included in the overlapping prediction row.

(6) The photodetection element according to the above (1), wherein the row control section stops control of reading the grayscale signal in the pixel included in the overlapping prediction row.

(7) The photodetection element according to the above (1), wherein the pixel array section further includes a second pixel including the grayscale signal generating section, and the row control section performs control of generating the grayscale signal and control of reading the grayscale signal for the second pixel instead of the pixel included in the overlapping prediction row in the luminance signal generation control.

(8) The photodetection element according to the above (1) or (3), wherein the row control section performs control of detecting the event in the pixel included in the overlapping prediction row and control of reading the event signal in a period different from control of generating the grayscale signal and control of reading the grayscale signal in the pixel included in the overlapping prediction IOW.

(9) The photodetection element according to the above (1), further comprising an event signal correction section that corrects the event signal generated by the event signal generating section of the pixel included in the overlapping prediction row.

(10) The photodetection element according to the above (1), further comprising a grayscale signal correction section that corrects the grayscale signal generated by the grayscale signal generating section of the pixel included in the overlapping prediction row.

(11) An electronic apparatus comprising:

a photodetection element including:

a pixel array section in which a plurality of pixels is arranged in a two-dimensional matrix, the pixel including an event signal generating section that detects a change in luminance of incident light in a same direction as an event and generates an event signal that is a signal based on the event detected, and a grayscale signal generating section that generates a grayscale signal that is a signal corresponding to the luminance of the incident light;

a row control section that performs luminance signal generation control of sequentially performing control of commonly outputting a control signal to the grayscale signal generating section of the pixel arranged in a row of the pixel array section to generate the grayscale signal and control of reading the grayscale signal at shifted timings for each row, and control of outputting a control signal to the event signal generating section to detect the event and control of reading the event signal; and an overlapping prediction row detecting section that detects an overlapping prediction row that is a row in which overlapping of periods of generation of the grayscale signal and detection of the event signal is predicted; and a processing circuit that processes at least one of the grayscale signal or the event signal.

REFERENCE SIGNS LIST

1 PHOTODETECTION DEVICE
2 IMAGE PROCESSING SECTION
5 SOLID-STATE IMAGING DEVICE
10 PIXEL ARRAY SECTION
20 ACCESS CONTROL CIRCUIT
30 EVENT SIGNAL OUTPUT CIRCUIT
40 GRAYSCALE SIGNAL OUTPUT CIRCUIT
50 TIMING CONTROL SECTION
60 EVENT SIGNAL PROCESSING SECTION
70 GRAYSCALE SIGNAL PROCESSING SECTION
80 OVERLAPPING PREDICTION ROW DETECTING SECTION
100 PIXEL

110 GRAYSCALE SIGNAL GENERATING SECTION
120 EVENT SIGNAL GENERATING SECTION
190 SECOND PIXEL
240, 241 CORRECTION SECTION
280 EFFECTIVE PIXEL REGION
281 NON-EFFECTIVE PIXEL REGION
421 SENSOR SECTION
12031, 12101 to 12105 IMAGING SECTION

The invention claimed is:

1. A photodetection element comprising:

a pixel array section in which a plurality of pixels is arranged in a two-dimensional matrix, the pixel including an event signal generating section that detects a change in luminance of incident light in a same direction as an event and generates an event signal that is a signal based on the event detected, and a grayscale signal generating section that generates a grayscale signal that is a signal corresponding to the luminance of the incident light;

a row control section that performs luminance signal generation control of sequentially performing control of commonly outputting a control signal to the grayscale signal generating section of the pixel arranged in a row of the pixel array section to generate the grayscale signal and control of reading the grayscale signal at shifted timings for each row, and control of outputting a control signal to the event signal generating section to detect the event and control of reading the event signal; and an overlapping prediction row detecting section that detects an overlapping prediction row that is a row in which overlapping of periods of generation of the grayscale signal and detection of the event is predicted.

2. The photodetection element according to claim 1, further comprising a grayscale signal processing section that adds information indicating the overlapping prediction row to data of the grayscale signal generated by the grayscale signal generating section of the pixel included in the overlapping prediction row.

3. The photodetection element according to claim 1, further comprising an event signal processing section that adds information indicating the overlapping prediction row to data of the event signal generated by the event signal generating section of the pixel included in the overlapping prediction row.

4. The photodetection element according to claim 1, wherein the row control section stops control of reading the event signal in the pixel included in the overlapping prediction row.

5. The photodetection element according to claim 1, wherein the row control section stops control of detecting the event in the pixel included in the overlapping prediction row.

6. The photodetection element according to claim 1, wherein the row control section stops control of reading the grayscale signal in the pixel included in the overlapping prediction row.

7. The photodetection element according to claim 1, wherein the pixel array section further includes a second pixel including the grayscale signal generating section, and the row control section performs control of generating the grayscale signal and control of reading the grayscale signal for the second pixel instead of the pixel included in the overlapping prediction row in the luminance signal generation control.

8. The photodetection element according to claim 1, wherein the row control section performs control of detecting the event in the pixel included in the overlapping prediction row and control of reading the event signal in a period different from control of generating the grayscale signal and control of reading the grayscale signal in the pixel included in the overlapping prediction row.

9. The photodetection element according to claim 1, further comprising an event signal correction section that corrects the event signal generated by the event signal generating section of the pixel included in the overlapping prediction row.

10. The photodetection element according to claim 1, further comprising a grayscale signal correction section that corrects the grayscale signal generated by the grayscale signal generating section of the pixel included in the overlapping prediction row.

11. An electronic apparatus comprising:

a photodetection element including:

a pixel array section in which a plurality of pixels is arranged in a two-dimensional matrix, the pixel including an event signal generating section that detects a change in luminance of incident light in a same direction as an event and generates an event signal that is a signal based on the event detected, and a grayscale signal generating section that generates a grayscale signal that is a signal corresponding to the luminance of the incident light;

a row control section that performs luminance signal generation control of sequentially performing control of commonly outputting a control signal to the grayscale signal generating section of the pixel arranged in a row of the pixel array section to generate the grayscale signal and control of reading the grayscale signal at shifted timings for each row, and control of outputting a control signal to the event signal generating section to detect the event and control of reading the event signal; and an overlapping prediction row detecting section that detects an overlapping prediction row that is a row in which overlapping of periods of generation of the grayscale signal and detection of the event signal is predicted; and a processing circuit that processes at least one of the grayscale signal or the event signal.

* * * * *